(12) United States Patent
Einziger et al.

(10) Patent No.: US 9,459,346 B2
(45) Date of Patent: Oct. 4, 2016

(54) MODAL ANALYSIS

(75) Inventors: Pinchas Einziger, Haifa (IL); Eran Ben-Shmuel, Savyon (IL); Alexander Bilchinsky, Monosson-Yahud (IL); Amit Rappel, Ofra (IL); Denis Dikarov, Hod Hasharon (IL); Michael Sigalov, Beer-Sheva (IL); Yoel Biberman, Haifa (IL)

(73) Assignee: GOJI LIMITED, Hamilton (BM)

( * ) Notice: Subject to any disclaimer, the term of this patent is extended or adjusted under 35 U.S.C. 154(b) by 848 days.

(21) Appl. No.: 13/696,033

(22) PCT Filed: May 3, 2011
(Under 37 CFR 1.47)

(86) PCT No.: PCT/IB2011/001370
§ 371 (c)(1),
(2), (4) Date: Nov. 2, 2012

(87) PCT Pub. No.: WO2011/138675
PCT Pub. Date: Nov. 10, 2011

(65) Prior Publication Data
US 2013/0048881 A1 Feb. 28, 2013

Related U.S. Application Data

(60) Provisional application No. 61/282,980, filed on May 3, 2010, provisional application No. 61/282,981, filed on May 3, 2010, provisional application No. 61/282,983, filed on May 3, 2010, provisional (Continued)

(51) Int. Cl.
*H05B 6/68* (2006.01)
*H05B 6/64* (2006.01)
(Continued)

(52) U.S. Cl.
CPC .............. *G01S 13/89* (2013.01); *B01J 19/129* (2013.01); *H05B 6/64* (2013.01); *H05B 6/6447* (2013.01);
(Continued)

(58) Field of Classification Search
CPC ........ H05B 6/64; H05B 6/6447; H05B 6/70; H05B 6/705; H05B 6/686; B01J 19/129
USPC ....... 219/702, 388, 682, 746, 704, 709, 710, 219/748, 756, 761, 721, 745, 757
See application file for complete search history.

(56) References Cited

U.S. PATENT DOCUMENTS

| | | |
|---|---|---|
| 3,019,399 A | 1/1962 | Lanciani et al. |
| 4,196,332 A | 4/1980 | MacKay et al. |

(Continued)

FOREIGN PATENT DOCUMENTS

| | | |
|---|---|---|
| EP | 0526297 A1 | 2/1993 |
| EP | 1021067 A2 | 7/2000 |

(Continued)

OTHER PUBLICATIONS

Communication pursuant to Article 94(3) EPC related to EP Application No. 11743326.8, mailed Feb. 21, 2014.

(Continued)

*Primary Examiner* — Quang Van
(74) *Attorney, Agent, or Firm* — Finnegan, Henderson, Farabow, Garrett & Dunner, LLP

(57) ABSTRACT

Apparatuses and methods are disclosed for applying electromagnetic energy in a radio frequency (RF) range to an object in an energy application zone via at least one radiating element. At least one processor may be configured to determine locations of a first region and a second region in the energy application zone. In addition, the processor may be configured to regulate a source in order to apply a first predetermined amount of RF energy to the first region in the energy application zone and a second predetermined amount of RF energy to the second region in the energy application zone. The first predetermined amount of energy may be different from the second predetermined amount of energy.

36 Claims, 23 Drawing Sheets

Related U.S. Application Data application No. 61/282,984, filed on May 3, 2010, provisional application No. 61/282,985, filed on May 3, 2010, provisional application No. 61/282,986, filed on May 3, 2010.

(51) Int. Cl.

| | | |
|---|---|---|
| *H05B 6/66* | (2006.01) | |
| *G01S 13/89* | (2006.01) | |
| *B01J 19/12* | (2006.01) | |
| *H05B 6/70* | (2006.01) | |
| *H05B 6/72* | (2006.01) | |

(52) U.S. Cl.
CPC ............... *H05B 6/686* (2013.01); *H05B 6/70* (2013.01); *H05B 6/705* (2013.01); *H05B 6/72* (2013.01); *Y02B 40/143* (2013.01); *Y02B 40/146* (2013.01)

(56) References Cited

U.S. PATENT DOCUMENTS

| | | | | |
|---|---|---|---|---|
| 4,464,554 | A | | 8/1984 | Bakanowski et al. |
| 5,247,146 | A | * | 9/1993 | Civanelli et al. ............. 219/708 |
| 5,441,532 | A | | 8/1995 | Fenn |
| 5,485,743 | A | | 1/1996 | Taherian et al. |
| 5,632,921 | A | | 5/1997 | Risman et al. |
| 5,828,040 | A | | 10/1998 | Risman |
| 5,834,744 | A | | 11/1998 | Risman |
| 6,104,018 | A | | 8/2000 | Varma et al. |
| 6,590,192 | B2 | * | 7/2003 | Taino ................... H05B 6/6455 219/710 |
| 2003/0047559 | A1 | | 3/2003 | Watanabe et al. |
| 2009/0071110 | A1 | | 3/2009 | Gonze et al. |
| 2009/0178858 | A1 | | 7/2009 | Daniels et al. |
| 2010/0155392 | A1 | | 6/2010 | Nordh et al. |
| 2010/0176123 | A1 | | 7/2010 | Mihara et al. |
| 2010/0237067 | A1 | | 9/2010 | Nordh et al. |
| 2010/0252551 | A1 | | 10/2010 | Nordh et al. |

FOREIGN PATENT DOCUMENTS

| | | |
|---|---|---|
| EP | 2051564 A1 | 4/2009 |
| JP | 2008-310969 | 12/2008 |
| WO | WO 91/07069 | 5/1991 |
| WO | WO 98/35532 | 8/1998 |
| WO | WO 02/23953 A1 | 3/2002 |
| WO | WO 2009/011111 A1 | 1/2009 |
| WO | WO 2009/050893 A1 | 4/2009 |

OTHER PUBLICATIONS

Communication pursuant to Article 94(3) EPC related to EP Application No. 11729472.8, mailed Feb. 28, 2014.
Communication pursuant to Article 94(3) EPC related to EP Application No. 11731499.7, mailed Feb. 21, 2014.
Communication pursuant to Article 94(3) EPC related to EP Application No. 11738283.8, mailed Feb. 20, 2014.
Bows et al., Microwave phase control heating, International Journal of Food Science and Technology 1999, v. 34, pp. 295-304.
Mammano, Resonant Mode Converter Topologies, 2001, Texas Instruments Incorporated, Topic 1, pp. 1-12.
Narvaez, Truine Ethics: The neurobiological roots of our multiple moralities, New Ideas in Psychology 26 (2008) 95-119.
Schubert et al., Resonant cavity light-emitting diode, Appl. Phys., Lett. vol. 60, No. 8, 1992, pp. 921-923.

* cited by examiner

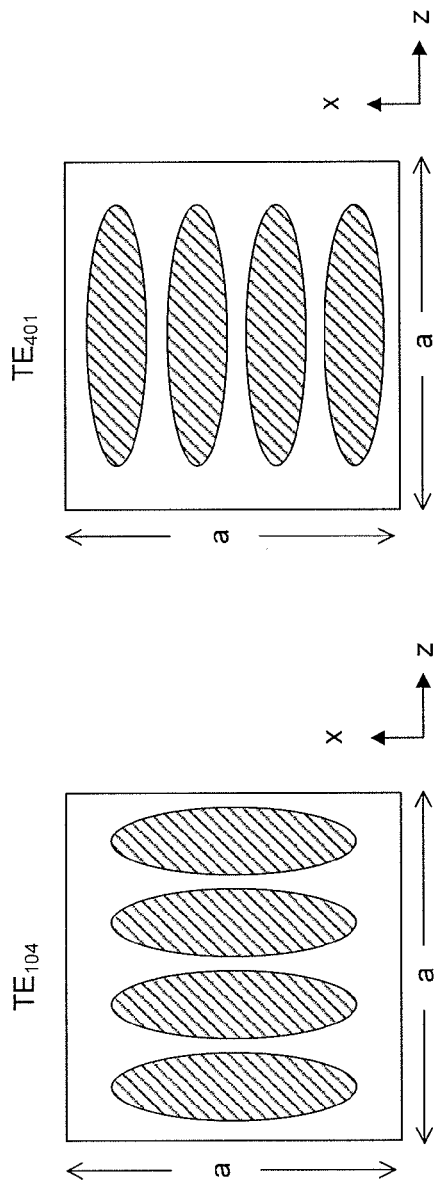
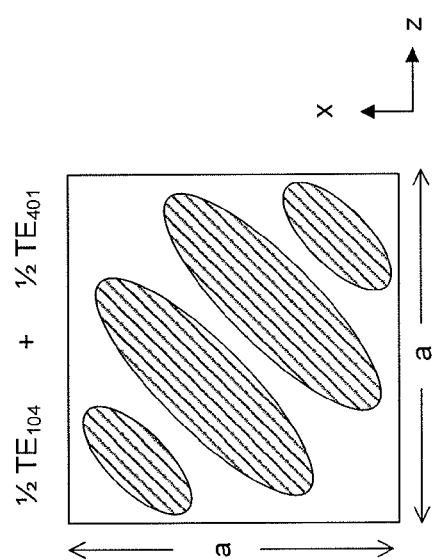
Fig. 3A
Fig. 3B
Fig. 3C

MODAL ANALYSIS

This application is a national phase application based on PCT/IB2011/001370, filed May 3, 2011, the content of which is incorporated herein by reference. The present application claims the benefit of priority to U.S. Provisional Patent Application No. 61/282,980, filed on May 3, 2010; U.S. Provisional Patent Application No. 61/282,981, filed on May 3, 2010; U.S. Provisional Patent Application No. 61/282,983, filed on May 3, 2010; U.S. Provisional Patent Application No. 61/282,984, filed on May 3, 2010; U.S. Provisional Patent Application No. 61/282,985, filed on May 3, 2010; and U.S. Provisional Patent Application No. 61/282,986, filed on May 3, 2010. Each of these applications is full incorporated herein in its entirety.

TECHNICAL FIELD

This application relates to apparatus and methods for applying electromagnetic energy to an object.

BACKGROUND

Electromagnetic waves are commonly used to apply energy to objects. Typically, such objects are located in a cavity configured to receive electromagnetic energy. However, because the electromagnetic field distribution may be dependent on the properties (e.g., the size of the object), location, and orientation of the object as well as characteristics of the source from which the energy is applied, it is often difficult to apply electromagnetic energy in a controllable manner. One example of an electromagnetic energy application device is a microwave oven. In a microwave oven, microwaves are used to apply electromagnetic energy from an energy source to the object through air. The electromagnetic energy is then absorbed by the object and converted to theimal energy, causing the temperature of the object to rise.

SUMMARY

Some exemplary aspects of the present disclosure may be directed to an apparatus for applying electromagnetic energy in the radio frequency (RF) range to an object in an energy application zone via at least one radiating element. The apparatus may include at least one processor. The processor(s) may be configured to regulate the source in order to apply a first predetermined amount of RF energy to a first region in the energy application zone and a second predetermined amount of RF energy to a second region in the energy application zone. The first predetermined amount of energy may be different from the second predetermined amount of energy. As used herein, a predetermined value (e.g., amount of energy) may be a value determined (e.g., by the processor) before energy application. In some embodiments, a predetermined value may be determined before the beginning of an energy application cycle. Additionally or alternatively, a predetermined value may be determined by the processor during an energy application cycle, and used by the processor later in the same and/or subsequent energy application cycle. Determination may include selection among a plurality of options. The determination may be made by the processor, for example, based on input information received from a user and/or from detectors that are in, around, or in the vicinity of the energy application zone.

The at least one processor may be configured to determine locations of the first region and the second region. The processor may also be configured to determine information indicating a spatial location of the object in the energy application zone; identify a first field pattern having a first high-intensity region corresponding to a first area of the spatial location of the object; and identify a second field pattern having a second high-intensity region corresponding to a second area of the spatial location of the object, wherein the first area is different from the second area.

Additionally, the processor may be configured to excite one or more standing waves in the energy application zone. Each of the standing waves may have at least one high-intensity region and at least one low-intensity region, wherein field intensities associated with high-intensity regions are higher than field intensities associated with low-intensity regions. The processor may be configured to cause the at least one high-intensity region of one or more of the standing waves to coincides with a location of the object. Further, the processor may be configured to excite a plurality of standing waves and to select at least a portion of the plurality of standing waves with high-intensity regions that coincide with a location of the object. As used herein, the term "excited" is interchangeable with "generated," "created," and "applied".

Another aspect of the disclosure may be directed to a method for applying electromagnetic energy in a radio frequency range to an object in an energy application zone using a source of electromagnetic energy regulated by a processor. The method may include determining locations of a first region and a second region in the energy application zone; determining a first amount of energy to be applied to the first region and a second amount of energy to be applied to the second region; and regulating the source to apply the first amount of energy to the first region and the second amount of energy to the second region. The first amount of energy may be different from the second amount of energy.

Another aspect of the disclosure may be directed to an apparatus for exciting a target electromagnetic field intensity distribution in an energy application zone via at least one radiating element that radiates RF energy. The apparatus may include a processor. The processor may be configured to select, from multiple electromagnetic field patterns, one or more field patterns, based on the target electromagnetic field intensity distribution; and cause the at least one radiating element to excite the one or more selected field patterns in the energy application zone.

Another aspect of the disclosure may be directed to a method of exciting a target electromagnetic field intensity distribution in an energy application zone via at least one radiating element that radiates RF energy. The method may include selecting from multiple electromagnetic field patterns, which include linear combinations of at least three linearly independent field patterns, one or more field patterns, based on the target electromagnetic field intensity distribution; weighting the selected field patterns such that a sum of the field intensity distributions of the weighted field patterns equals to the target field intensity distribution; and exciting the one or more selected field patterns in the energy application zone according to their weights.

An aspect of some embodiments of the disclosure concerns the use of electromagnetic waves having certain relationships with the dimensions of the energy application zone. In some embodiments, the energy application zone may be a cavity, and there may be a relationship between the wavelength of the EM waves applied to the cavity and one or more dimensions of the cavity. This relationship, discussed in detail below, is referred to herein as "modal condition." An apparatus operating to fulfill the modal condition is referred herein as a "modal apparatus," and the energy application zone or cavity of a modal apparatus is referred herein as a "modal cavity." Modal apparatus may allow better spatial control of the heating or EM energy distribution than apparatus that do not satisfy modal condition.

Some embodiments may include the use and/or construction of a loss profile. A loss profile may include any representation of the ability of an energy application zone or an object to absorb energy across its volume. A loss profile may be represented, for example, by a matrix, table or other 2D or 3D representation or map of a cavity, wherein each portion of the map may be annotated (e.g., using notations, cross-hatching, colors, etc.) in accordance with the ability of that portion to absorb energy. In the case of an energy application zone, a loss profile may include such representation across its volume with or without an object.

Some embodiments are described below using concepts of modulation space (MS), and/or modulation space elements (MSE's). The term "modulation space" or "MS" is used to collectively refer to all the parameters that may affect a field pattern in the energy application zone and all combinations thereof. Examples of such parameters may include the frequency of an electromagnetic wave applied to the energy application zone, the phase of such a wave in respect of a certain wall defining the energy application zone, and where more than one radiating elements are used, the relative amplitude in which the energy is emitted from each of the radiating elements. The term "modulation space element" or "MSE" may refer to a specific set of values of the variable parameters in the modulation space, for example, the combined features of a wave, having frequency of 900 MHz and phase of 30° may form an MSE. The terms MS and MSE are discussed in more detail below.

As used herein, if a machine (e.g., a processor) is described as "configured to" perform a task (e.g., configured to cause application of a predetermined field pattern), then, at least in some embodiments, the machine performs this task during operation. Similarly, when a task is described as being done "in order to" establish a target result (e.g., in order to apply a plurality of electromagnetic field patterns to the object), then, at least in some embodiments, carrying out the task would accomplish the target result.

The preceding summary is merely intended to provide the reader with a very brief summary of a few aspects of the invention, and is not intended to restrict in any way the scope of the claims. In addition, it is to be understood that both the foregoing general description and the following detailed description are exemplary and explanatory only and are not restrictive of the claims.

BRIEF DESCRIPTION OF THE DRAWINGS

The accompanying drawings, which are incorporated in and constitute a part of this specification, illustrate various embodiments and exemplary aspects of the present disclosure and, together with the description, explain principles of the invention. In the drawings:

FIGS. 3A-3C illustrate exemplary field patterns in a modal cavity consistent with principles of some embodiments;

DESCRIPTION OF EXEMPLARY EMBODIMENTS

Figure 1:
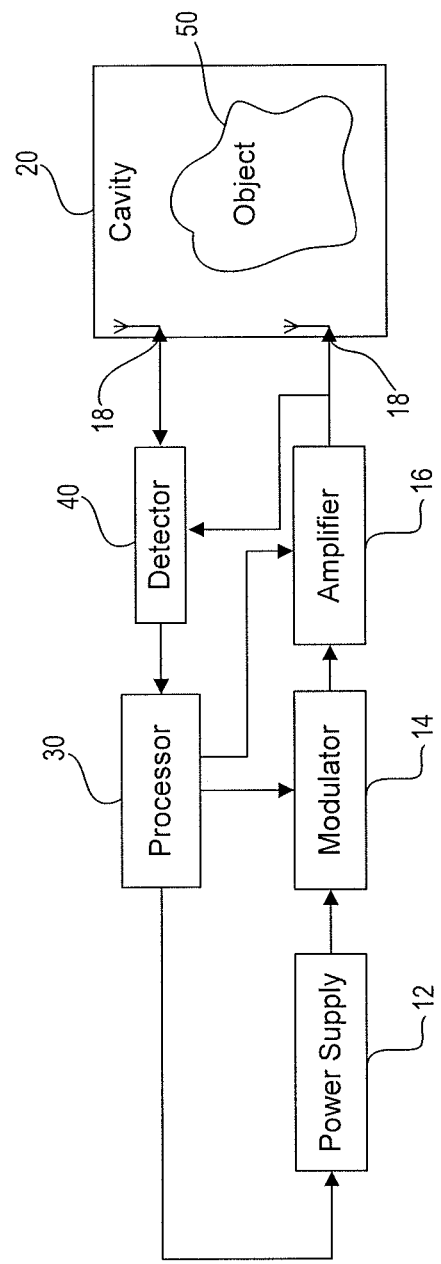
FIG. 1 is a schematic diagram of an apparatus for applying electromagnetic energy to an object, in accordance with some embodiments.

Reference will now be made in detail to exemplary embodiments of the disclosure, examples of which are illustrated in the accompanying drawings. When appropriate, the same reference numbers are used throughout the drawings to refer to the same or like parts.

In one respect, some embodiments of the disclosure may involve apparatus and methods for applying electromagnetic energy to an object in an energy application zone. As used herein, the term "apparatus" in its broadest sense may include any component or group of components described herein. For example, an "apparatus" as broadly used herein may refer only to a processor, such as processor 30, as illustrated, for example, in FIG. 1. Alternatively, an "apparatus" may include a combination of a processor and one or more radiating elements; a processor, a cavity, and one or more radiating elements; a processor and a source of electromagnetic energy; a processor, a cavity, one or more radiating elements, and a source of electromagnetic energy; or any other combination of components described herein.

The term electromagnetic energy, as used herein, includes any or all portions of the electromagnetic spectrum, including but not limited to, radio frequency (RF), infrared (IR), near infrared, visible light, ultraviolet, etc. In some cases, applied electromagnetic energy may include RF energy with a wavelength of 100 km to 1 mm, which is a frequency of 3 KHz to 300 GHz, respectively. In some cases, RF energy within a narrower frequency range, e.g., 1 MHz-100 GHz, may be applied. Microwave and ultra high frequency (UHF) energy, for example, are both within the RF range. Even though examples of the disclosure are described herein in connection with the application of RF energy, these descriptions are provided to illustrate a few exemplary principles, and are not intended to limit the invention to any particular portion of the electromagnetic spectrum.

Similarly, for exemplary purposes, this disclosure contains a number of examples of electromagnetic energy used for heating. Again, these descriptions are provided to illustrate exemplary principles of the disclosure. Disclosed embodiments, as described and claimed, may provide benefit for various products and industrial, commercial, and consumer processes involving the application of energy, regardless of whether the application of energy results in a temperature rise. Persons of ordinary skill in the art will appreciate that core, inventive principles of energy application discussed herein may be applied for a variety of purposes other than or including heating. For example, electromagnetic energy may also be applied to an object for heating, combusting, thawing, defrosting, cooking, drying, accelerating reactions, expanding, evaporating, fusing, causing or altering biologic processes, medical treatments, preventing freezing or cooling, maintaining the object within a desired temperature range, or any other application where it is desirable to apply energy.

Moreover, reference to an "object" (also known as a "load") to which electromagnetic energy is applied is not limited to a particular form. An "object" may include a liquid, solid, or gas, depending upon the particular process with which the embodiment is utilized, and the object may include composites or mixtures of matter in one or more differing phases. Further, although the term "object" is in the singular, it may refer to multiple items or detached parts or components. Thus, by way of non-limiting example, the term "object" may encompass such matter as food to be thawed or cooked; clothes or other material to be dried; frozen material (e.g., organs) to be thawed; chemicals to be reacted; fuel or other combustible material to be combusted; hydrated material to be dehydrated, gases to be expanded; liquids to be thawed, heated, boiled or vaporized, blood or blood components (e.g., blood plasma or red blood cells) to be thawed and/or warmed, materials to be manufactured, components to be connected, or any other material for which there is a desire to apply, even nominally, electromagnetic energy.

In accordance with some embodiments, an apparatus or method may involve the use of an "energy application zone". An energy application zone may be any location, region, void, or area where electromagnetic energy may be applied. It may include a hollow, and/or may be filled or partially filled with liquids, solids, gases, or combinations thereof. By way of example only, an energy application zone may include the interior of an enclosure, interior of a partial enclosure (e.g., conveyor belt oven), interior of a conduit, open space, solid, or partial solid, which allows for the existence, propagation, and/or resonance of electromagnetic waves. The zone may be permanent or may be temporarily constituted for purposes of energy application. For ease of discussion, all such energy application zones may alternatively be referred to as cavities, with the understanding that the term "cavity" implies no particular physical structure other than an area in which electromagnetic energy may be applied. Persons of ordinary skill in the art will appreciate that core, inventive principles of energy application discussed herein may be applied across various forms of energy application zones.

The energy application zone may be located in an oven, chamber, tank, dryer, thawer, dehydrator, furnace, cabinet, reactor, engine, chemical or biological processing apparatus, incinerator, material shaping or forming apparatus, conveyor, combustion zone, or any area where it may be desirable to apply energy. Thus, consistent with some embodiments, the electromagnetic energy application zone may be an electromagnetic resonator (also known as cavity resonator, resonant cavity, or simply "cavity" for short). The electromagnetic energy may be applied to an object when the object or a portion thereof is located in the energy application zone.

An energy application zone may have a predetermined shape that is otherwise determinable, so long as physical aspects of its shape are known at a time of energy application.

The energy application zone may assume any shape that permits electromagnetic wave propagations inside the energy application zone. For example, all or part of the energy application zone may have a cross-section that is spherical, hemisphere, rectangular, toroidal, circular, triangular, oval, pentagonal, hexagonal, octagonal, elliptical, or any other shape or combination of shapes. It is also contemplated that the energy application zone may be closed, i.e., completely enclosed by conductor materials, bounded at least partially, or open, i.e., having non-bounded openings. The general methodology of the invention is not limited to any particular cavity shape, configuration, or degree of closure of the energy application zone, although in some applications, a high degree of closure may be preferred.

By way of example, an energy application zone, such as cavity 20, is illustrated schematically in FIG. 1, where object 50 is positioned in cavity 20. It is to be understood that object 50 need not be completely located in the energy application zone. That is, object 50 is considered "in" the energy application zone if at least a portion of the object is located in the zone.

In accordance with some embodiments, the energy application zone may support at least one resonant wavelength (e.g., electromagnetic waves of at least one wavelength may resonate in the energy application zone). For example, cavity 20 may be designed with dimensions permitting it to be resonant in a predetermined range of frequencies (e.g., the UHF or microwave range of frequencies, for example between 300 MHz and 3 GHz, or between 100 MHz and 1 GHZ). Depending on the intended application, the dimensions of cavity 20 may also be designed to permit resonances in other ranges of frequencies in the electromagnetic spectrum. The term "resonant" or "resonance" refers to the tendency of electromagnetic waves to oscillate in the energy application zone at larger amplitudes at some frequencies (known as "resonance frequencies") than at others. Electromagnetic waves resonating at a particular resonance frequency may have a corresponding "resonance wavelength" that is inversely proportional to the resonance frequency, determined via $\lambda=c/f$, where $\lambda$ is the resonance wavelength, f is the resonance frequency, and c is the propagating speed of the electromagnetic waves in the energy application zone. The propagating speed may change depending on the medium through which the wave propagates through. Therefore, when the energy application zone comprises more than one material, c may not be uniquely defined. Nevertheless, the resonance wavelength may be uniquely determined using a slightly different relation, including, for example, using an estimation based on c of the major component or an average of the c of miscellaneous components, or any other technique known in the art.

Figure 2A:
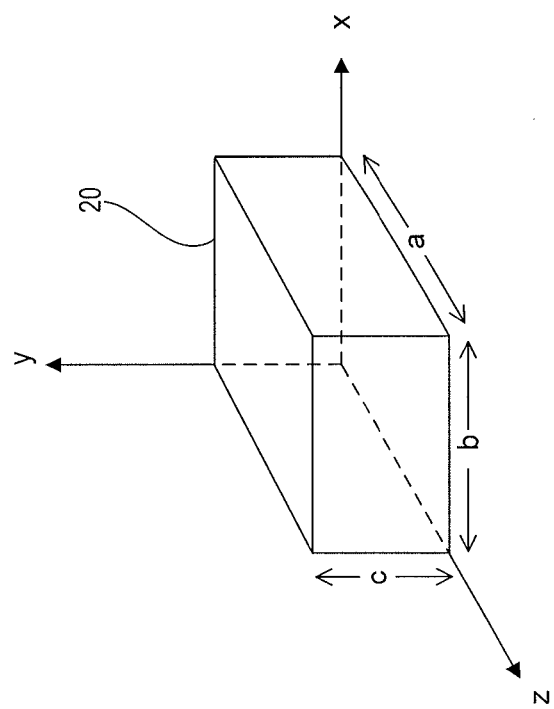
FIGS. 2A and 2B illustrates a rectangular cavity in a Cartesian coordinate system and a cylindrical cavity in a cylindrical coordinate system, respectively, in accordance with exemplary disclosed embodiments.

Among the resonant wavelengths that are supported by the energy application zone, there may be a largest resonant wavelength. The largest resonant wavelength may be determined uniquely by the geometry of the energy application zone. In some embodiments, the largest resonant wavelength of any given energy application zone may be determined or estimated experimentally, as known in the art, mathematically and/or by simulation. By way of example, FIG. 2A illustrates a rectangular cavity 20 of dimensions length a, width b, and height c. Cavity 20 may support a plurality of resonant wavelengths, the largest resonant wavelength among which may be named $\lambda_0$. If a>b>c, then the largest resonant wavelength $\lambda_0$ is given by $$\frac{2ab}{\sqrt{a^2+b^2}}.$$

Figure 2B:
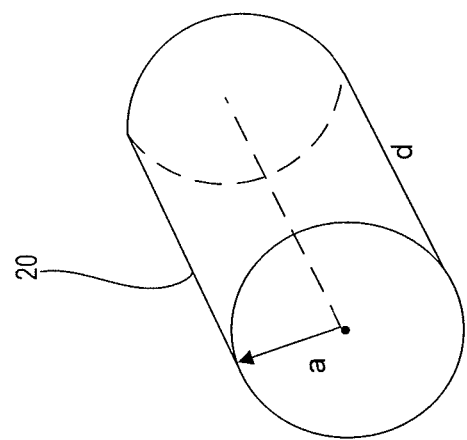

By way of another example, if the energy application zone is a cubic of dimensions a×a×a, then the largest resonant wavelength is given by $\sqrt{2}a$. In yet another example, as shown in FIG. 2B, the energy application zone may be a cylinder of radius a and length d. In this case, the largest resonant wavelength is given by $$\frac{2\pi a}{2.405}$$

if 2a>d, and $$\frac{2\pi a}{\sqrt{1.841^2+\left(\frac{\pi a}{d}\right)^2}}$$

if 2a<d. In another example, if the energy application zone is a sphere of radius a, then the largest resonant wavelength is given by $$\frac{2\pi a}{2.744}.$$

In accordance with some embodiments, an apparatus or method may involve the use of an electromagnetic energy source, also referred to herein in short as "a source," configured to deliver electromagnetic energy to an energy application zone. A "source" may include any component(s) that are suitable for generating and supplying electromagnetic energy, for example, power supply(s), wave guide(s), and/or radiating element(s). Consistent with some embodiments, electromagnetic energy may be supplied to the energy application zone in the form of propagating electromagnetic waves at predetermined wavelengths or frequencies (also known as electromagnetic radiation). As used herein, "propagating electromagnetic waves" may include resonating waves, evanescent waves, and waves that travel through a medium in any other manner. Electromagnetic radiation carries energy that may be imparted to (or dissipated into) matter with which it interacts.

By way of example, in the embodiment illustrated in FIG. 1, the source may include one or more of a power supply 12 and radiating elements 18. For simplicity of the drawing, the source is not explicitly marked in the figure. Power supply 12 may be configured to generate electromagnetic waves that carry electromagnetic energy. For example, power supply 12 may include electromagnetic energy generating components, for example, a magnetron configured to generate high power microwave waves at a predetermined wavelength or frequency. Alternatively or additionally, power supply 12 may include a semiconductor oscillator, such as a voltage controlled oscillator, configured to generate AC waveforms (e.g., AC voltage or current) with a controllable frequency. AC waveforms may include sinusoidal waves, square waves, pulsed waves, triangular waves, or another type of waveforms, possibly with alternating polarities. Alternatively or additionally, a source of electromagnetic energy may include any other power supply, such as electromagnetic field generator, electromagnetic flux generator, or any mechanism for generating vibrating electrons.

In some embodiments, the apparatus may include at least one modulator 14 configured to modify one or more characteristic parameters of the electromagnetic waves generated by power supply 12, in a controlled manner. The modulator may or may not be part of the source. For example, modulator 14 may be configured to modify one or more parameters of a periodic waveform, including amplitude (e.g., an amplitude difference between different waves being supplied simultaneously by different radiating elements), phase, and frequency.

In some embodiments, modulator 14 may include at least one of a phase modulator, a frequency modulator, and an amplitude modulator configured to modify the phase, frequency, and amplitude of the AC waveform, respectively. In some embodiments, modulator 14 may be integrated as part of power supply 12 or the source, such that the AC waveforms generated by power supply 12 may have at least one of a varying frequency, a varying phase, and a varying amplitude over time.

The apparatus may also include an amplifier 16 for amplifying, for example, the AC waveforms before or after they are modified by modulator 14. The amplifier may or may not be part of the source. Amplifier 16 may be, for example, a power amplifier including one or more power transistors. As another example, amplifier 16 may be a step-up transformer having more turns in the secondary winding than in the primary winding. In other embodiments, amplifier 16 may also be a power electronic device such as an AC-to-DC-to-AC converter. Alternatively or additionally, amplifier 16 may include any other device(s) or circuit(s) configured to scale up an input signal to a desired level.

The apparatus may also include at least one radiating element 18 configured to transmit the electromagnetic energy to object 50. The radiating element may or may not be part of the source. Radiating element 18 may include one or more waveguides and/or one or more antennas (also known as power feeds) for supplying electromagnetic energy to object 50. For example, radiating element 18 may include slot antennas. Additionally or alternatively, radiating element 18 may also include waveguides or antennas of any other kind or form, or any other suitable structure from which electromagnetic energy may be emitted.

Power supply 12, modulator 14, amplifier 16, and radiating elements 18 (or portions thereof) may be separate components. Alternatively, any combination of one or more of these elements may be integrated as a single component. Power supply 12, modulator 14, amplifier 16, and radiating element 18 (or portions thereof) may be parts of the source. For example, a magnetron may be used as power supply 12 to generate electromagnetic energy, and a waveguide may be physically attached to the magnetron for transmitting the energy to object 50. Alternatively or additionally, the radiating element may be separate from the magnetron. Similarly, other types of electromagnetic generators may be used where the radiating element may be for example either physically separate from or part of the generator or otherwise connected to the generator.

In some embodiments, more than one radiating element may be provided. The radiating elements may be located on one or more surfaces defining the energy application zone. Alternatively, radiating elements may be located inside and/or outside the energy application zone. When the radiating elements are located outside the zone, they may be coupled to elements that would allow the radiated energy to reach the energy application zone. Elements for allowing the radiated energy to reach the energy application zone may include, for example, wave guides and/or antennas. The orientation and configuration of each radiating element may be distinct or may be the same, as may be required for obtaining a desired energy distribution (which may also be referred to as an energy application goal) in the energy application zone. As used herein, an energy application goal may include any desired spatial energy distribution, and/or any desired spatial energy accumulation over time. The energy application goal may be defined with respect to an object, or more generally with respect to a space associated with an energy application zone. Furthermore, the location, orientation, and configuration of each radiating element may be determined before applying energy to object 50, or dynamically adjusted using a processor while applying energy. Embodiments of the present disclosure are not limited to radiating elements having particular structures or which are necessarily located in particular areas or regions. In certain embodiments, however, radiating elements may be placed in certain places, and/or the amplitudes of waves emitted from different radiating elements may be selected in accordance with their location, orientation, and/or configuration. It is noted that the terms "region" and "area" are used herein interchangeably, to refer to any particular extent of space or surface area.

In addition to radiating electromagnetic energy, one or more radiating element(s) 18 may also be configured to receive electromagnetic energy. In other words, as used herein, the term "radiating element" broadly refers to any structure from which electromagnetic energy may radiate and/or by which electromagnetic energy may be received, regardless of whether the structure was originally designed for the purposes of radiating or receiving energy, and regardless of whether the structure serves any additional function. Thus, an apparatus or method in accordance with some embodiments may involve the use of one or more detectors configured to detect signals associated with electromagnetic waves received by the one or more radiating elements. For example, as shown in FIG. 1, a detector 40 may be coupled to radiating elements 18 that, when functioning as receivers, receive electromagnetic waves from cavity 20.

As used herein, the term "detector" may include an electric circuit that measures or senses one or more parameters associated with electromagnetic waves. For example, such a detector may include a power meter configured to detect a level of the power associated with the incident, reflected and/or transmitted electromagnetic wave (also known as "incident power," "reflected power," and "transmitted power," respectively), an amplitude detector configured to detect an amplitude of the wave, a phase detector configured to detect a phase of the wave (e.g., phase difference between waves simultaneously emitted by two radiating elements, or other phase differences), a frequency detector configured to detect a frequency of the wave, and/or any other circuit suitable for detecting a characteristic of an electromagnetic wave.

An incident power may be supplied to a radiating element functioning as a transmitter by the source, and then emitted into or applied to the energy application zone 20 by the transmitter. Of the incident power, a portion may be dissipated or absorbed by the object (referred to herein as "dissipated power"). Another portion may be reflected at the radiating element (referred to herein as "reflected power"). Reflected power may include, for example, power reflected back to the radiating element via the object and/or the energy application zone. Reflected power may also include power retained by the port of the radiating element (i.e., power that is emitted by the antenna but does not flow into the zone). The rest of the incident power, other than the reflected power and dissipated power, may be transmitted to one or more radiating element functioning as receivers (referred to herein as "transmitted power"). Energy may also leak to other places, such as into the walls of the cavity, through the door, etc. For simplicity, these portions of the energy are not discussed herein. In some embodiments, it may be estimated that these portions of the energy are substantially low and may be negligible.

In some embodiments, the detector may include a directional coupler, configured to allow signals to flow from the amplifier to the radiating elements when the radiating elements function as transmitters (e.g., when the radiating elements radiate energy), and to allow signals to flow from the radiating elements to the detector when the radiating elements function as receivers (e.g., when the radiating element receive energy). Additionally or alternatively, the directional coupler may be further configured to measure the power of a flowing signal. In some embodiments, the detector may also include other types of circuits that measure the voltage and/or current at the ports, for example, a circulator.

In accordance with some embodiments, the source may be configured to deliver (supply) electromagnetic energy at a predetermined wavelength (denoted as $\lambda_1$) to the object in the energy application zone, wherein the predetermined wavelength is greater than about one quarter of the largest resonant wavelength supported by the energy application zone (denoted as $\lambda_0$). This relationship between the largest resonant wavelength and the wavelength of the delivered electromagnetic energy may be referred to as the "modal condition". In some embodiments, the source may be configured to supply electromagnetic energy to cavity 20 at a set of predetermined wavelengths, the largest wavelength among which is $\lambda_0$. The modal condition may be characterized as $\lambda_1 \geq \lambda_0/4$. In other embodiments, a different relationship between the wavelength of the applied electromagnetic energy supplied by the source and the largest resonant wavelength supported by the energy application zone may be applied in order to meet the modal condition. In some embodiments, for example, the modal condition may be met when low order modes are excited, e.g., m×n is below 30, 40, or 50 (wherein m and n are integers representing the mode number in different axes, e.g., x and y). The source is not necessarily limited to configurations that supply electromagnetic energy at a single predetermined wavelength. Optionally, the source may be configured to supply electromagnetic energy to cavity 20 at a set of wavelengths, which may, for example, be determined before energy application begins. When the source supplies energy to the cavity at varying frequencies, the largest wavelength among the varying frequencies may be denoted $\lambda_1$, and the modal condition may be characterized as $\lambda_1 \geq \lambda_0/4$. In some embodiments, $\lambda_1$ may also have an upper limit, for example, it may be smaller or equal $\lambda_0$.

Alternatively, the modal condition may be expressed in terms of frequency because there is a relationship between wavelengths $\lambda_1$ and $\lambda_0$ and their corresponding frequencies $f_1$ and $f_0$, such that $f_1 = c/\lambda_1$ and $f_0 = c/\lambda_0$. Since $\lambda_0$ is the largest resonant wavelength that may excite a mode in the energy application zone, its corresponding frequency $f_0$ is the lowest resonant frequency. In some embodiments, the largest resonant wavelength may be known in advance (e.g., programmed into the processor). Therefore, the modal condition may be expressed as $f_1 \leq 4f_0$, that is, the electromagnetic energy may be applied at a predetermined frequency that is lower than about four times the lowest resonance frequency in the energy application zone.

In addition, because the largest resonant wavelength $\lambda_0$ has a unique relationship with the dimensions of the energy application zone, the modal condition may also be expressed as a relationship between the dimension(s) of the energy application zone and the applied wavelength $\lambda_1$. For example, for rectangular cavity 20 having length, width, and height, a, b, and c respectively, and wherein a>b>c (shown for example in FIG. 2), the modal condition may be expressed as $$\lambda_1 \geq \frac{ab}{2\sqrt{a^2 + b^2}}.$$

As another example, for a cubic cavity having dimensions a×a×a, the modal condition may be expressed as $$\lambda_1 \geq \frac{\sqrt{2}\, a}{4}.$$

As another example, for spherical cavity having radius a, the modal condition may be expressed as $$\lambda_1 \geq \frac{\pi a}{3.733}.$$

An apparatus operating at wavelengths that, together with the dimensions of the cavity satisfy a "modal condition" is referred to herein as a "modal apparatus," and its cavity is referred herein as a "modal cavity". In some embodiments, a modal apparatus is configured to operate only in a range of wavelengths that satisfy the modal condition of its cavity. In some embodiments, the apparatus may be configured to operate both in wavelengths that satisfy the modal condition, and in wavelengths that do not satisfy this condition. Referral to such an apparatus as a modal or non-modal apparatus depends on the wavelength at which it is operated.

In some embodiments, cavity 20 may be degenerate. The energy application zone 20 may be configured in a degenerate shape, such as those shapes illustrated in FIGS. 14A-14D. The degenerate shape, as described later in greater detail, may be used to enable multiple resonant modes to be excited using a single frequency. That is, a frequency of electromagnetic radiation emitted by the source may be held constant, and yet two or more distinct resonant modes may be excited. In some embodiments, energy application may be controlled, e.g. by processor 30, to excite only one of the two or more modes that are excitable at the same frequency. This may be done, for example, by positioning the radiating elements to excite and/or reject certain modes, as described in greater detail bellow.

Conceptually, the result of such control is exemplified in FIGS. 3A and 3B. FIG. 3A conceptualizes one resonant mode ($TE_{104}$) achieved using a predetermined frequency, while FIG. 3B conceptualizes a second and distinct resonant mode ($TE_{401}$) achieved using the same predetermined frequency. FIGS. 3A and 3B illustrate the field intensities of $TE_{104}$ and $TE_{401}$, respectively. In the example of FIGS. 3A and 3B, while the frequency was held constant, another variable (e.g., phase, relative amplitude, or position of the radiating element emitting the energy) was varied in order to achieve the second mode.

Because the modes exhibit predictable areas of energy intensity, the ability to generate and control the modes permits control of energy applied in the energy application zone.

In some embodiments, the modes of FIGS. 3A and 3B may be applied simultaneously, in which case the dashed areas (illustrating higher energy regions, which may also be referred to as "hot spots"), may be obtained at a different angle with respect to the x axis. For example, when the two modes are applied at equal amplitudes, a "diagonal" field pattern, as illustrated in FIG. 3C may be obtained. The "diagonal" field pattern is a linear combination of the two modes $TE_{104}$ and $TE_{401}$. Thus, if the electrical field pattern shown in FIG. 3A is denoted as $E_{3A}$, and the electrical field pattern shown in FIG. 3B is denoted as $E_{3B}$, and the electrical field pattern shown in FIG. 3C is denoted as $E_{3C}$, then $E_{3C} = \frac{1}{2} E_{3A} + \frac{1}{2} E_{3B}$. That is, $E_{3C}$ can be obtained by the summation of $E_{3A}$ and $E_{3B}$ with equal weights. FIG. 3C illustrates the field intensities of $E_{3C}$. If the weights are different, the angle may also be different. If the weights are varied over time in an appropriate manner, the field pattern may rotate in the energy application zone. For example, if $E_{3C}$ changes in time according to the equation $E_{3C} = \sin(\alpha t)$ $E_{3A}$+cos($\alpha$t) $E_{3B}$, the field rotates at constant angular frequency of $\alpha$ rounds per second. Such rotation of the field pattern may be useful to achieve a more uniform time-averaged heating in the energy application zone than what may be achievable using a combination that is constant over time. Replacing the weights sin($\alpha$t) and cos($\alpha$t) with constants, which do not vary in time, may freeze the field pattern to achieve a desired non-uniformity, for example, of the kind illustrated in FIG. 3C.

Figure 4B:
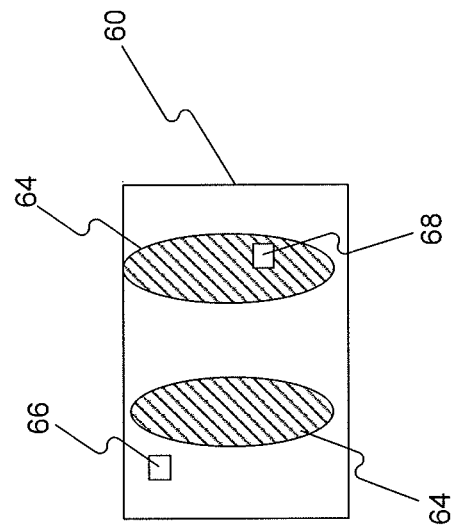
FIGS. 4A-4D illustrate exemplary field patterns in a modal cavity consistent with principles of some embodiments.
Figure 4A:
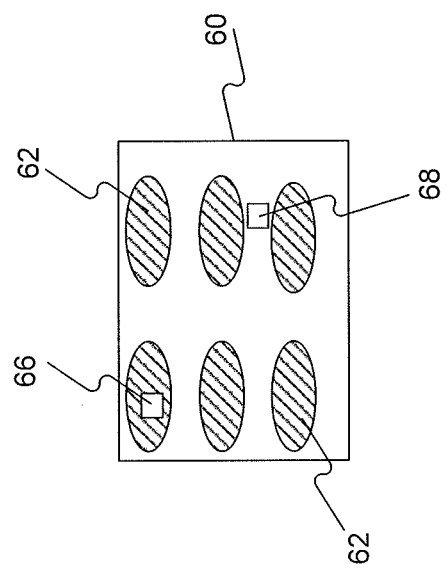

By its nature, an electromagnetic field tends to be distributed in an uneven field pattern in the energy application zone. That is, a spatial distribution of electrical field intensity in the energy application zone may be uneven. A field pattern may be substantially stable in space over time, or spatially varying in a known manner over time. A field pattern may result in areas with relatively high amplitude of electrical field intensity (corresponding to maxima or minima in the field amplitude) which are referred to herein as "hot spots." Examples of hot spots are illustrated by the shaded regions in FIGS. 4A-4B. A field pattern may also result in areas with relatively low amplitude of electrical field intensity (e.g., zero or near zero values), referred to herein as "cold spots". Examples of cold spots are illustrated by the non-shaded areas in FIGS. 4A-4B. It is hereby noted that while FIGS. 4A-4B diagrammatically illustrate hot spots as having a clear and defined border, in reality the intensity changes in a more gradual manner between hot spots and cold spots. The field pattern itself may be a function of many factors (as discussed later), including the physical characteristics and dimensions of the energy application zone. The relatively high amplitude of electrical field intensity may be higher than a first threshold and the relatively low amplitude of electrical field intensity may be lower than a second threshold. The second threshold may be the same or different from the first threshold. In some embodiments, the thresholds may be predetermined such that field intensity lower than the threshold may not effectively transfer energy to the object. It is however noted that energy transfer to the object may occur in all regions of the object that coincide with regions of the field pattern, where the field pattern has non-zero field intensity and is not necessarily limited to areas coinciding with hot spots. The extent to which the object is heated may depend, among other things, on the intensity of the field to which the object is exposed and the duration of exposure. For example, the second threshold may be selected as being close to the minimum value of the field intensity. As used herein, the term "amplitude" is interchangeable with "magnitude."

In the energy application zone, a particular region may be covered by the relatively high amplitude of electrical field intensity (hot spots) of some field patterns, and relatively low amplitude of electrical field intensity (cold spots) of some other field patterns. Field patterns may be selectively chosen to target energy application or delivery to selected regions of the energy applications zone. Energy applications to any two regions in a working volume may be differentiated from each other due to non-uniform distributions of high and low field intensities in each field pattern. Therefore, in accordance with some embodiments, the source may be configured to apply electromagnetic energy in a manner causing cold spots in predetermined areas of the energy application zone, such as is illustrated, for example, by the non-shaded areas in FIGS. 4A-4B.

In modal cavity 60, as illustrated in FIGS. 4A and 4B, field patterns may be excited such that each has a plurality of areas with high amplitudes of intensity (hot spots) 62 and 64 (shaded areas) and areas with low amplitudes of intensity (cold spots; non-shaded areas). A variety of "modes" may be excited in a given modal cavity. Modes are a set of spatial field patterns that are linearly independent from each other and orthogonal to one another. As referred to herein, two field patterns are orthogonal to each other if the integral of the scalar product of the two fields associated with the two modes over the energy application zone is zero. A mode or a combination of modes (i.e., a general field pattern), may be of any known type, including propagating, evanescent, and resonant. In some embodiments, the excited field pattern includes a combination of mainly resonant modes.

Any field pattern that may be excited in an energy application zone may be represented mathematically as a linear combination of modes. The modes may include an infinite number of evanescent modes and a finite number of propagating modes (some of which may be resonant modes). In general, fewer propagating modes may be excited in a modal cavity than in a non-modal cavity. In other words, a modal cavity may support, in general, fewer propagating modes than a non-modal cavity. Again, some of the supported propagating modes may be resonant modes. By nature, the evanescent modes have a very small percent of power (or energy) out of the total power (or energy) used to excite the field pattern, and the vast majority of the total power (and energy) is carried by propagating modes.

In FIGS. 4A and 4B, if objects 66 and 68 are placed in energy application zone 60 as depicted in the drawings, with a desire to apply energy only to object 66 and to avoid applying energy to object 68, the field pattern of FIG. 4A may be chosen. Alternatively, if there is a desire to apply energy to object 68 and to avoid applying energy to object 66, the field pattern of FIG. 4B may be chosen.

Thus, in one respect, some aspects may involve purposefully choosing field pattern (e.g., by choosing MSEs) in order to purposefully regulate the amplitude of electrical field intensity applied to a specific area within an energy application zone. These areas may permit controlled application of energy because, when it is desired to avoid applying energy to a portion of an object, that portion may be aligned with an area having relatively low amplitude of electrical field intensity (cold spots). Alternatively, the device may be operated to achieve cold spots at the portion to be less heated (e.g., an electromagnetic field that has relatively low amplitude of electrical field intensity at the area aligned with the portion may be excited). For example, by choosing to excite the field pattern as shown in FIG. 4A, one may avoid heating object 68, while one may heat object 68 by choosing to excite the field pattern as shown in FIG. 4B. Thus, when it is desired to apply energy to a portion of an object, that portion can be aligned with an area with relatively high amplitude of electrical field intensity.

If a user desires to apply twice the amount of energy to object 66 than to object 68, the field patterns of both FIG. 4A and FIG. 4B may be used, with the two patterns being applied for such durations and powers, that the product of duration and power is twice as large for the pattern illustrated in FIG. 4A as for the pattern illustrated in FIG. 4B. For example, the duration for which the pattern illustrated in FIG. 4A is applied may be twice than that of FIG. 4B, and the power levels may be the same. In another example, the pattern illustrated in FIG. 4A may be applied at double the power level for the same amount of time (assuming that the fields have similar intensities in the two shaded areas that overlap with objects 66 and 68). If the field intensities are different in the shaded areas, the difference in intensities may be factored in. The relative intensity and duration for which electromagnetic fields of the different patterns are applied may be controlled by simultaneously or sequentially exciting the field patterns of FIGS. 4A and 4B.

Returning to FIG. 1, it is a schematic diagram of an apparatus for applying electromagnetic energy to an object, in accordance with some embodiments. The Apparatus of FIG. 1 may be configured to control a distribution and intensity of high amplitude electromagnetic field intensity (corresponding to maxima and minima in the electromagnetic field—hot spot) and low amplitude electromagnetic field intensity (cold spots) in the energy application zone, thus applying specified differing amounts of energy to any two (or more) given regions in an energy application zone. Such control can be obtained through the selection of "MSEs" (as described later). Choices of MSE selection may impact how energy is distributed (e.g., spatially distributed) in regions of the energy application zone. When the modal condition is not met, it may be more difficult to achieve a desired energy application distribution through the control of MSEs. While the modal condition may be used in combination with MSE control, the modal condition may also provide benefit even if not used with MSE control. Conversely, MSE control may be applied even if the modal condition is not met.

As noted above, the term "modulation space" or "MS" is used to collectively refer to all the parameters that may affect a field pattern in the energy application zone and all combinations thereof. In some embodiments, the MS may include all possible components that may be used and their potential settings (either absolute or relative to others) and adjustable parameters associated with the components. For example, the MS may include a plurality of variable parameters, the number of antennas, their positioning and/or orientation (if modifiable), the useable bandwidth, a set of all useable frequencies and any combinations thereof, power settings, phases, etc. The MS may have any number of possible variable parameters, ranging from one parameter (e.g., a one dimensional MS limited to frequency only or phase only—or another single parameter), to two parameters (e.g., varying frequency and amplitude together within the same MS), or more.

Examples of energy application zone-related MSs may include the dimensions and shape of the energy application zone and the materials from which the energy application zone is constructed. Examples of energy source-related MSEs may include amplitude, frequency, and phase of the applied energy. Examples of radiating element-related MSEs may include the type, number, size, shape, configuration, orientation and placement of the radiating elements.

Figure 5:
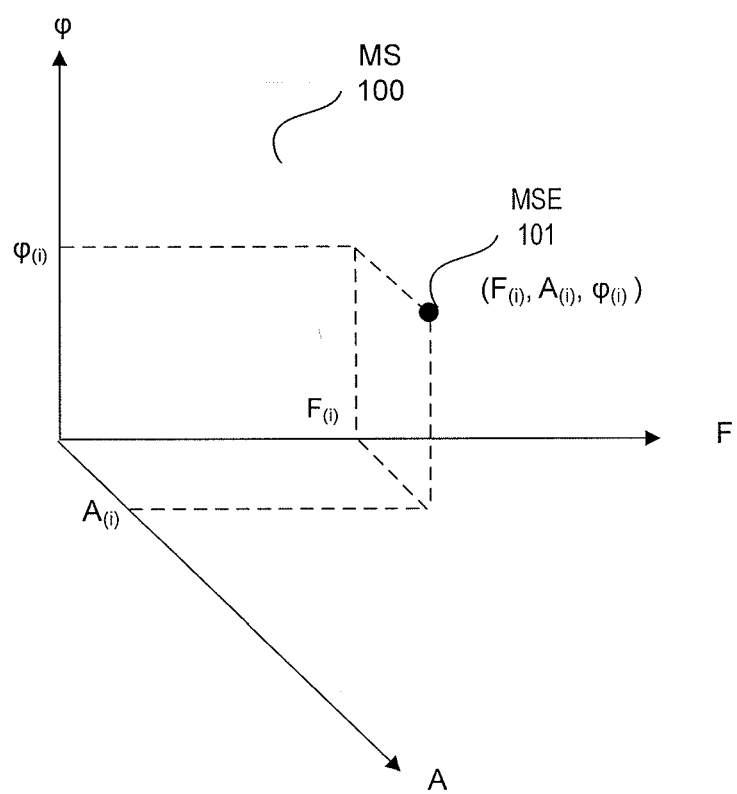
FIG. 5 illustrates an exemplary modulation space consistent with principles of some embodiments.

Each variable parameter associated with the MS is referred to as an MS dimension. By way of example, FIG. 5 illustrates a three dimensional modulation space 100, with three dimensions designated as frequency (F), phase (y), and amplitude (A). That is, in MS 100, frequency, phase, and amplitude of the electromagnetic waves may be modulated during energy application, while all the other parameters may be predetermined and fixed during energy application. An MS may also be one dimensional where only one parameter is varied during the energy application, or any other higher-dimensional where more than one parameter is varied.

As further noted above, the term "modulation space element" or "MSE," may refer to a specific set of values of the variable parameters in MS. Therefore, the MS may also be considered to be a collection of all possible MSEs. For example, two MSEs may differ one from another in the relative amplitudes of the energy being supplied to a plurality of radiating elements. For example, FIG. 5 shows an MSE 101 in the three-dimensional MS 100. MSE 101 has a specific frequency F(i), a specific phase $\phi(i)$, and a specific amplitude A(i). If even one of these MSE variables changes, then the new set defines another MSE. For example, (3 GHz, 30°, 12 V) and (3 GHz, 60°, 12 V) are two different MSEs, although only the phase component changes.

Differing combinations of these MS parameters may lead to differing field patterns across the energy application zone and differing energy distribution patterns with respect to the object. A plurality of MSEs that can be executed sequentially or simultaneously to excite a particular field pattern in the energy application zone may be collectively referred to as an "energy delivery scheme." For example, an energy delivery scheme may consist of three MSEs (F(1), $\phi(1)$, A(1)), (F(2), $\phi(2)$, A(2)), (F(3), $\phi(3)$, A(3)). Since there are a virtually infinite number of MSEs, there are a virtually infinite number of different energy delivery schemes, resulting in virtually infinite number of differing field patterns in any given energy application zone (although different MSEs may at times cause highly similar or even identical field patterns). Of course, the number of differing energy delivery schemes may be, in part, a function of the number of MSEs that are available. The present disclosure, in its broadest sense, is not limited to any particular number of MSEs or MSE combinations. Rather, the number of options that may be employed could be as few as two to as many as the designer desires, depending on factors such as intended use, level of desired control, hardware or software resolution and cost. For example, exciting a larger number of differing field patterns, which may allow a more subtle design of a field pattern in the energy application zone, may require a larger number of MSEs. In such cases, at least 3 MSEs may be required, for example, 3, 4, or 5 MSEs. In some embodiments, the number of MSEs may be very large, but only few of them may be used for excitation. For example, 400 different frequencies may be available, only five of which may be used in a given energy application cycle. These five frequencies may, for example, be MSEs that cause the excitation of different resonating modes in the energy application zone.

As used herein, the term "energy application cycle" may be any time duration that may repeatedly occur during an energy application process, which may be the time elapsing from the moment energy application starts to the moment it ends, for example, from turning on the electromagnetic energy source until it is turned off. For example, an energy application cycle may be the time duration during which a particular MSE is applied. In another example, an energy application cycle may be the time when a group of MSEs are applied. In some embodiments, an energy application cycle may begin with the beginning of an MSE sweep and end with the ending of the same sweep. In some embodiments, an energy application cycle may be the duration between two readings of feedback from the energy application zone, during which energy is applied, continuously or not. In some embodiments, the energy application cycle may have a duration of less than about one minute. In some embodiments, the energy application cycle may have a duration of less than about one second. A time duration of energy application cycle may be selected depending on desired energy delivery scheme. During an energy application cycle, the processor may alter the power, application time, or the combination of them in order to alter an amount of energy applied to a region in the energy application zone. In another example, the processor may alter a set of MSEs in order to alter the amount of energy applied to a region. In some embodiments, the at least one processor may be configured to apply energy to the energy application zone a plurality of times during an energy application cycle. For example, multiple MSEs may be selected to apply energy to a group of regions to achieve a predetermined amount of energy delivery during an energy application cycle. The field patterns corresponding to these MSEs may overlap with each other. In this case, the overlapping region may receive multiple energy applications when multiple MSEs are applied.

An apparatus or method of the invention may involve the use of a processor. As used herein, the term "processor" may include an electric circuit that executes one or more instructions. For example, such a processor may include one or more integrated circuits, microchips, microcontrollers, microprocessors, all or part of a central processing unit (CPU), graphics processing unit (GPU), digital signal processors (DSP), field-programmable gate array (FPGA) or other circuit suitable for executing instructions or performing logic operations.

The instructions executed by the processor may, for example, be pre-loaded into the processor or may be stored in a separate memory unit such as a RAM, a ROM, a hard disk, an optical disk, a magnetic medium, a flash memory, other permanent, fixed, or volatile memory, or any other mechanism capable of providing instructions to the processor. The processor(s) may be customized for a particular use, or may be configured for general-purpose use and perform different functions by executing different software instructions.

If more than one processor is employed, all may be of similar construction, or they may be of differing constructions electrically connected or disconnected from each other. They may be separate circuits or integrated in a single circuit. When more than one processor is used, they may be configured to operate independently or collaboratively. They may be coupled electrically, magnetically, optically, acoustically, mechanically, wirelessly or in any other way permitting at least one signal to be communicated between them.

A single or multiple processor may be provided for the sole purpose of regulating the source. Alternatively, a single or multiple processor may be provided with the function of regulating the source in addition to providing other functions. For example, the same processor(s) used to regulate the source may also be integrated into a control circuit that provides additional control functions to components other than the source.

Consistent with presently disclosed embodiments, a processor may be configured to apply a plurality of electromagnetic field patterns to the object in the energy application zone. The term "field pattern" may refer to spatial distribution of electrical field intensity in the energy application zone. A field pattern may be substantially stable in space over time, or spatially varying in a known (or unknown) manner over time. The pattern in which energy is distributed may be a function of the physical characteristics of the energy application zone, controllable aspects of the energy source, and/or the type, configuration, orientation, and placement of the radiating elements. In addition, the pattern in which energy is distributed may be affected by other variables such as the presence of field altering structures (e.g., field adjusting elements, dielectric lenses, and/or loads). A field adjusting element may be any element made of a material, which is known to perturb electromagnetic fields. For example, metal, other conductor, dielectric, dielectric load with metals, etc. In some embodiments, the object may function as a field adjusting element. A field adjusting element may also refer to any element, which may be controlled to affect the field excited in the energy application zone (e.g., in a way that selectively directs the electromagnetic energy from one or more of radiating elements into the object).

For any given energy application zone, a set of known field patterns may be achieved by, for example, varying the frequency, phase, and/or amplitude or one or more energy sources; varying the type, configuration, number and/or placement of one or more radiating elements; adjusting FAEs (Field Adjusting Elements); adjusting dielectric lenses; or other means.

In accordance with some embodiments, at least one processor may be configured to regulate the source in order to apply a first predetermined amount of energy to a first region and a second predetermined amount of energy to a second region in the energy application zone. The first and second predetermined amounts of energy may be any non-zero amounts of energy. In some embodiments, the first and second predetermined amounts of energy are mutually different.

Here, and elsewhere in the present disclosure and claims, when a processor is configured to take an action in order to achieve a purpose, operating the processor achieves the purpose, at least in some embodiments or at least some of the operation time. Thus, in some embodiments, the at least one processor may be configured to regulate the source such that a first non-zero amount of energy is delivered to a first region and a second non-zero amount of energy is delivered to a second region in the energy application zone, wherein the first and second amounts are different.

The difference between the first amount of energy and the second amount of energy may be significant, for example, one of the amounts of energy may be larger than the second one by at least 20%. In some embodiments, the difference is of at least 30%, at least 50%, or at least 100%. In some embodiments, the difference is larger or intermediate to the above-recited differences.

By way of example, and as described later in greater detail herein, field patterns may be selected having known areas of energy intensity, referred to as hot spots. Thus, by aligning a hot spot with a region in an energy application zone, and applying specific amount of energy over an EM wave having a hot spot in that region, a first non-zero specified amount of energy may be applied to the first region. When another field pattern is chosen having a differing hot spot location, that second field pattern may result in application of a second specified non-zero amount of energy to the second region. And as also described herein, differing MSEs and/or combinations of MSEs may be chosen in order to apply differing specified amounts of energy to differing regions. In either instance, control of the amount of energy applied may be achieved through either the selection of particular field patterns or MSEs, and/or control of, for example, power level, duration of time that power is applied during a particular condition, or combinations of the above. The processor may make such selections in order to achieve a desired energy delivery scheme.

The term "region" may include any portion of an energy application zone, such as a cell, sub-volume, sub-division, discrete sub-space, or any subset of the energy application zone, regardless of how that subset is discretized. In one particular example, the energy application zone may include two regions. In another example, the energy application zone may include more than two regions. The regions may or may not overlap with each other, and the size of each region may or may not be the same.

Alternatively or additionally, at least one processor may be configured to predetermine the locations of the first region and the second region. This may occur, for example, through reflective feedback from the energy application zone, providing information about a location of an object in the zone. In other embodiments, this might be achieved through imaging. In some embodiments, this may be achieved by one or more inputs provided by a user operating the apparatus. In some embodiments, the regions may correspond to different portions of the object, and differing targeted amounts of electromagnetic energy may be applied to these different portions of the object. The amount of energy actually dissipated in each region may depend on the field intensity at that region and/or the absorption characteristics of the corresponding portion of the object at that particular region. The terms "dissipated" and "absorbed" are used herein interchangeably. Alternatively or additionally, the predetermined locations may be a function of known geometry of a field pattern without reference to an object in the energy application zone. In some embodiments, locations of the first region and the second region may also be predetermined by a user or a device other than the at least one processor.

Two regions may be located adjacent to each other in the energy application zone. For example, the energy application zone may include a region occupied by an object or a portion of an object, and another region defining an area distinct from that object or portion. In some embodiments, these two regions may be adjacent to each other and separated by a boundary. For example, the first region may be within a jelly doughnut being heated, and the second region may be outside of the jelly doughnut. In another example, the energy application zone may include two regions that have different energy absorption characteristics within the object. For example, the first region may contain mostly jam at the inside of a jelly doughnut, and the second region may contain mostly pastry. Because of their differing energy absorption characteristics, it may be beneficial to excite field patterns with differing electrical field intensities at these two regions. Based on the difference in the local field intensities and the energy absorption characteristics of the two regions, the dissipated energy in each of the regions may be predetermined. Accordingly, the dissipated energy may be made substantially equal or different, as desired, across differing regions in the object, by selecting and controlling MSEs for constructing a suitable energy delivery scheme for applying the energy.

MSE selection may impact how energy is distributed in regions of the energy application zone. In order to apply differing targeted amounts of electromagnetic energy to differing predetermined regions in the energy application zone, the processor may control one or more MSEs in order to achieve a field pattern that targets energy to a specific predetermined region in the energy application zone. The selection of MSEs that result in standing waves may provide an added measure of control since standing waves tend to exhibit predictable and distinctly defined "high-intensity regions" (hot spots) and "low-intensity regions" (cold spots), as described earlier, where the a high-intensity region may exhibit an energy concentration that is readily distinguishable from a low-intensity region. Examples of hot spots are illustrated by the shaded regions in FIGS. 4A-4D. Examples of cold spots are illustrated by the non-shaded areas in FIGS. 4A-4D. It is to be understood that the term "cold spot" does not necessarily require a complete absence of applied energy. Rather, it may also refer to areas of diminished intensity relative to the hot spots. That is, in the high-intensity regions, the amplitude of field intensity is higher than the amplitude of field intensity in the low-intensity regions. Therefore, the power density in the high-intensity region is higher than the power density in the low-intensity region. The power density and field intensity of a spatial location are related to the capability of delivering or applying electromagnetic energy to an object placed in that location. And therefore, the energy delivery or transfer rate is higher in a high-intensity region than that in a low-intensity region. In other words, the energy delivery or transfer is more effective in a high-intensity region. Thus, by controlling the high-intensity regions and/or low intensity regions in the energy application zone, the processor may control the delivery or application of energy to a specific spatial location. Such control of high- and low-intensity regions may be achieved by control of MSEs.

Furthermore, in some embodiments, an MSE may be chosen in accordance with the location of the hot and cold spots characterizing the energy excitation in the energy application zone caused by the MSE. For example, in some embodiments, there is provided an apparatus for applying electromagnetic energy to an object in an energy application zone via a source of electromagnetic energy and using a plurality of field patterns each having at least one high-intensity region and at least one low-intensity region. As explained above, field intensities associated with high-intensity regions are higher than field intensities associated with low-intensity regions.

The apparatus may include at least one processor, configured to identify two field patterns. The first field pattern may have a first high-intensity region corresponding to a first area of the spatial location of the object and/or to a first area of the energy application zone. The second field pattern may have a second high-intensity region corresponding to a second area of the spatial location of the object and/or to a second area of the energy application zone. The first or second areas may be mutually exclusive.

Identification of the first and second field patterns may be, for example, by comparing spatial energy distributions associated with each field pattern excitable by one of the available MSEs, with the spatial location of the two areas, so as to determine which field patterns have the hot spot located at one of the areas. Additionally or alternatively, identification may comprise selecting, from given field patterns, one that has the hot spots located as desired. In other embodiments, identification may comprise selecting a field pattern determined by a software instruction or instructions.

The spatial location of the object may be determined by the processor. For example, the processor may be configured to determine information indicating a spatial location of the object in the energy application zone.

The processor may be further configured to control the source to apply the first field pattern and the second field pattern to the energy application zone in order to apply energy to the first area and the second area.

In some embodiments, there is provided an apparatus for applying electromagnetic energy to an object in an energy application zone via a source of electromagnetic energy and by using a plurality of field patterns each having at least one high-intensity region and at least one low-intensity region, wherein field intensities associated with high-intensity regions are higher than field intensities associated with low-intensity regions. The apparatus may include at least one processor configured to identify a first field pattern having a first high-intensity region corresponding to a first area of the energy application zone; identify a second field pattern having a second high-intensity region corresponding to a second area of the energy application zone, different from the first, wherein the first area and the second area at least partially overlap at least a portion of the object; and control the source to apply the first field pattern and the second field pattern in order to apply energy to the first area and the second area.

The processor may be configured to control the source so that an amount of energy applied to the first area differs from an amount of energy applied to the second area. Alternatively or additionally, the processor may be configured to control the source so that energy absorbed or dissipated in the first area is substantially the same as an energy absorbed or dissipated in the second area (so that the energy absorbed or dissipated in the first and second areas differ by less than 20%, for example, by less than 10%).

Controllable MSE variables may include one or more of amplitude, phase, and frequency of the transmitted electromagnetic wave; a location, orientation, and configuration of each radiating element; or the combination of any of these parameters, or other parameters that may affect a field pattern. As depicted in FIG. 1, for example, an exemplary processor 30 may be electrically coupled to various components, such as power supply 12, modulator 14, amplifier 16, and radiating elements 18. One or more of power supply 12, modulator 14, amplifier 16, and radiating elements 18 may be a component of the source. Processor 30 may be configured to execute instructions that regulate one or more of these components. For example, processor 30 may regulate the level of power supplied by power supply 12. Processor 30 may also regulate the amplification ratio of amplifier 16, for example, by switching one or more transistors in the amplifier. Alternatively or additionally, processor 30 may perform pulse-width-modulation control of amplifier 16 such that the amplifier outputs a desired waveform. Processor 30 may regulate modulations performed by modulator 14, and may alternatively or additionally regulate at least one of location, orientation, and configuration of each radiating element 18, such as through an electromechanical device. Such an electromechanical device may include a motor or other movable structure for rotating, pivoting, shifting, sliding or otherwise changing the orientation or location of one or more of radiating elements 18. Processor 30 may be further configured to regulate any field adjusting elements located in the energy application zone, in order to change the field pattern in the zone. For example, field adjusting elements may be configured to selectively direct the electromagnetic energy from the radiating element, or to simultaneously match a radiating element acting as a transmitter to reduce coupling to the one or more other radiating elements acting as a receiver.

In some embodiments, a phase modulator may be controlled to perform a predetermined sequence of time delays on an AC waveform emitted by a radiating element, such that the phase of the AC waveform is increased by a number of degrees (e.g., 10 degrees) for each of a series of time periods. Alternatively or additionally, the processor may dynamically and/or adaptively modulate the waveform based on feedback from the energy application zone. For example, processor 30 may be configured to receive an analog or digital feedback signal from detector 40, indicating an amount of electromagnetic energy received from cavity 20, and processor 30 may dynamically determine a time delay at the phase modulator for the next time period based on the received feedback signal.

Figure 6A:
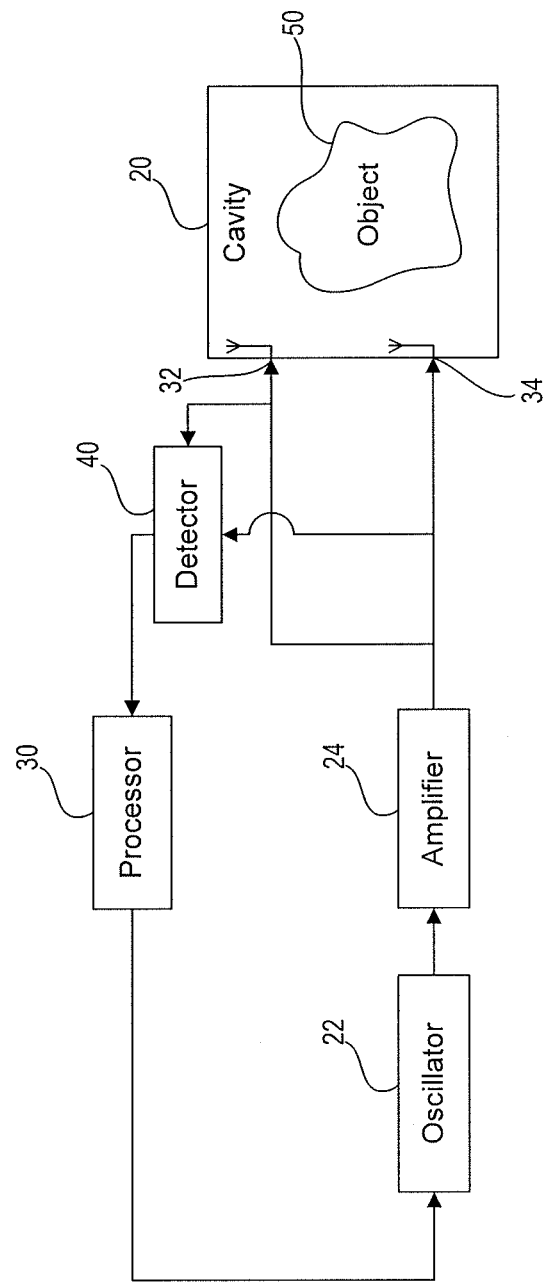
FIG. 6A is a schematic diagram of an apparatus configured to perform frequency modulation on electromagnetic waves supplied to an energy application zone, in accordance with some embodiments.

The processor may also be configured to regulate a frequency modulator in order to alter a frequency of at least one electromagnetic wave supplied to the energy application zone. Such a frequency modulator may be configured to adjust the frequency of an AC waveform. By way of example, the frequency modulator may be a semiconductor oscillator, such as oscillator 22 schematically depicted in FIG. 6A, and configured to generate an AC waveform oscillating at a predetermined frequency. The predetermined frequency may be in association with an input voltage, current, or other analog or digital signal or signals. For example, a voltage controlled oscillator may be configured to generate waveforms at frequencies proportional to the input voltage.

Consistent with some embodiments, processor 30 may be configured to regulate oscillator 22 to generate AC waveforms of time-varying frequencies. For example, oscillator 22 may generate a sinusoidal signal $\cos[\omega(t) \cdot t]$. The AC signal may be amplified by amplifier 24 and may cause radiating elements, e.g., antennas 32 and 34, to excite frequency modulated electromagnetic waves in cavity 20.

In some embodiments, processor 30 may be configured to regulate oscillator 22 to generate AC waveforms oscillating at various frequencies within a predetermined frequency band. Optionally, oscillator 22 may be regulated to generate the waveforms sequentially.

In some embodiments, a predetermined frequency band may include a working frequency band, and the processor may be configured to cause the application of energy at frequencies within a portion of the working frequency band, comprising a subset of frequencies. The portion of the working frequency band may be a collection of frequencies selected because, in the aggregate, they achieve a desired goal, and there is diminished need to use other frequencies in the band if that subset achieves the goal. Once a working frequency band (or portion thereof) is identified, the processor may sequentially apply power at each frequency in that working frequency band or portion thereof. This sequential process may be referred to as "frequency sweeping." In such embodiments, each frequency may be associated with a feeding scheme (e.g., a particular selection of MSEs). In some embodiments, based on the feedback signal provided by detector 40, processor 30 may be configured to select an energy delivery scheme, comprising, for instance, one or more frequencies from a frequency band, and regulate oscillator 22 to sequentially and/or simultaneously generate AC waveforms at these selected frequencies in accordance with the selected energy delivery scheme.

Alternatively or additionally, processor 30 may be configured to regulate amplifier 24 to adjust amounts of energy applied via antennas 32 and 34, based on the feedback signal. Consistent with some embodiments, detector 40 may detect an amount of energy reflected from the energy application zone at a particular frequency, and processor 30 may be configured to cause the amount of energy applied at that frequency to be high when the reflected energy is high. That is, processor 30 may be configured to cause one or more antennas to apply energy at a particular frequency over a longer duration when the reflected energy is high at that frequency. Alternatively, processor 30 may be configured to cause one or more antennas to apply energy at a particular frequency over a longer duration when the reflected energy is low at that frequency.

Figure 6B:
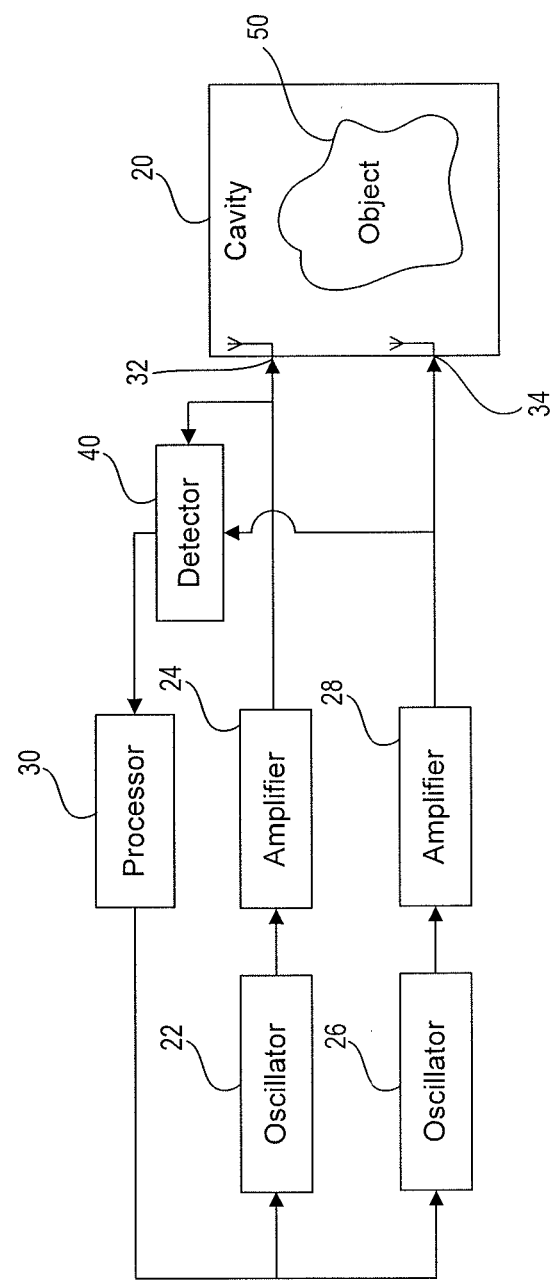
FIG. 6B is another schematic diagram of an apparatus configured to perform frequency modulation on electromagnetic waves supplied to the energy application zone, in accordance with some embodiments.

As depicted in FIG. 6B, some embodiments may include a source with more than one EM energy generating component, such as oscillators 22 and 26 for generating AC waveforms of differing frequencies. The separately generated AC waveforms may be amplified by amplifiers 24 and 28, respectively. Accordingly, at any given time, antennas 32 and 34 may be caused to simultaneously apply electromagnetic waves at two differing frequencies to cavity 20. Each of these two frequencies may be time-varying. FIG. 6B illustrates two oscillators for exemplary purposes only, and it is contemplated that more than two oscillators (and/or more than two amplifiers and/or more than two antennas) may be used.

In some embodiments, the processor may be configured to regulate a phase modulator in order to alter a phase difference between two electromagnetic waves supplied to the energy application zone. In some embodiments, the source of electromagnetic energy may be configured to supply electromagnetic energy at a plurality of phases, and the processor may be configured to cause the application of energy at a subset of the plurality of phases. By way of example, the phase modulator may include a phase shifter, such as phase shifter 54, illustrated in FIG. 6C. Phase shifter 54 may be configured to cause a time delay in the AC waveform in a controllable manner within cavity 20, delaying the phase of an AC waveform, e.g., between 0-360 degrees. Phase shifter 54 may include an analog phase shifter configured to provide a continuously variable phase shift or time delay, or phase shifter 54 may include a digital phase shifter configured to provide a discrete set of phase shifts or time delays.

Figure 6C:
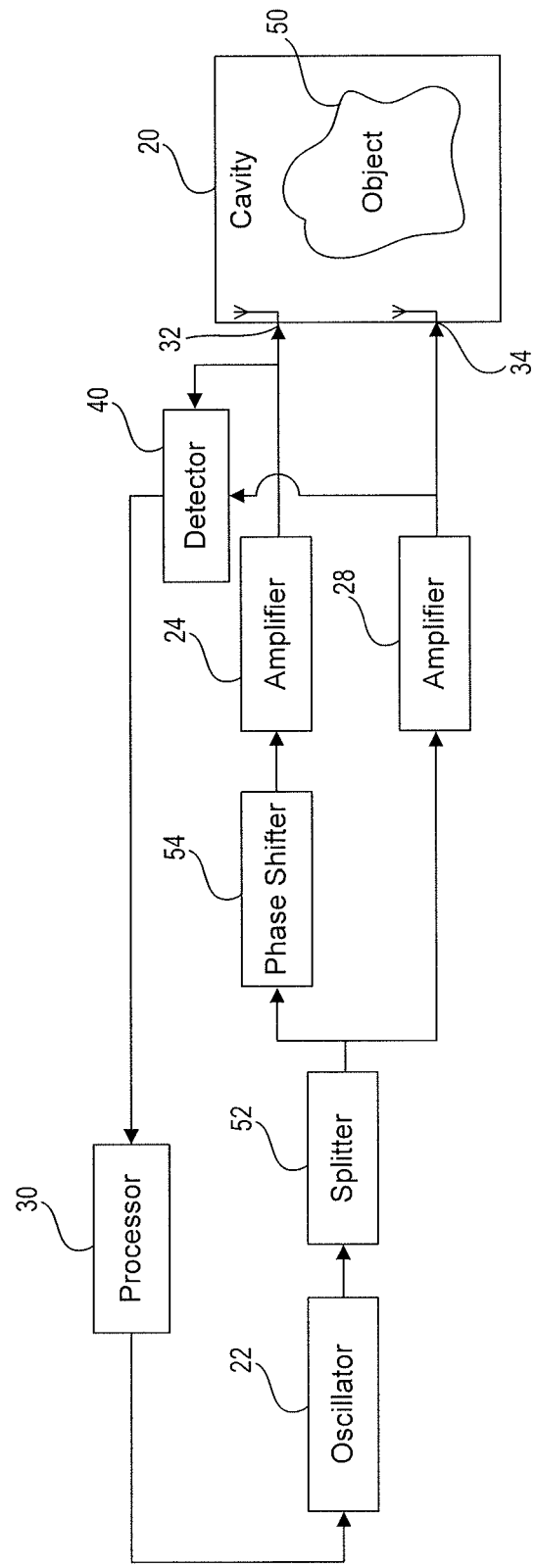
FIG. 6C is a schematic diagram of an apparatus configured to perform phase modulation on electromagnetic waves supplied to an energy application zone, in accordance with some embodiments.

Consistent with some embodiments such as is illustrated in FIG. 6C, a splitter 52 may be provided to split the AC signal generated by oscillator 22 into two AC signals (e.g., split signals). Processor 30 may be configured to regulate phase shifter 54 to sequentially cause various time delays such that the phase difference between the two split signals may vary over time. This sequential process may be referred to as "phase sweeping." Similar to the frequency sweeping described earlier, phase sweeping may involve a working subset of phases selected to achieve a desired energy application goal.

Just as subsets of frequencies and phases may be selected and swept, so too may subsets of MSEs be selected and swept in order to, for example, achieve a desired energy application goal. More generally, processor 30 may be configured to regulate the source to sequentially generate waveforms at various MSEs, e.g. at various frequencies, phases, amplitudes, and/or selections of radiating elements. Such a sequential process is referred to herein as "MSE sweeping". Sequentially swept MSEs may not necessarily be related to each other. Rather, their MSE variables may differ significantly from MSE to MSE (or may be logically related). In some embodiments, the MSE variables may differ significantly from MSE to MSE, possibly with no relation between them. In the aggregate, however, a group of working MSEs achieves a desired energy application goal.

Figure 6D:
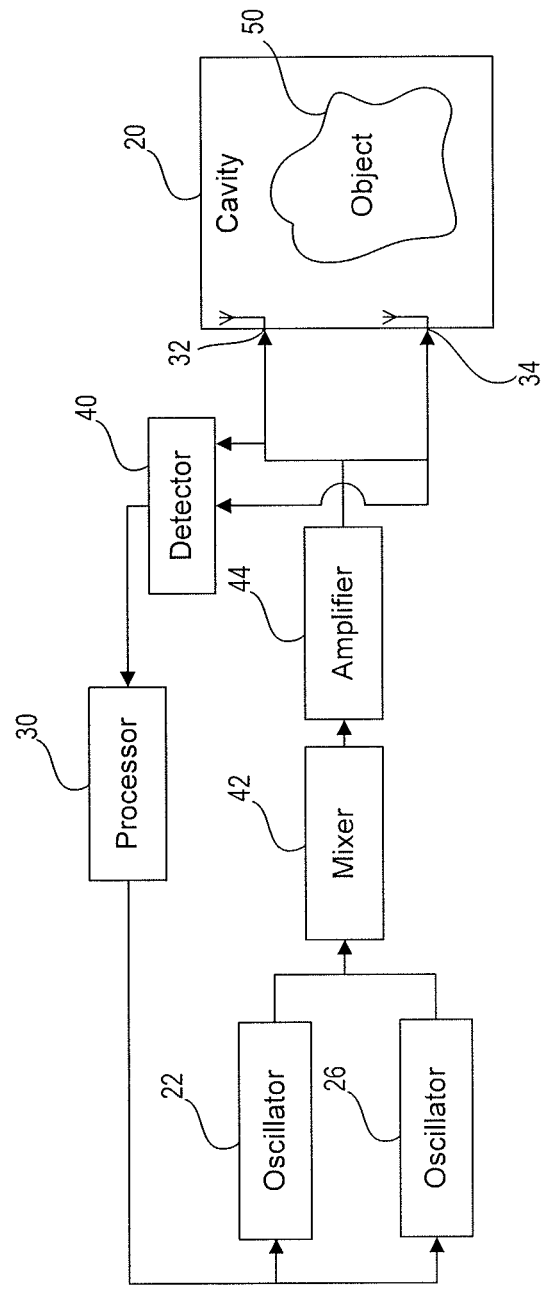
FIG. 6D is a schematic diagram of an apparatus configured to perform amplitude modulation on electromagnetic waves supplied to an energy application zone, in accordance with some embodiments.

The processor may be configured to regulate an amplitude modulator in order to alter an amplitude of at least one electromagnetic wave supplied to the energy application zone. In some embodiments, the source of electromagnetic energy may be configured to supply electromagnetic energy at a plurality of amplitudes, and the processor may be configured to cause the application of energy at a subset of the plurality of amplitudes. By way of example, the amplitude modulator may include a mixer circuit, such as mixer 42 illustrated in FIG. 6D, configured to regulate an amplitude of a carrier wave with another modulating signal. For example, oscillator 22 may be configured to generate a higher frequency AC signal, and oscillator 26 may be configured to generate a lower frequency AC signal. The two AC signals may be mixed by mixer 42 into one AC signal oscillating at the higher frequency, and the amplitude of the mixed AC signal may vary according to the lower frequency AC signal. For example, if the higher frequency signal is a sinusoidal signal cos $[\omega_1 \cdot t]$ and the lower frequency signal is another sinusoidal signal cos $[\omega_2 \cdot t]$, then the mixed signal may become cos $[\omega_t]$ cos $[\omega_2 \cdot t]$. The mixed signal may then be amplified by amplifier 44, so that antennas 32 and 34 may apply electromagnetic waves in the amplified waveform.

Figure 6E:
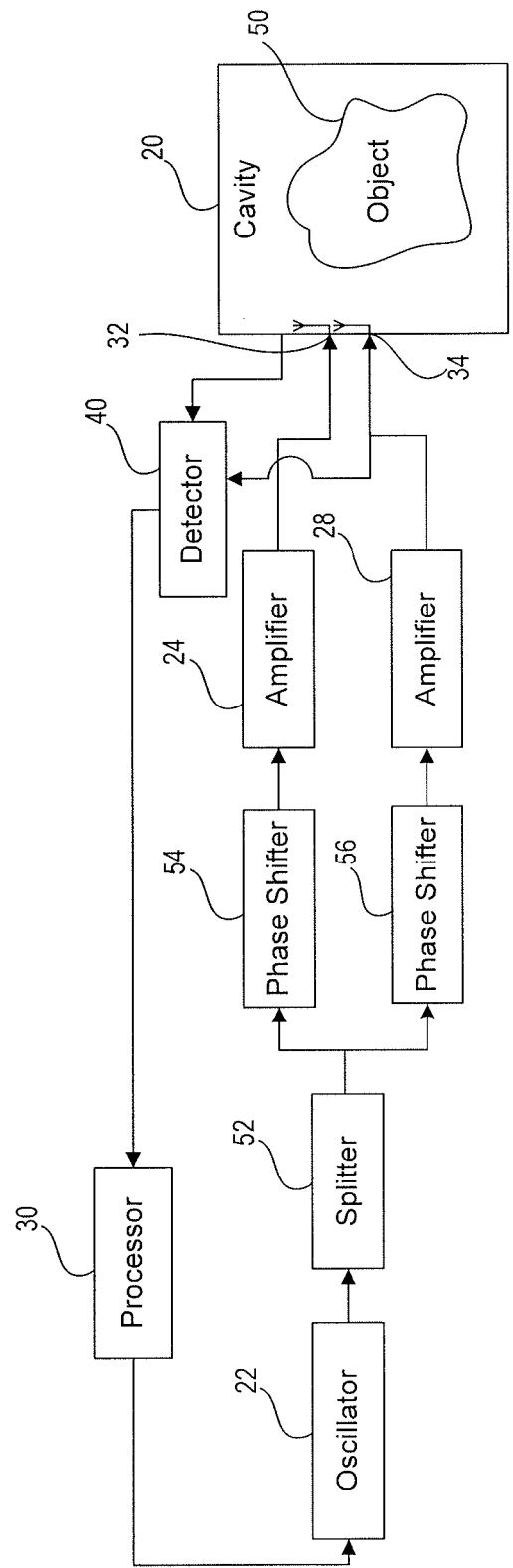
FIG. 6E is another schematic diagram of an apparatus configured to perform amplitude modulation on electromagnetic waves supplied to an energy application zone, in accordance with some embodiments.

Consistent with some embodiments, the amplitude modulator may include one or more phase shifters, such as phase shifters 54 and 56, for example as shown in FIG. 6E. In accordance with some embodiments, amplitude modulation may be implemented by combining two or more phase shifted electromagnetic waves. For example, splitter 52 may split the AC signal generated by oscillator 22 into two AC signals, such as sinusoidal waves cos $[\omega t]$. Because they are split from a single signal, the two split AC signals may share substantially the same frequencies. One split AC signal may be shifted by phase shifter 54 for phase $\alpha$, so that the AC signal becomes cos $[\omega t + \alpha]$. The other split AC signal may be shifted by phase shifter 56 for phase $-\alpha$ (or equivalently $360°-\alpha$), so that the AC signal becomes cos $[\omega t - \alpha]$.

As illustrated in FIG. 6E, the phased shifted AC signals may be amplified by amplifiers 24 and 28 respectively, and in this manner antennas 32 and 34 may be caused to excite electromagnetic waves having a shared AC waveform. Antennas 32 and 34 may be positioned at a predetermined distance from each other, so that the two electromagnetic waves excited by the antennas may form an amplitude modulated wave, according to the trigonometric identity cos $[\omega t - \alpha] + \cos [\omega t + \alpha] = 2 \cos(\alpha) \cos(\omega t)$. As with the other examples provided, FIG. 6E is exemplary. It is to be understood that one, two, or more phase shifters can be used to apply similar principles to other embodiments.

In some embodiments, the source may be configured to supply electromagnetic energy through a plurality of radiating elements, and the processor may be configured to regulate the source to supply energy with differing amplitudes simultaneously to at least two radiating elements. For example, FIG. 6E shows that two antennas 32 and 34 may be used to apply electromagnetic energy to cavity 20. Oscillator 22 may output a signal which is split by splitter 52, phase shifted by phase shifters 54 and 56, and amplified separately by the two amplifiers 24 and 28. Processor 30 may control amplifiers 24 and 28 individually, for example, to amplify the split signal with different amplification factors, thereby providing amplified signals with differing amplitudes, and to supply the signals simultaneously to two antennas 32 and 34. The two amplified signals supplied to the two antennas, respectively, may be represented by $A_1 \cos(\omega t)$ and $A_2 \sin(\omega t)$, wherein $A_1$ and $A_2$ are the amplitudes of the two signals and may be controlled by the processor 30 to vary in such a manner: $A_1 = \cos(\alpha)$ and $A_2 = \sin(\alpha)$. According to trigonometric identity, the combination of the two amplified signals are $A_1 \cos(\omega t) + A_2 \sin(\omega t) = \cos(\alpha)\cos(\omega t) + \sin(\alpha)\sin(\omega t) = \cos(\omega t - \alpha)$. Therefore, the processor may control the phase of the combined signal supplied to the cavity by controlling the amplitude of the individual signals supplied to each of the antennas. FIG. 6E is exemplary, and it is to be understood that other configurations may be used in other embodiments. For example, in some embodiments, only one phase shifter may be used to shift only one of the split signals. In some other embodiments, instead of using splitter 52, multiple signal generators may be used to provide signals simultaneously. In some other embodiments, additional antennas and amplifiers may be used to provide additional control of the signals.

Although FIGS. 6A-6E illustrate circuits for altering frequency, phase, and amplitude modulations individually, in accordance with some embodiments, components of these circuits may be combined in order to provide for the control of multiple MSE variables. Moreover, many radiating elements (e.g., 3-50 radiating elements) may be employed, and the circuit may select combinations of MSEs through selective use of radiating elements. By way of example only, in an apparatus having three radiating elements A, B, and C, amplitude modulation may be performed with radiating elements A and B, phase modulation may be performed with radiating elements B and C, and frequency modulation may be performed with radiating elements A and C. Optionally, amplitude may be held constant and field changes may be caused by switching one or more of the radiating elements on and off. Further, antennas 32 and 34 may include a device that causes their location or orientation to change, thereby causing field pattern changes. One of ordinary skill in the art will understand that the combinations are virtually limitless, and the invention is not limited to any particular combination of controls, but rather reflects the notion that field patterns may be altered by altering one or more MSEs.

Although changes in MSE selection may result in significant changes in field patterns and energy distribution (which may be a sum of field patterns over space and/or time), energy distribution may be predicted based on the combination of MSEs selected. This predictability permits combinations of MSEs to be chosen in order to achieve desired energy distributions.

In some embodiments, the processor may be configured to control the source so that energy absorbed in the first region is substantially the same as the energy absorbed in the second region. For example, the processor may select one or more MSEs and apply energy to the first and second regions by causing one or more high-intensity regions (hot spots) to correspond to the first and second regions. The processor may determine the absorption properties of the two regions, and the field intensity associated with the one or more high-intensity regions. Since the energy absorbed in a given region is related to the absorption property and the field intensity in the region, the processor may control the power and/or time duration of energy application in order to achieve substantial uniform energy absorption in the first and second regions.

The energy distribution that results from any given combination of MSEs (e.g., the field pattern) may be determined, for example, through testing, simulation, or analytical calculation. Using the testing approach, sensors (e.g., small antenna) may be placed in an energy application zone, to measure the energy distribution that results from a given combination of MSEs. The distribution may then be stored in, for example, a look-up table. In a simulated approach, a virtual model may be constructed so that combinations of MSEs may be tested in a virtual manner. For example, a simulation model of an energy application zone may be performed in a computer based on a set of MSEs inputted to a simulation engine and/or program. A simulation engine such as CST by CST Germany, or HFSS by Ansoft Corp. USA, may be used to numerically calculate the field distribution inside the energy application zone. The resulting field pattern may be visualized using imaging techniques or stored in a computer as digital data. The correlation between MSE and resulting field pattern may be established in this manner. This simulated approach can occur well in advance and the known combinations stored in a look-up table, or the simulation can be conducted on an as-needed basis during an energy application operation.

Similarly, as an alternative to testing and simulation, calculations may be performed based on an analytical model in order to predict energy distribution based on a selected combination of MSEs. For example, given a shape of an energy application zone with known dimensions, the basic field pattern corresponding to a given MSE may be calculated from analytical equations. This basic field pattern, also known as a "mode," may then be used to construct a desired field pattern by linear combination with itself or with other known modes. As with the simulated approach, the analytical approach may be applied well in advance and the known combinations stored in a look-up table, or may be conducted on an as-needed basis during an energy application operation.

In accordance with some embodiments, the processor may be configured to apply predetermined amounts of energy to at least two regions in the energy application zone. The energy may be predetermined based on known characteristics of the object in the energy application zone. For example, in the case of a dedicated oven that repetitively heats products sharing the same physical characteristics (e.g., identical hamburger patties), the processor may be pre-programmed to apply differing known quantities of energy corresponding to two or more known field patterns. The processor may apply differing amounts of energy depending on the field pattern. That is, the power and/or duration of energy application may be varied as a function of the field pattern being applied. This correlation between the predetermined amounts of energy to be applied and the field pattern may be determined by testing, simulation, or analysis, as discussed previously.

By way of another example, the correlation between field pattern and amount of energy applied may be determined by an energy absorption profile of the object at issue. That is, once an object's ability to absorb energy throughout its volume is determined, then energy may be applied to the object in a controlled manner in order to achieve a desired goal. For example, if the goal is to uniformly apply energy across an object's volume, then the processor might select combinations of MSEs that result in uniform energy application. If, on the other hand, a non-uniform energy application is desired, then the processor may apply predetermined amounts of energy with differing field patterns in order to achieve the desired non-uniform distribution of energy.

In accordance with some embodiments, the processor may be configured to cause a predetermined field pattern in the energy application zone, the field pattern having at least one high-intensity region and at least one low-intensity region, and wherein the processor may be configured to cause the at least one high-intensity region to coincide with a location of the object in the energy application zone. The term "predetermined field pattern" may be any actual or predicted field pattern that results from an MSE. A predetermined field pattern may be an approximation of an expected field pattern, and may be obtained, for example, through calculation, simulation, or measurement with or without a load or object present in the energy application zone. The measurements may be obtain on the fly, e.g., during a heating process, for example by detecting one or more inputs from one or more sensors or detectors provided in the energy application zone. These inputs or measurements may be used to predict the actual field pattern. During the energy application process, when there are one or more objects located in the energy application zone, the actual field pattern in the energy application zone may not be exactly the same as the predicted field pattern because the presence of the object(s) may somewhat change the field pattern. However, the main characteristics of the field pattern, such as the location and field intensity of hot/cold spots may be substantially the same as predicted. Therefore, the relationship between MSE and field pattern may still be preserved, regardless of whether object(s) are present in the energy application zone.

Consistent with some embodiments, the calculation of field patterns may be made without considering the presence of the object in the energy application zone. This may be based on the assumption that the presence of object in the energy application zone does not materially change the intensity distribution of the field pattern in the zone (known as the "Born approximation"). The Born approximation may be particularly useful when the location, size and electromagnetic characteristics of the object are unknown before the energy application. When the properties of the object are known before hand, the field pattern calculation may also be made with consideration of the object. Field calculation or simulation may be relatively simple in cases where the load (object) fills the entire energy application zone and is dielectrically homogeneous.

A load may be considered to fill substantially the entire energy application zone if the effect of the unfilled regions is negligible. For example, a load filling substantially the entire energy application zone may fill at least 80%, 85% or 90% of the zone. In some embodiments, the load may fill the entire zone except for some excluded volumes that may be occupied, for example, with radiating elements (e.g., RF feeds), detectors, thermometers, or other equipment that may be useful for the operation of the apparatus. Some marginal volumes that are not filled with the object, for example, at corners of a cavity, may also exist in a substantially filled energy application zone.

An example of a homogeneous load is one with no dielectric-boundaries. A dielectric boundary is a line or surface that separates between two regions, each having a significantly different dielectric constant ($\epsilon_r$). A characteristic size of each of the regions may be of the order of at least about a wavelength in the load. The wavelength in the load may be approximated by an average between the wavelengths on both sides of the lines or surface that separates between the regions. A difference in dielectric constant may be considered significant, for example, if the difference is of about 10% or greater. One example of a homogeneous load is a body of water. It is noted that if different portions of the body of water are at different temperatures (for examples, because of non-uniform heating), then the dielectric constant of the different portions may differ. If this difference is larger than 10%, the body of water may be inhomogeneous.

A suspension of oil in water (or of any other two materials) may be considered homogeneous, provided the oil droplets (or particles of other suspended medium) are smaller than the wavelength at the frequency of the MSE (e.g., smaller than tenth of the wavelength), in the suspension as a whole. This may be so despite of the large difference in dielectric constant between oil and water.

Another case in which the relationship between MSE and predicted field pattern may be preserved particularly well, is in case of a separable load, e.g., in a separable cavity. A separable load is a load comprising at least one entire layer of a homogeneous material. The concepts of homogeneity and substantially filling may be understood as explained above. Each layer may be bordered by cavity wall(s) and two parallel cross-sectional dielectric boundaries in a separable cavity. A separable cavity is a cavity where the electrical field excited therein, E(x, y, z) may be expressed as a product of the field in x,y plane and the field in the z direction, i.e. E(x,y,z)=E(x,y) E(z), wherein z is the direction at which the field propagates. Separable cavities include, for example, cavities having a shape of rectangular box, cylinder, prism with a right-angled triangular base, or a sectioned cylinder. An example of a separable load may be, for example, a layered cake, wherein each layer is homogeneous, and touches the cavity wall at the circumference of the cake.

Figure 4D:
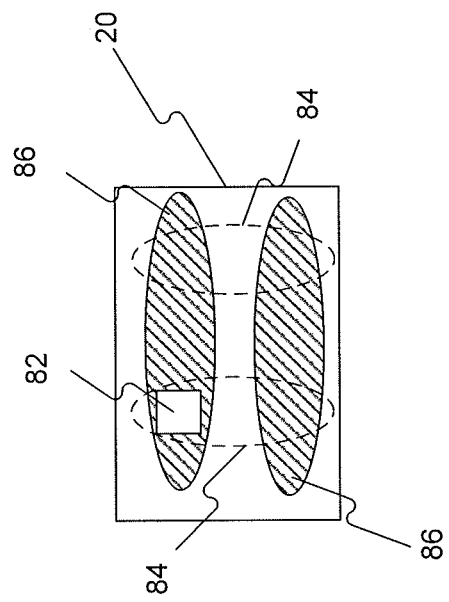
Figure 4C:
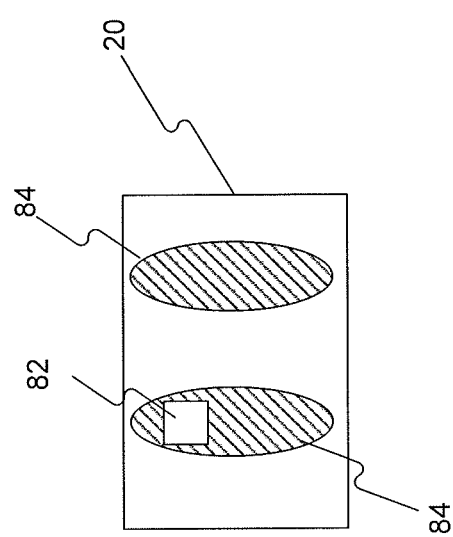

A "high-intensity region," also known as a "hot spot" as described previously, refers to a region where the electromagnetic field intensity is substantially higher than the surrounding regions. A high-intensity region may be described as a region where electromagnetic power concentrates. Therefore, in high-intensity regions, the transfer of electromagnetic energy from electromagnetic waves to an object is more effective than that in surrounding areas. Similarly, a "low-intensity region," also known as a "cold spot" as described previously, refers to a region where the electromagnetic field intensity is substantially lower than the surrounding regions. Therefore, the transfer of electromagnetic energy is substantially ineffective in low-intensity regions. For example, as shown in FIG. 4C, the processor may be configured to cause a field pattern with two high-intensity regions 84 in the energy application zone 20. The areas other than the high-intensity regions 84 in the energy application zone 20 may be referred to as low-intensity regions. The field pattern shown in FIG. 4C may be predetermined, and as a result, the location of the two high-intensity regions 84 may be known in advance. An object 82 may be located in energy application zone 20 and may be capable of absorbing electromagnetic energy. The processor may be configured to cause high-intensity regions 84 to coincide with the location of object 82, as will be described later in greater detail.

In a situation where a location of object 82 is known in advance, the processor may select one or more MSEs to cause a corresponding known field pattern in which at least one high-intensity region may coincide with the location of the object. When the location of the object is not known in advance, the processor may receive feedback indicative of absorbed energy in the cavity, as discussed later in greater detail. If at least one high-intensity region coincides with a location of the object, the amount of energy absorbed in the energy application zone may be substantially larger than the energy absorbed in the energy application zone where the high-intensity region does not coincide with the location of the object. The processor may learn this through feedback and thereafter select an MSE that results in greater energy absorption in the energy application zone to cause at least one high-intensity region to coincide with a location of the object.

In some embodiments, low-intensity regions may also be used to apply energy to the object. For example, when at least a portion of the object is outside reachable areas of one or more high-intensity regions, controllable energy application may still be achievable by using one or more low-intensity regions to transfer electromagnetic energy to the object, although such transfer of energy may not be as efficient and/or as fast as using high-intensity regions. In this case, the processor may control the overlapping between the object and low-intensity regions in a similar manner to the control used with high-intensity regions. In addition, for certain materials (such as certain types of foods), it may be desirable to apply energy with a lower intensity so as to avoid overcooking.

Also in accordance with some embodiments, the processor may be configured to excite at least one standing wave in the energy application zone, the standing wave having at least one high-intensity region and at least one low-intensity region, wherein field intensities associated with high-intensity regions are higher than field intensities associated with low-intensity regions, and wherein the processor is configured to cause the at least one high-intensity region of the standing wave to coincide with a location of the object. For example, when electromagnetic waves are applied into the energy application zone and reflected from a boundary of the zone (e.g., cavity wall), a standing wave may be established by the interaction of the applied and reflected waves. Due to this interaction, the standing waves may exhibit high-intensity regions (hot spots) and low-intensity regions, resulting from local maxima and minima of the electromagnetic field intensity. For example, FIG. 4C depicts high-intensity regions 84. As discussed previously, when the location of the object is known, the processor may be configured to select an MSE to excite a standing wave that causes a high-intensity region to coincide with the location of object 82.

In accordance with some embodiments, the processor may be configured to excite a plurality of standing waves, and wherein the processor is further configured to select at least a portion of the plurality of standing waves with high-intensity regions that coincide with a location of the object or at least a portion of the object. For example, the processor may be configured to select an MSE that results in the field pattern of FIG. 4C, corresponding to a first standing wave having a high-intensity region 84 that coincides with object 82. Thereafter, the processor may be configured to select an MSE that results in the field pattern of FIG. 4D corresponding to a second standing wave having a high-intensity region 86 that also coincides with object 82.

Through the use of two standing waves and/or through the use of a detector for determining absorption (via for example reflection), the processor may acquire more information about the location of the object and the absorptive properties of the object. For example, if only the standing wave shown in FIG. 4C was available, the processor would only be capable of determining that the location of object 82 is within areas covered by the two vertical high-intensity regions 84. Similarly, if only the standing wave shown in FIG. 4D was available, the processor would only be capable of determining that the location of object 82 is within the areas covered by the two horizontal high-intensity regions 86. However, when multiple standing waves are used, the processor may then determine that the object is within an area covered by intersections of high-intensity regions 84 and 86, as shown in FIG. 4D, in which the dashed lines correspond to the high-intensity regions 84 of FIG. 4C. In this case, the processor may determine that the object is within an area covered by the intersection of regions 84 and 86, thereby achieving better resolution. As additional standing waves are used, the resolution may be improved.

An object's ability to absorb energy across its volume may be expressed as a "loss profile." The term "loss" may include any electromagnetic energy that is not reflected back from within the energy application zone (e.g., to the radiating element emitting or to other radiating elements acting as receivers). The term "loss" may also refer to dielectric loss. For example, losses may include electromagnetic loss due to ionic conduction (characterized by $\epsilon_\sigma''$); electromagnetic loss due to dipole rotation (characterized by $\epsilon_d''$); and/or a combination of these or other loss components, wherein the total loss may be characterized, for example, by:

$$\epsilon'' = \epsilon_d'' + \epsilon_\sigma'' = \epsilon_d'' + \sigma'/(\omega\epsilon_0) \quad (1)$$

where subscripts d and σ stand for contributions of dipole rotation and ionic conduction, respectively, σ' is the electric conductivity, ω is the angular frequency, and $\epsilon_0$ is the permittivity of free space or vacuum. Hereinafter, as a shorthand, the total loss may be denoted by "σ". However, as used herein, the term "loss" is broadly used to encompass contributions of all kinds of absorption coefficients.

By way of example, if an electromagnetic energy absorbing object is located in an energy application zone, the loss may represent the electromagnetic energy absorbing ability of the object. Alternatively, the loss may represent the electromagnetic energy loss on the boundary of the energy application zone, regardless of whether there is any object located in the energy application zone.

Losses may be characterized in term of their profiles (e.g., a loss profile). The term profile, which also may be referred to as a pattern, image, distribution, etc., may include any spatial distribution of loss in the energy application zone. The loss profile may be represented in various ways in order to convey information about the distribution of energy loss in the energy application zone. For example, the loss profile may be represented using imaging, analytics, numerics, tablature, or any other mechanism capable of reflecting a distribution or spatial distribution of energy loss.

When represented as an image or using any imaging techniques, the loss profile may assume a form of a black and white image, gray-scale image, color image, surface profile image, volumetric image, or any other graphical depiction. In graphical terms, the loss profile may be represented, for example, in two-, three-, and/or four-dimensions, wherein one of the dimensions represents the loss and the other one(s)—the spatial location with which the loss is associated. In some embodiments, time evolution of the loss is represented along one of the dimensions. In some embodiments, the graphical profile may change in time, thus allowing for an additional dimension to be used. In some embodiments, different colors may represent different values along one dimension, for example, darker colors may represent higher losses. When represented in tablature, the loss profile may assume the form of a table containing a correlation between physical space and the energy absorbed at specific locations in that space. In another example, the loss profile may be an image or a table printed on paper or film, or a model made of physical material.

When represented analytically, a loss profile may, for example, be written in terms of one or more equations. For example, such equations may be written as a function of one or more of time, space (e.g., x, y, and z coordinates of Cartesian space), power, phase, frequency, or any other variables that may be correlated to energy losses.

When represented numerically, the loss profile may be expressed as a number or a series of numbers.

Regardless of the manner of representation, a loss profile may be expressed in either digital and/or analog formats. For example, the loss profile may be a digital file stored in a memory accessible to a processor.

Figure 7:
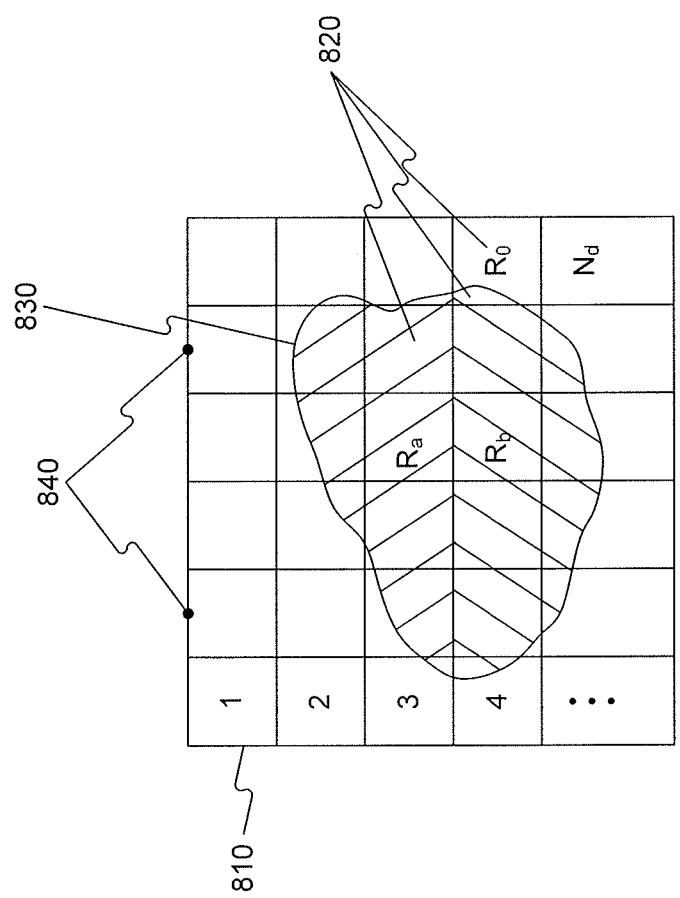
FIG. 7 illustrates an exemplary loss profile in accordance with some embodiments.

By way of example, a loss profile may be a 2D image as shown in FIG. 7. It should be understood that the 2D image shown in FIG. 7 is a simplified example for ease of discussion. The same general principles explained below with regard to the simplified 2D image are equally applicable to 3D and 4D representations. It should also be understood that in the context of 2D space, the size of the energy application zone may be characterized by area instead of volume.

FIG. 7 illustrates a loss profile 820 of energy application zone 810. Loss profile 820, which may or may not have the same shape and/or size as the energy application zone, may characterize energy loss (e.g., absorption and/or dissipation) in zone 810. The loss profile may reflect the spatial distribution of loss (σ) in the energy application zone. For example, if an object 830 is located in energy application zone 810, the loss profile may reflect the energy absorption property of the object. The loss profile may be obtained independently of the energy application zone, or the loss profile may be obtained by taking into account the properties of the energy application zone. In one example, the loss profile may be obtained in advance for a known object. In another example, the loss profile may be dynamically obtained for any object located in the energy application zone. In some embodiments, an initial loss profile may be obtained in advance, and optionally updated as energy is applied to a particular object.

By way of example, loss profile 820 and energy application zone 810 may be associated by superposition, registration, mapping, correlation, zooming, or any other association method. For example, if the shape and size of zone 810 and loss profile 820 are identical, the energy application zone 810 and the loss profile 820 may be associated by superposition.

The loss profile of the energy application zone may be predetermined. Alternatively or additionally, the at least one processor may be configured to determine the loss profile for any given object placed in the energy application zone. Such a determination may be accomplished, for example, by a processor implementing a series of steps such as those set forth in the flow chart 900 of FIG. 9A to dynamically create loss profile 820 for a given object 830 or energy application zone 810.

The source may be configured to generate a plurality of differing electromagnetic field patterns in the energy application zone, and the processor may be configured to select at least one pattern from the plurality of patterns for selective application of energy to specified regions of the energy application zone. As indicated in step 920 of FIG. 9A, the processor may determine a set of MSEs for use in the process. For example, the processor may control the electromagnetic energy source to supply EM energy over a plurality of frequencies. In this case, the plurality of frequencies may serve as controllable MSE variables in this process. As discussed previously, an MSE may correlate to a known field pattern. Therefore, by determining a set of MSEs, the processor may determine a set of known field patterns to be excited in the zone. The processor may also be configured to choose one MSE to supply electromagnetic energy at a time, thereby selecting one field pattern to be excited in the zone corresponding to the chosen MSE.

The method of constructing a controlled EM field pattern inside the energy application zone from a predetermined set of field patterns is termed as "EM spatial filtering." The term "filtering" refers to an ability to discriminate spatial locations and the field intensities thereof in terms of a set of known EM field patterns. And since the modulation space correlate controllable MSEs with the predetermined set of field patterns, it is possible to represent any field pattern in terms of an MSE. It should be understood that there may be more than one MSE (or combination of MSEs) available to achieve a given field pattern. Therefore, the choice of MSE to achieve a particular field pattern may be application dependent, e.g., based on locations where it is desirable to apply EM energy.

Since an MSE may be represented by a series of variables, it is possible to change the MSE by altering a single variable or multiple variables. By way of example, the processor may control the energy source to supply EM energy at two frequencies: f1 and f2; and two amplitudes: A1 and A2. In this case, the available MSEs may be [(f1, A1), (f1, A2), (f2, A1), (f2, A2)]. That is, the processor may control the energy source to supply a first amount of EM energy at frequency f1 and amplitude A1, a second amount EM energy at frequency f1 and amplitude A2; a third amount of EM energy at frequency f2 and amplitude A1; and a fourth amount of EM energy at frequency f2 and amplitude A2. It may therefore be convenient to represent the available MSEs in matrix form as:

[(f1, A1), (f1, A2)
(f2, A1), (f2, A2)].

Because it is assumed, in this example, that only two frequencies and two amplitudes are available, the MSE matrix is a 2×2 matrix. Of course, if more frequencies and amplitudes are available, the MSE matrix will expand accordingly. For example, if 10 frequencies and 5 amplitudes are available, the MSE matrix will become a 10×5 matrix, with each row of the matrix having the same frequency value but different amplitude values, and each column of the matrix having the same amplitude value but different frequency values. It is also apparent that if more or less types of controllable MSE parameters are available, the dimension of the MSE matrix may change accordingly. For example, if the phase (φ) of the EM energy is also controlled in a particular implementation, then the MSE matrix will become a 3D matrix, with each element of the matrix in a form of $(f_i, A_j, \phi_k)$. Here the subscripts i, j, and k represent indices of available frequency, amplitude, and phase, respectively. The size of the matrix may be represented as $N_F \times N_A \times N_P$, where $N_F$, $N_A$, and $N_P$ represent the available number of controllable frequencies, amplitudes, and phases, respectively. Similarly, if only one controllable parameter is available, the matrix will degenerate to a 1D vector.

In addition to the frequency, amplitude, and phase, any controllable parameter which may effectively change the field pattern inside the energy application zone may be part of the MS. For example, the number of radiating elements for emitting or applying EM energy to the energy application zone may be an additional set of controllable parameters, or in other words, an additional dimension added to the MS. In another example, the placement/location/orientation of the radiating element(s) may be physically changed in space by mechanical, electrical, or other suitable means. In this case, the placement/location/orientation of the radiating element(s) may be additional dimensions added to the MS. Or, there may be provided an array of radiating elements, and the desired placement/location/orientation may be achieved by selecting a particular radiating element or subset of radiating elements in the array. Moreover, the placement/location/orientation of radiating element(s) may be adjusted by the combination of the two aforementioned methods. In yet another example, there may be provided a field adjusting element (FAE), such as a conducting structure, inside the energy application zone and the placement/location/orientation of the FAE may be adjusted in the similar manner as that of the radiating element. It should be understood that within all of the possible MSE selections, the processor may determine a set of suitable MSEs depending on the particular application.

The at least one processor may be configured to divide a representation of at least a portion of the energy application zone into two or more regions. The representation may be, for example, an array of values, each value representing a characteristic of a different portion of the energy application zone. The values may be said to be associated with the region characterized thereby. Characteristics may include, for example, location, dielectric property, field intensity, an amount of electromagnetic energy applied to the portion, or others. In the following, any reference to division of an energy application zone and/or division of an object may refer to division of a representation thereof. The division may be indicated, for example, by applying different rules to values associated with each of the regions, by referring collectively only to portions of the first region, and collectively and differently to a second region, etc.

Figure 8A:
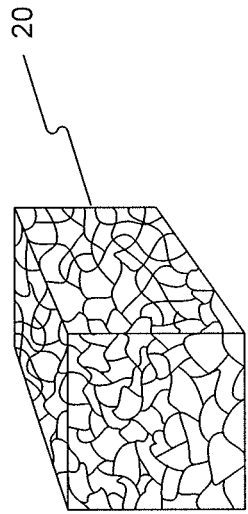
FIGS. 8A-8C illustrate exemplary energy application zone discretization strategies in accordance with some embodiments.
Figure 8B:
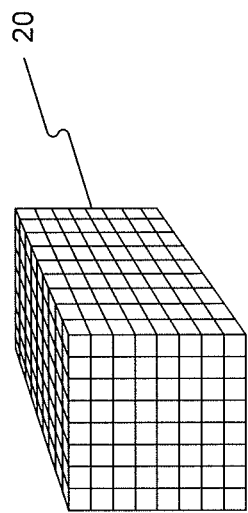
Figure 8C:
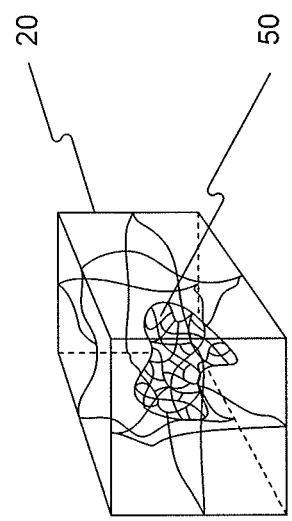

In some embodiments, in step 930, the processor may determine a discretization strategy to divide the energy application zone (e.g., zone 810) into a plurality of regions. The term discretization may also be referred to as, for example, division, separation, and partition. In some embodiments, the at least one processor may be configured to divide a portion of the energy application zone into at least two regions, for example, into the first and second regions. In some embodiments, the processor may be configured to divide at least a portion of the energy application zone independently of absorptive characteristics of the object. In some embodiments, the at least one processor may be configured to divide the portion of the energy application zone independently of energy applied to the object. For example, the discretization of the energy application zone into regions may be predetermined, regardless of the property of the object and the energy applied to the object. In some cases, the processor may acquire the predetermined discretization information, through, for example, a look up table, information stored in memory, or information encoded in the processor. Alternatively, discretization may occur dynamically using at least one processor, for example, processor 30, illustrated in FIG. 1. FIGS. 8A-8C illustrate exemplary discretizations of energy application zone 20.

The at least one processor may be configured to divide the portion of the energy application zone into at least two regions by using an algorithm, which may or may not be recursive. For example, the processor may discretize the space arbitrarily into some number of regions of equal size and shape. Optionally, the discretization may be applied in a predetermined manner, for instance, so that the number of regions is denser at the area of the energy application zone where an object is most likely to be positioned, and sparser near the edges of the energy application zone. In some embodiments, discretization is in accordance with information about the load.

For example, the processor may receive information (e.g., via a user input) regarding positions of objects within the energy application zone and, optionally, the spatial distribution of their dielectric properties (identifying, for example, a given volume as being occupied by water, and another volume as being occupied by a piece of bread). Each volume characterized by essentially uniform dielectric properties (in the above example, the water or the bread) may be defined as one region for purpose of discretization. At times, an object of uniform dielectric properties and irregular shape may be discretized into several regions, each with a more regular shape.

Alternatively or additionally, the discretization may be set in accordance with the amount of energy to be applied to different regions. For example, if a temperature gradient is required along a given volume, this volume may be discretized to many regions, to facilitate the identification of a combination of MSEs that result in the required temperature gradient. Additionally or alternatively, the discretization strategy may be chosen considering the required computation time and/or the accuracy and reliability required by the user, and/or the stability of the mathematical solution of Equations 4 and/or 5 below. For example, too large a number of discrete regions might reduce the stability of the mathematical solution. On the other hand, if the number of discrete regions is too small, it may be impossible to find a solution at all. In some embodiments, the processor may start with a first discretization scheme where the number of regions is minimal, and if solution is found to be impossible, the number of regions may be increased. If a solution is possible, the equations are solved. If the solution is not sufficiently accurate (for example, the differences between the obtained energies and the target energies is close to an upper allowed limit), discretization to more regions may be used. Alternatively or additionally to the number of regions, in some embodiments, the processor may be configured to change the shape and/or location of borders between regions. Alternatively or additionally to changing the discretization strategy or scheme, an equation that has a major contribution to the instability but has small contribution to the solution may be deleted from the set, and the reduced set of equations solved. Other methods for solving sets of linear equations numerically will be apparent to those skilled in the art.

Alternatively or additionally, the processor may either learn, or may be preprogrammed with the coordinates of each high-intensity region in each field pattern corresponding to each MSE. This is achievable because, as discussed earlier, the MSEs may result in predictable patterns with predictable hot spots. Therefore, when the processor receives an indication that the detector has received feedback indicative of absorption during a particular MSE condition (e.g., when a particular MSE is excited), the processor may determine that an object must be located in one of the hotspots corresponding to that MSE condition. The processor may repeat the process or using a recurring algorithm to gain additional information on the object. The more MSEs that are tested (e.g., excited) for feedback, the more information the processor may learn about the location and/or the absorptive properties of the object in the energy application zone. Over a series of such measurements with differing MSEs, the processor may iteratively narrow-in on the location of the object in the space and/or the absorptive properties of each discrete region of the object.

The foregoing is but one example of how the processor may acquire information on the location and/or dielectric properties of an object in an energy application zone. A discretization strategy may include any suitable method for causing the processor to represent the energy application zone as multiple regions. In some embodiments, the regions may be substantially equal in size. While multiple regions (e.g., two or more regions) may be discretized into equal size regions (e.g. as illustrated in FIG. 8A), the invention in its broadest sense contemplates any type of discretization, regardless, for example, of whether discretized regions are uniform in size or shape, and regardless of whether the discretization results in any recognizable pattern.

The at least one processor may be configured to divide the portion of the energy application zone into a plurality of regions based on an object in the energy application zone. For example, energy application zone 810 may be divided in such a manner that object 830 occupies a single region. In another example, energy application zone 810 may be divided in such a manner that object 830 occupies multiple regions, as shown in FIG. 7. The discretization strategy may depend on many factors, including but not limited to: desired resolution, properties of the loss profile, and available field patterns. For example, if the size of object 830 is $S_L$, and a desired resolution may require the object to include at least 100 regions, then average size of each region may be, for example, $S_L/100$. In this case, the size of different regions may or may not be the same. In certain locations of the object, the size of the divided regions may be smaller than other locations. In other words, the density of regions may vary across the entire object. Alternatively or additionally, the density of regions may vary across the entire energy application zone. For example, the dividing strategy may vary depending on whether a region corresponds to a portion of an object in the energy application zone that is targeted for energy application or whether the region corresponds to a region of the zone where no portion of the object is located or to a region comprising a portion of the object that is not targeted for energy application (each of the two latter regions can be termed "void zone"). For example, in one strategy, the entire void zone may be treated as a single region. In another exemplary strategy, the void zone may be divided into a plurality of regions in a similar manner as non-void zones. In this case, the dividing may be carried out in the entire energy application zone, regardless of the spatial occupation of the object. Alternatively, the dividing may be carried out separately for void and non-void zones. In yet another example, the void zone may be divided into a plurality of regions in a different manner than that in the non-void zone. For example, the average size of regions in the void zone may be larger than that inside the non-void zone. In other words, the density of regions in the void zone may be lower than that in the non-void zone. As illustrated in FIG. 8C, the discretization may be denser in some portions of the energy application zone but sparser in other regions. In some embodiments, the region where discretization is denser may be the region of the object to be heated, and the region where discretization is more dispersed may be the region empty of the object.

The regions may be of a regular or irregular shape. For example, in 3D cases, the regions may be regular cubic- or rectangular-shaped, as illustrated in FIG. 8A. Alternatively, the regions may be any irregular-shape depending on particular needs. For example, the energy application zone may be divided into somewhat random regions as shown in FIG. 8B. In some embodiments, a portion of the energy application zone is divided to regions of regular shape, and another portion to regions of irregular shapes.

The at least one processor may be configured to divide the energy application zone into the plurality of regions (e.g., the first and second regions) using a loss profile. For example, the dividing of the energy application zone may be related to the loss profile of the energy application zone. An exemplary process for constructing a loss profile is discussed in connection with FIG. 9A, where energy application zone 810 may be divided into multiple regions, with each region having substantially the same regular squared shape. As shown in FIG. 7, the regions N may be labeled from the upper left corner to lower right corner as 1, 2, 3, . . . , $N_d$. Object 830, which may occupy multiple regions, may include two kinds of materials having differing loss parameters $\sigma_a$ and $\sigma_b$. In the illustrated example of FIG. 7, region $R_a$ has loss parameter $\sigma_a$, and region $R_b$ has material with loss parameter $\sigma_b$. In this particular example, the void region $R_0$, which is outside the object but inside the energy application zone, has the loss parameter $\sigma_0$. The objective of the process is to create a loss profile inside energy application zone 810 which approximates the real loss profile characterized by $\sigma_a$, $\sigma_b$, and $\sigma_0$. To achieve this objective, the processor may assign each region (1 to $N_d$) an unknown loss parameter $\sigma_i$ (i=1, 2, 3, . . . , $N_d$). Such discretized σi is a numerical representation of the real loss profile with a resolution characterized by $N_d$. For example, if $N_d$ is large, there will be a large number of regions inside the energy application zone and the size of each region will be small.

As illustrated in FIG. 7, there may be provided two radiating elements 840 (such as antennas) to apply EM energy into energy application zone 810. Assuming that the MSEs determined in step 920 are, for example, phase differences between the two radiating elements 840, the MSEs may be represented by [$\theta_1, \theta_2, \ldots \theta_{Nm}$]. As discussed earlier, each MSE may correspond to a known field pattern inside energy application zone 810. Since the energy application zone has been discretized into $N_d$ regions, for each MSE $\theta_j$, a corresponding known field pattern may be represented by a series of local electrical field intensities [$I_{1j}, I_{2j}, I_{3j}, \ldots I_{Ndj}$]. The electrical field intensity at a particular region of the zone is proportional to the square of the electrical field amplitude at that region. Therefore, for all MSEs, the field patterns may be collectively written in matrix form as:

[$I_{11}, I_{21}, I_{31}, \ldots, T_{Nd1}$;
$I_{12}, I_{22}, I_{32}, \ldots I_{Nd2}$;
. . .
$I_{1Nm}, I_{2Nm}, I_{3Nm}, \ldots I_{NdNm}$]

This matrix, referred to as the I matrix, may be determined after the MSEs and the discretization are determined.

In step 940, the processor may apply MSEs (e.g., the selected MSEs), and thereby may control the EM energy to be applied into the energy application zone. Still in step 940, for each applied MSE, the energy loss in the energy application zone may be measured. For example, such energy loss may be measured by comparing the amount of energy applied from the radiating element (e.g., incident energy) to that received by the same radiating element (e.g., reflected energy) and/or to that received by other radiating element (e.g., transmitted energy). The difference between the applied energy and the received energy may correspond to the energy loss in the energy application zone. In one example, the application time of each MSE may be the same. In this case, the energy loss may be represented as power loss P, which may be determined from the power applied to and received from the energy application zone. For each MSE ($\theta_j$) the power loss $P_j$ may be related to the local intensities $I_{ij}$ as follows:

$$\tfrac{1}{2}(\sigma_1 I_{1j} + \sigma_2 I_{2j} + \ldots + \sigma_{Nd} I_{Ndj}) = P_j, \quad (2)$$

Thus, for all MSEs, the measured power loss P, the matrix I and the unknown loss profile σ may satisfy the following equation:

$$\tfrac{1}{2}\sigma I = P \quad (3)$$

In step 950, the matrices of the above Equation (3) may be constructed from the measured power loss P and known matrix I. The unknown loss profile σ may be solved mathematically. For example, σ may be solved by inverting matrix I and multiplying the inverted matrix I by vector P as follows:

$$\sigma = 2PI^{-1}. \quad (4)$$

If the above equation is solvable (step 960: YES), the loss profile σ may be created and the process ends (step 980). If the equation is not solvable (step 960: NO), or the equation system is mathematically ill-conditioned, ill-posed, and/or singular, the processor may conduct step 970, where the MSEs and/or the discretization strategy may be modified, with the process returning to step 940. When the equations are solved, the loss profile σ may be obtained, with the accuracy of the loss profile depending on the quality of the equations' solution.

Figure 9A:
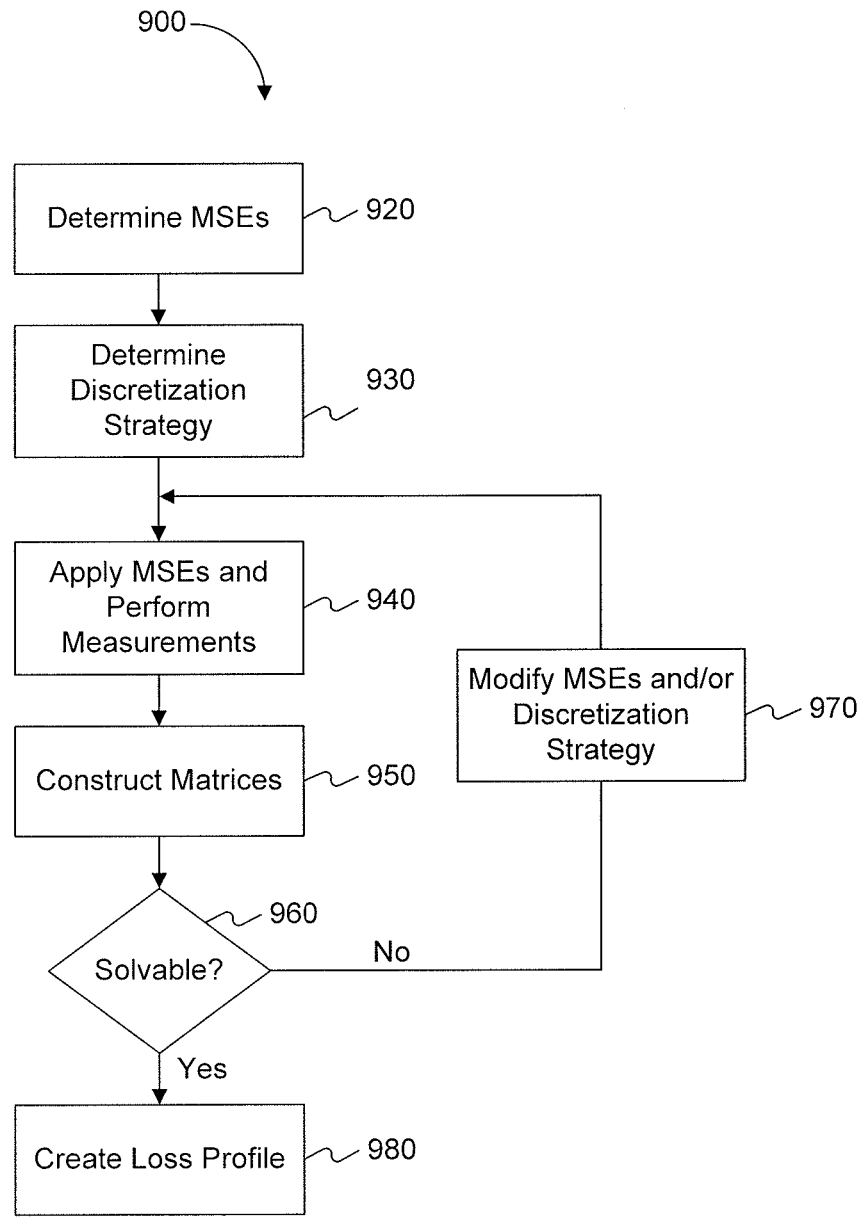
FIG. 9A is a flow chart of exemplary steps of creating a loss profile in accordance with some embodiments.

The above description explains how the method generally depicted in FIG. 9A allows the determination of a loss profile σ in accordance with some embodiments. A method, depicted in FIG. 9B, may allow applying specified energies to specified regions of the energy application zone, in accordance with some embodiments.

In step 915B, the processor may determine a target energy distribution, for example, a definition of two regions (for example regions $R_a$ and $R_b$ illustrated in FIG. 7) and target energy to be applied to each region. This determination may be performed, for instance, by reading input through an interface, for example by reading a machine readable tag, e.g. barcode and/or RFID tag. In some embodiments the input is further processed by the processor to determine the target energy distribution. For example, the information received from the interface may relate to the kind of object placed in different areas within the energy application zone, and the processor may process this information to determine the amounts of target energy to be applied to different regions of the energy application zone.

In step 920B, MSEs may be determined, as described in regard of step 920 of FIG. 9A.

In step 930B, a discretization strategy may be determined. Optionally, the strategy may be determined as described above in the context of FIG. 9A. In some embodiments, the discretization strategy may be determined considering the target energy distribution determined in step 915B. For example, the border between regions $R_a$ or $R_b$ and their surroundings may be discretized more or less densely than other portions of these regions; the regions outside regions $R_a$ or $R_b$ may be discretized more sparsely than regions $R_a$ or $R_b$, etc. The determined discretization strategy and the determined target energy distribution, may together define a target energy $E_j$ for each region $r_j$ in the energy application zone.

In step 950B, equations may be constructed for computing durations and/or powers each of the MSEs should be applied in order to obtain the target energy distribution. The energy $E_j$ applied to each region $r_j$ may be given by the sum of the amounts of energy, each delivered to region $r_j$ by one of the MSEs $\theta_i$. Each such amount of energy may be denoted as $E_{ji}$. $E_{ji}$ depends on the field intensity $I_{ji}$ excited by corresponding MSE $\theta_i$, in region $r_j$, and on a weight $a_i$, which defines the duration and/or power with which MSE $\theta_i$ is applied. Therefore, the energy applied over all the MSEs to a region $r_j$ may be given by:

$$E_j = a_1 I_{j1} + a_2 I_{j2} + \ldots a_K I_{jK}, \quad (5)$$

where K is the number of available MSEs.

Equation (5) may be constructed in each region $r_j$. Weights $a_1$ to $a_K$ may be solved based on a plurality of equations corresponding to a plurality of regions. That is, knowing target energy $E_j$ in each region $r_j$ and field intensity vector $I_{j1}$ to $I_{jK}$, weights vector $a_1$ to $a_K$ may be solved using known mathematical methods. Weights $a_i$ may be proportional, for instance, to the power at which MSE $\theta_i$ may be applied. In some embodiments, the weights may be proportional to the duration of time for which MSE $\theta_i$ is applied.

In step 960B, the processor may determine whether the set of equations is solvable. If so (step 960B: YES), the equations may be solved (step 965B), and energy may be applied to the energy application zone in accordance with the solved values of $a_i$ (step 980B). In this way, the energy applied to each of the regions $R_a$ and $R_b$ may be as determined in step 915, within accuracy limits that depend at least on the quality of the equations' solution.

If in step 960B it is determined that the equations are not solvable (step 960B: NO), the processor may modify, in step 970B, the applied MSEs and/or the discretization strategy. New equations may then be constructed, and the solvability of this new set of equations may be checked. This process may continue until the equations are solvable, or until the processor decides that the acquired energy distribution cannot be obtained, in which case, the user may be prompted accordingly.

Figure 9B:
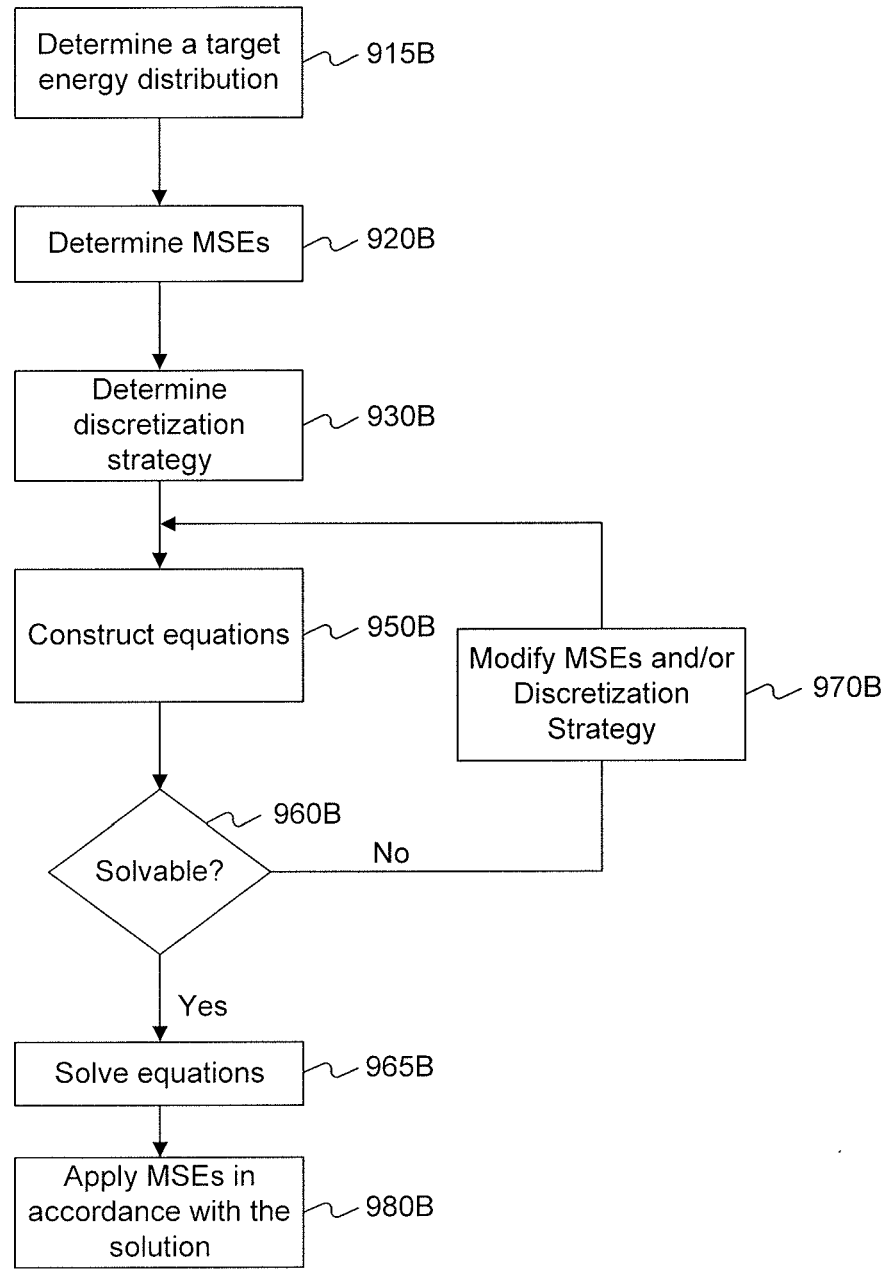
FIG. 9B is a flow chart of an exemplary method for applying specified energies to specified regions of the energy application zone in accordance with some embodiments.

The method described in FIG. 9B may be carried out when an object is in the energy application zone. Optionally, regions $R_a$ and $R_b$ may coincide with regions of different items in the energy application zone, for example, soup and meat, respectively.

The processor may determine information indicating a spatial location of the object in the energy application zone. The loss profile σ provides a map of loss property or energy absorbability in the energy application zone. The object may often have a different loss property than a void portion in the energy application zone. Therefore, from the loss profile, the processor may determine the spatial locations of the object in the energy application zone by analyzing loss property distribution in the energy application zone. Such information may be used to control the energy application, for example, by determining proper discretization strategy, and/or for determining the target energy distribution.

Alternatively, the processor may determine the spatial location of the object from the known field patterns. For example, the processor may regulate the source to generate a known field pattern with known locations of one or more high- and low-intensity regions in the energy application zone. The processor may supply electromagnetic energy into the energy application zone and analyze the reflected energy from the energy application zone. If the reflected energy is high, which may indicate that the energy loss in the energy application zone is low, the processor may determine that the object may not be located in the one or more high-intensity regions. On the other hand, if the processor determines that the reflected energy is low, which may indicate that the energy loss in the energy application zone is high, the processor may determine that the object may be located, or at least partially located in the one or more high-intensity regions. By such analysis, the processor may determine information indicating the location of the object in the energy application zone.

According to some embodiments, the processor may be configured to control the source to selectively excite a plurality of differing electromagnetic field patterns in the energy application zone, and the processor may be configured to select at least one pattern from the plurality of patterns. For example, the processor may select a plurality of MSEs to be applied, and each of the plurality of MSEs may generate a different field pattern in the energy application zone. By applying these MSEs, a plurality of field patterns may be excited in the energy application zone. The plurality of field patterns may or may not couple to each other. When the field patterns are not coupled, each of the plurality of MSEs may correspond to a single field pattern. Therefore, by selecting an MSE, at least one field pattern may be selected by the processor.

In accordance with some embodiments, the processor may be configured to sequentially select multiple differing electromagnetic field patterns. For example, the processor may select a set of MSEs comprising a range of controllable parameters which are sequentially selectable by the processor. In some embodiments, a plurality of frequencies may be chosen as MSEs, where each frequency may correspond to a different field pattern. In this case, the processor may sequentially select frequencies from the plurality and thereby generate multiple differing field patterns in the energy application zone.

In accordance with some embodiments, the processor (or another processor in the apparatus) may be configured to calculate the at least one pattern. As discussed previously, a field pattern may be "calculated" either by testing, simulation, or mathematical calculation, including analytical and/or numerical calculation. The processor may calculate the field pattern in advance of energy application or may conduct the calculation on-the-fly as part of an energy application process. The calculation may be based on known properties of the energy application zone and/or MSEs to be applied, and/or on real-time measurement results.

In accordance with some embodiments, the at least one processor may be configured to distinguish between locations of the first region and the second region. The term "distinguish" refers to the processor discriminating, differentiating, identifying, or otherwise demarking differing spatial locations in a controlled manner. For example, as shown in FIG. 7, an energy application zone 810 may include a plurality of regions 1, 2, 3, . . . , $N_d$, and the processor may be configured to distinguish, for example, region 1 from region 2. These two regions may be identified differently by the processor, and/or have addresses that are stored in different locations in a memory unit connected to the processor.

According to some embodiments, the processor may be configured to apply energy over each MSE for a certain amount of time, which may be the same or different from an amount of time for which energy is applied over another MSE. For example, in some embodiments, all MSEs may be applied at maximal possible power (determined, for example, by technical limitations of the energy source and/or an amplifier connected to or embedded in the source), and the amount of time may differ between the differing MSEs, such that the product of the amount of time multiplied by the maximal possible power is proportional (or, in some embodiments, equal) to the coefficient (e.g., weight) that corresponds to the particular MSE.

Similarly, in some embodiments, the processor may be configured to apply energy over each MSE at a certain amount of power, which may be the same or different from an amount of power at which energy is applied over another MSE. For example, in some embodiments, all MSEs may be applied for a fixed duration, and the power may differ in such a manner that the product of the time multiplied by the power may be proportional or, in some embodiments, equal to the coefficient that corresponds to the particular MSE. In some embodiments, both duration and power may be adjusted or set to apply a certain amount of energy over a given MSE, for example, a power maximum and a time minimum may be set, and the energy may be applied at power which is at or below the maximum for a time that is at or above the minimum.

Figure 9C:
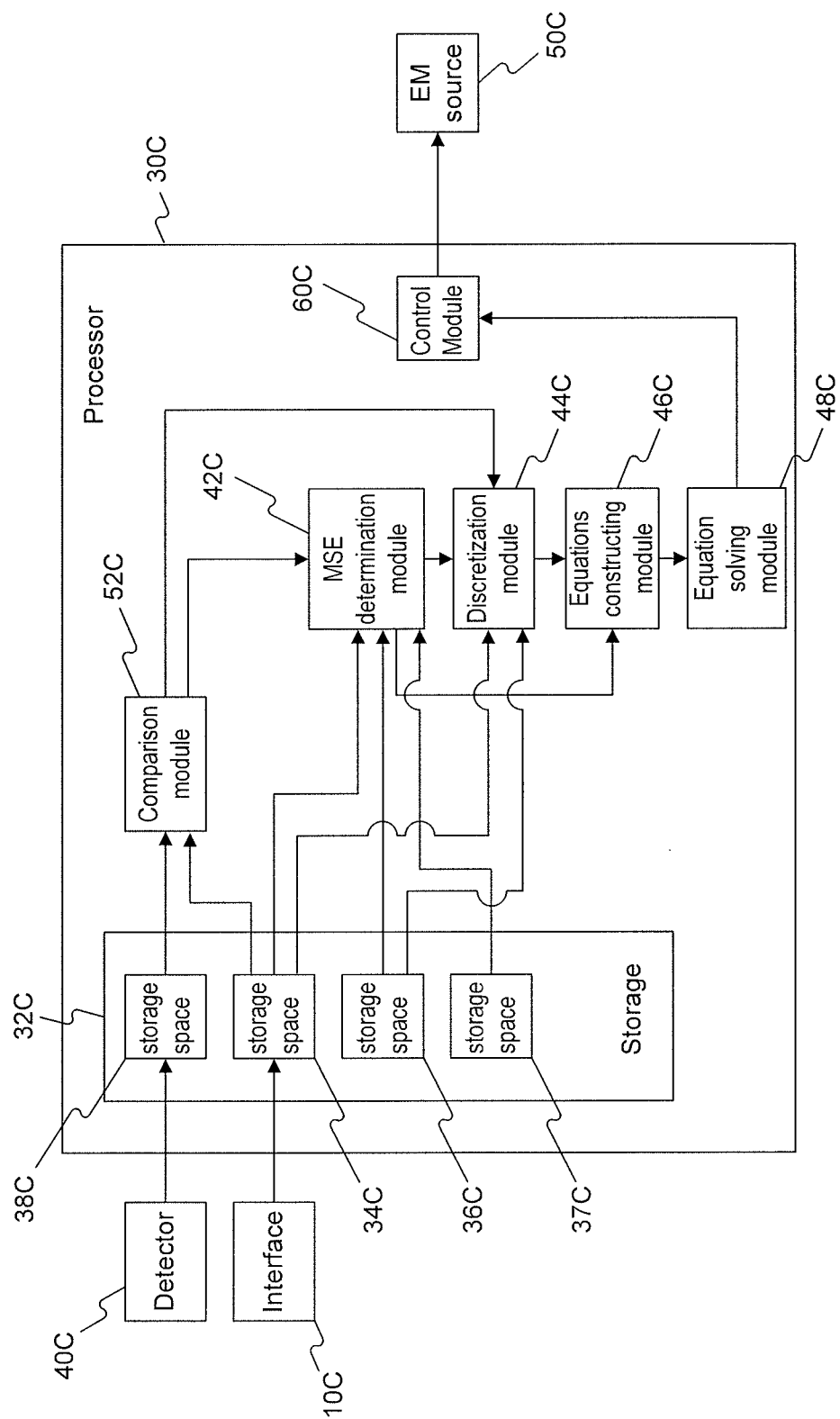
FIG. 9C shows a simplified block diagram of a processor configured to regulate an electromagnetic energy source to supply energy to an energy application zone in accordance with some embodiments.

FIG. 9C shows a simplified block diagram of a processor 30C configured to regulate an electromagnetic energy source 50C to apply energy to an energy application zone in accordance with a given target energy distribution, in accordance with some embodiments. Processor 30C may include, be identical to, or be part of processor 30. Additionally or alternatively, processor 30C may be a separate processor in addition to processor 30.

Processor 30C may include storage 32C, for storing data, and several processing modules for processing data, for example, data stored in storage 32C. Storage or portion thereof may be integrated within processor 30C or may be an external component in communication with processor 30C.

Optionally, storage 32C may be connected to an interface 10C, for receiving via the interface, for example, a target energy distribution. Optionally, storage 32C may comprise storage space 34C for storing the target energy distribution. Storage space 34C may be continuous, segmented, or have any other configuration known in the art of storing data electronically.

In some embodiments, storage 32C may also have storage space 36C, for storing a loss profile of the energy application zone or a portion thereof. The loss profile may be sent to storage space 36C from interface 10C. Alternatively or additionally, processor 30 of FIG. 1 (or another processor) may be configured to construct the loss profile as described herein and store the loss profile in storage space 36C.

Optionally, storage 32C may also have storage space 37C, which may store available MSEs and field patterns associated with each of the stored available MSEs. Field patterns associated with different MSEs may be patterns obtained with an empty energy application zone, and/or energy application zone having a standard load in it. Optionally, these field patterns may be used for initial estimation of the MSEs that may be used, out of the available ones, and/or for constructing an initial MSE combination that may result in energy distribution similar to the one given as a target. Optionally, storage 32C may also have a storage space 38C for storing energy distributions obtained (e.g., measured or detected) in the energy application zone during operation.

Processor 30C may include an MSE determination module 42C. This module may be configured (optionally, by running a suitable software) to determine which of the available MSEs are to be used at any given stage of operation (e.g., during an EM heating process). In some embodiments, one or more of the available MSEs may be used by default, and the MSE determination module 42C may be omitted. In other embodiments, MSE determination module 42C may determine which MSEs to use, for example, based on the target energy distribution. In such case, MSE determination module 42C may retrieve target energy distribution data stored in storage space 34C. In some cases, if the target energy distribution generally resembles a field pattern associated with one or more MSEs in storage space 37C, the MSE determination module 42C may use such MSEs preferentially over others. For instance, if the target energy distribution has relatively large values at the center of the energy application zone and much smaller values at the circumference of the energy application zone, MSE determination module 42C may select one or more MSEs that are associated with field patterns having maximum intensity near the center of the energy application zone, and less MSEs associated with field patterns concentrated at the circumference of the zone. Alternatively or additionally, MSE determination module 42C may select MSEs that are relatively easier to excite and/or control, and select other MSEs only if the more easily excited MSEs would not provide satisfactory results.

Optionally, MSE determination module 42C may be connected to control module 60C, which may control source 50C to excite the selected MSEs and optionally to measure the energy distribution obtained in the energy application zone as a result of that excitation. A power supply, a modulator, an amplifier, and/or radiating element(s) (or portions thereof), for example power supply 12, modulator 14, amplifier 16, and radiating element 18 illustrated in FIG. 1, may be parts of source 50C. The measurements may be carried out by one or more detector(s) 40C. It is noted that source 50C and detector 40C may in practice be embodied in the same parts, for example, the same radiating element may be used for supplying energy to the energy application zone and for measuring excited field patterns, even if not necessarily at the same time. The results of the measurements may be stored in storage space 38C.

Processor 30C may also include a discretization module 44C, configured to logically divide the energy application zone into regions, for example, as depicted in FIG. 8A or 8B. Optionally, discretization module 44C may divide the energy application zone in accordance with a loss profile stored in storage space 36C. For example, module 44C may divide the energy application zone such that volumes characterized by similar losses will be included in a single region. In this case, module 44C may retrieve data from storage space 36C. Alternatively or additionally, discretization module 44C may divide the energy application zone in accordance with the target energy distribution. For example, module 44C may divide the zone more densely where more abrupt energy changes are needed in order to meet the target distribution. In this case, discretization module 44C may be allowed to retrieve data from storage space 34C.

Processor 30C may also include an equations constructing module 46C, configured to construct for example equations (5) to be solved in order to obtain energy application scheme that may result in energy distribution corresponding to the target energy distribution. Equations constructing module 46C may define the field intensity of each of the MSEs selected by module 42C, in each region to which the energy application zone is divided by discretization module 44C, and may take into account measurement results stored at storage space 38C.

Once the equations are constructed by module 46C, equation solving module 48C may attempt to solve the equations, for example, by applying suitable numeric strategies, as known in the art of numeric analysis per se. If the equations are solvable, module 48C may trigger control module 60C to regulate source 50C to excite in the energy application zone field patterns in accordance with the solution. In some embodiments, the resulting energy distribution may be measured by detector 40C, saved in storage space 38C, and compared to the target energy distribution by a comparison module 52C. If the comparison is not satisfactory, comparison module 52C may trigger module 42C and/or module 44C to amend the selected MSEs and/or discretization. If equation solving module 48C finds that the equations are not solvable, module 48C may trigger module 42C and/or module 44C to amend the selected MSEs and/or discretization.

In some embodiments, the amounts of energy delivered over each MSE may be predetermined in order to achieve a desired energy application profile. For example, the energy application profile may call for uniform or substantially uniform energy application throughout the object; or controlled non-uniform energy application, delivering a first amount of energy to a first region of the object, and a second amount of energy to a second region of the object. Note that power control and time control are not mutually exclusive. A desired energy application profile may be achieved by regulating both the power level and duration of application.

Some embodiments may also include a processor configured to apply energy to the first region and the second region based on energy dissipated in each region. As discussed previously, the processor may acquire a loss profile of the energy application zone, which represents the energy dissipation properties in each region of the energy application zone. Acquiring the loss profile may include reconstructing the loss profile, for example, by the method summarized in FIG. 9A. Alternatively, the loss profile may be retrieved, for instance, from memory or via an interface.

Since the energy absorbed in any given region is a function of the loss profile, the processor may control energy application to each region based on the information related to the energy dissipation property associated with that region. For example, if the goal of energy application is to achieve uniform absorption of energy, the processor may, for example, control the source to apply lower power to a region having a higher energy dissipation; and apply higher power to another region having a lower energy dissipation. Alternatively, the processor may control the source to apply power for a shorter duration for the region having a higher energy dissipation rate; and apply power for a longer duration for the region having a lower energy dissipation rate. In another example, the goal may be uneven absorption of energy. In this case, the processor may determine the desired amount of energy to be applied to different regions having different energy dissipation properties such that the energy each region absorbs is in accordance with the goal.

In accordance with some embodiments, the processor may be configured to apply energy to the first region and the second region based on target total energy to be applied to each region or to be or absorbed in each region. For example, if a given region in the energy application zone is covered by hot spots of some given field patterns, the processor may apply energy to the region by using MSEs corresponding to those given filed patterns to achieve an energy application goal such that the summation of energy (total energy) applied to the region reaches a desired amount.

In some embodiments, when the at least one processor is configured to apply energy over a plurality of frequencies, an amount of energy applied may be frequency-dependent. When the at least one processor is configured to apply energy over a plurality of phases, the amount of energy applied may be phase-dependent. Similarly, when the at least one processor is configured to apply energy over a plurality of amplitudes, the amount of energy applied may be amplitude-dependent. Frequency, phase, and/or amplitude dependency of amounts of energy applied may change from one energy application cycle to another. For example, each time feedback from the energy application zone is received, the processor may determine the frequency, phase, and/or amplitude dependency in accordance with the feedback. An amount of energy is considered frequency dependent if the amount of energy applied over a wave having one frequency may differ from that applied over a wave having another frequency, while waves of the same frequencies may apply the same amounts of energy. Similarly, an amount of energy is considered phase dependent, if the amount of energy applied over a wave having one phase may differ from that applied over a wave having another phase, etc. The processor may apply energy over a given frequency, phase, or amplitude (or relative amplitude) by exciting one or more electromagnetic waves having the given frequency, phase, or amplitude (or relative amplitude), respectively.

In some embodiments, the processor may sweep the frequency, phase, and/or amplitude of the electromagnetic waves to change MSEs thereby altering field pattern in the energy application zone. As the field patterns change, the location, shape, and/or field intensity of high- and low-intensity regions may also change. In this way, energy delivery (application) to the object may be altered through a processor's selection of MSEs, (e.g., by altering variables such as frequency, phase, and/or amplitude). The processor may be configured to alter an amount of energy applied to a region a plurality of times during an energy application cycle.

In some exemplary embodiments, the processor may regulate the source to apply energy repetitively to the energy application zone. For example, the processor may apply an MSE and excite its corresponding field pattern in the energy application zone for a predetermined time period, then apply another MSE and excite another field pattern in the energy application zone for another predetermined time period. The duration of the energy application and/or the rate at which energy is applied may vary. For example, in some embodiments, energy may be applied to the energy application zone 120 times per second. Higher (e.g. 200/second, 300/second) or lower (e.g., 100/second, 20/second, 2/second, 1/second, 30/minute) rates may be used. One of skill in the art will understand that the energy application rate may be constant or variable.

In some embodiments, a set of MSEs may be applied sequentially during a period of time (herein referred to as "MSE scanning"). As used herein, "MSE scanning" is interchangeable with "MSE sweeping." Both "scanning" and "sweeping" may include changing MSEs in one dimension or multi-dimensions. For example, a one-dimensional scanning may refer to changing MSE by changing only frequency, phase, or amplitude. A multi-dimensional scanning may refer to changing MSE by changing two or more of frequency, phase, and amplitude, or any other variables that may be included in an MSE. An MSE scanning may also be repeated at a predetermined rate or after a predetermined interval. At times, a sequence of one or more scans may be performed, e.g., once every 0.5 seconds or once every 5 seconds or at any another rate. The MSE selection in different scans may or may not the same.

After a given amount of energy (e.g., a predetermined number of Joules or kilo-Joules for instance, 10 kJ or less or 1 kJ or less or several hundreds of joules or even 100 J or less) has been applied or dissipated into the load or into a given portion of a load (e.g., by weight such as 100 g or by percentage, such as 50% of load), a new scan may be performed. In some cases, the amount of energy is provided using other means, such as a readable tag (e.g., an RF/barcode, possibly with previous scanning information or presets) or by using temperature sensors.

In some embodiments, the rate of energy application or the scanning rate may depend on the rate of change in spectral information between energy applications or scans. For example, a threshold of change in dissipation and/or frequencies (e.g., a 10% change in sum integral) may be provided or different change rates associated with different energy application/scan rates, for example using a table. In another example, what is determined is the rate of change between energy applications/scans (e.g., if the average change between energy applications/scans is less than the change between the last two energy applications/scans). Such changes may be used to adjust the period between energy applications/scans once or more than once during energy application process. Optionally or alternatively, changes in the system (e.g., movement of the object or structure for holding the object) may affect the energy applications/scans rate (typically major changes increase the rate and minor or no changes decrease it).

Figure 10:
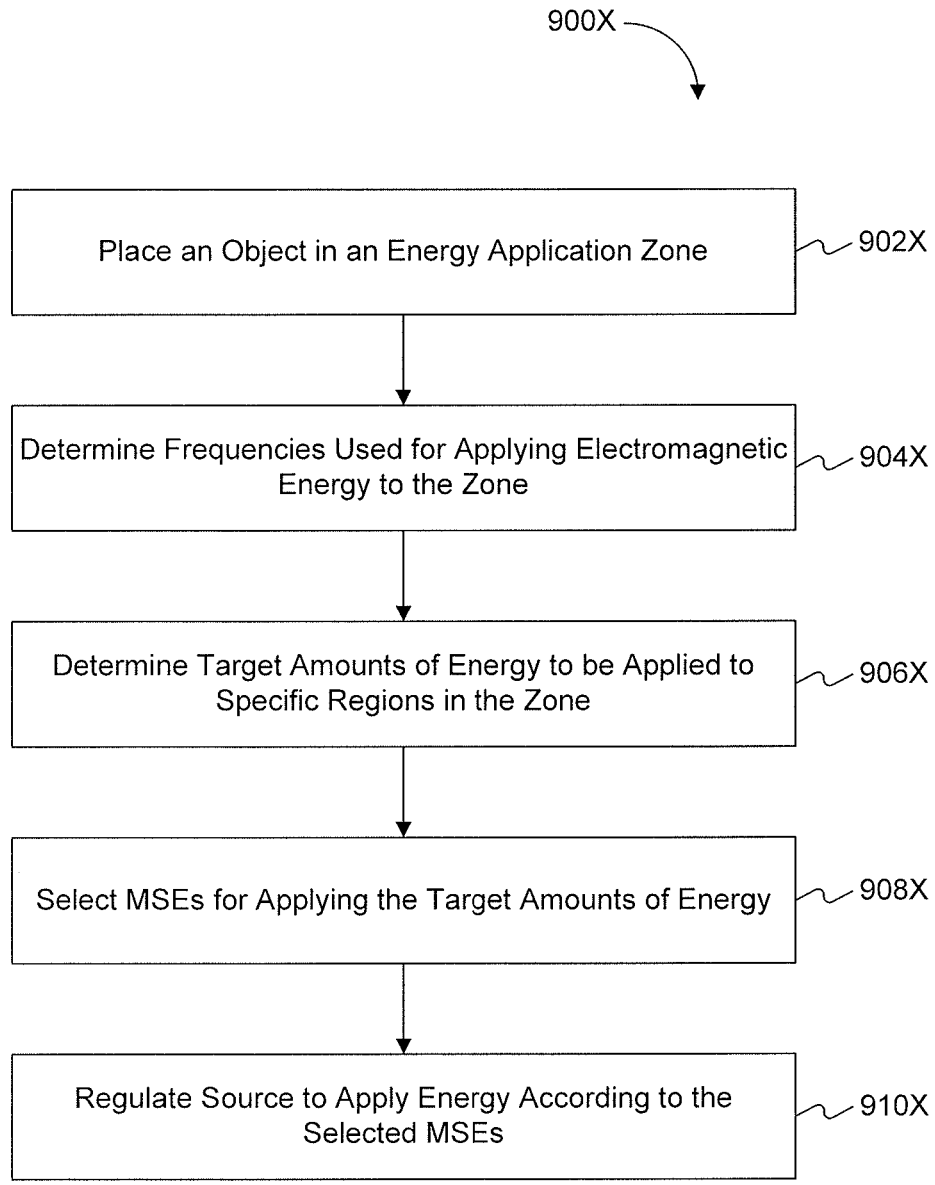
FIG. 10 is a flow chart of an exemplary method for applying electromagnetic energy to the energy application zone, in accordance with some embodiments.

FIG. 10 is an exemplary flow chart 900X of a method for applying electromagnetic energy to an energy application zone according to some embodiments. In step 902X, an object may be placed in an energy application zone. Some embodiments may omit this step, and are effective once the object is in the energy application zone. The energy application zone may support electromagnetic resonances at one or more resonant wavelengths. For example, object 50 (or a portion thereof) may be placed in cavity 20, which may be a cuboid having three dimensions—length, width, and height, each equal to 20 cm, and the wavelength of the largest resonant wavelength is given by $\sqrt{2}$ 20 cm. The largest resonant wavelength, as well as the corresponding lowest resonance frequency, may also be found experimentally, by sweeping the cavity with waves of varying frequencies, and then detecting the absorption in the cavity. The first absorption peak (or reflection deep) may correspond to the lowest resonant frequency and the longest resonant wavelength supported by the cavity.

In step 904X, a frequency or a set of frequencies may be determined, at which the electromagnetic energy will be applied to cavity 20. The source may be configured to apply energy at particular frequencies (or wavelengths) that meet the modal condition in the zone, e.g., where the predetermined wavelength is greater than ¼ of the largest resonant wavelength supported by the energy application zone. In the above example, the source may be configured to apply energy only at wavelengths larger than $\sqrt{2}$ 20/4 which is approximately 7 cm. Such wavelengths correspond to frequencies smaller than about 4.3 GHz. Depending on the embodiment, as described earlier, a particular magnetron or a semiconductor oscillator may be used for generating AC waveforms at one or more predetermined frequencies. In some embodiments, step 904X may be omitted. For example, in some embodiments, the source of electromagnetic energy may be configured to apply energy at known frequencies that may or may not meet the modal condition, and step 904X may be omitted. In some embodiments, the processor may be configured to control dimensions of the energy application zone, for instance, by moving a wall of a cavity, and step 904X may be carried out each time these dimensions change.

In step 906X, a targeted amount of energy to be applied to a specific region in the zone may be determined. Alternatively or additionally, a targeted energy dissipation pattern in the object may be determined. For example, differing targeted amounts of energy to be applied to at least two regions in the object may be determined. The regions and differing amounts of energy may be specified by a user as a function of known characteristics of the object. In some embodiments, the regions and differing amounts of energy to be applied or dissipated may be specified by other means, such as a readable tag (e.g., an RF/bar-code) placed on the object. Alternatively or additionally, the processor 30 may be configured to sense the location of the object and energy absorption characteristics within the object. The processor (e.g., processor 30 or 30C) may then determine the regions to which the targeted amounts of energy should be applied. For example, in connection with FIG. 1, processor 30 may determine the characteristics of object 50 using feedback signals acquired by radiating elements 18, and detected by detector 40.

In step 908X, a suitable MSE or a suitable energy delivery scheme comprising two or more MSEs may be selected to apply the electromagnetic energy to the zone, based on the determined targeted amount of energy or targeted energy dissipation pattern in the object. For example, processor 30 may determine frequency, phase, amplitude, or any combinations thereof, of electromagnetic waves to be transmitted into the zone.

In step 910X, the processor may regulate the source to apply the energy according to the selected MSE(s). The processor may control the various parameters associated with the MSE(s) and regulate the various components of the source to achieve a targeted energy distribution in the energy application zone. Exemplary controls are described in connection with FIGS. 1 and 6A-6E. The processor may also regulate the time and power during which an MSE is used to apply energy.

In some embodiments, radiating elements may be selected for exciting a certain mode in accordance with the positioning of the radiating elements in the energy application zone. The position of the radiating element may be selected to effectively excite a desired mode and/or to reject an undesired mode. This and other optional features of some embodiments are explained below in reference to FIGS. 11A, 11B, 11C, 12A, and 12B.

Figure 11A:
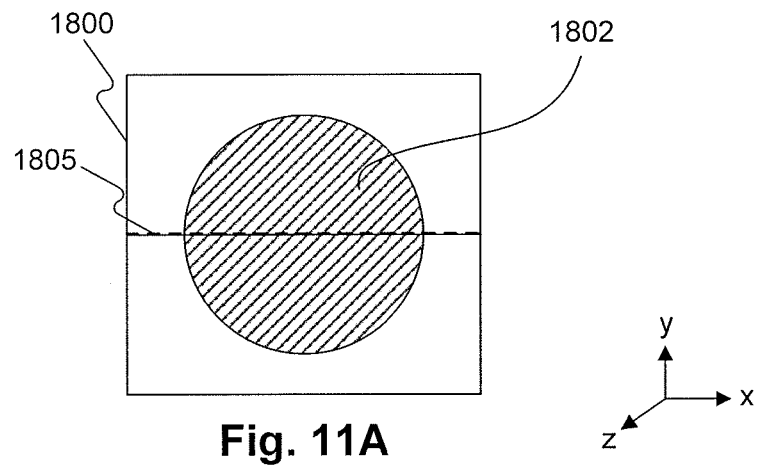
FIGS. 11A-11C illustrate exemplary antenna placement/selection strategies in a degenerate cavity, in accordance with exemplary embodiments.

The concept of rejecting modes is illustrated with reference to FIGS. 11A and 11B, which show X-Y cross sections of two modes 1802 and 1806 excitable in cavity 1800. Mode 1802 is a $TM_{11}$ mode and mode 1806 is a $TM_{21}$ mode. Mode $TM_{11}$ may be excitable at every frequency that is equal to or greater than a lower cutoff frequency $f_{11}$ and $TM_{21}$ may be excitable at every frequency that is equal to or greater than a higher cutoff frequency $f_{21}$. Thus, at intermediate frequencies between $f_{11}$ and $f_{21}$, $TM_{11}$ may be excited without exciting $TM_{21}$, but there is no frequency at which $TM_{21}$ is excitable and $TM_{11}$ is not. Therefore, if one desires exciting $TM_{11}$ at a frequency higher than $f_{21}$ without exciting $TM_{21}$, $TM_{21}$ may have to be rejected. In the present discussion, rejecting a mode may refer to preventing or substantially decreasing the excitation of the mode.

In some embodiments, a desired mode may be excited and an undesired mode may be simultaneously rejected by selecting for the excitation a radiating element positioned at or near a null of the undesired mode, and at or near a maximum of the desired mode. A null of a mode is any location in the energy application zone where the field intensity of the mode is permanently (or in all phases) zero, and a maximum of a mode is any location where the field intensity of the mode reaches an overall maximal value at all phases (or at every instant). A radiating element positioned at the null of a mode does not excite the mode (regardless of the frequency applied), and a radiating element positioned near the null may excite the mode only to a small degree. For example, line 1803 in FIG. 11B is a collection of null points of mode $TM_{21}$. Line 1803 is a cross section of a plane, which goes along the z axis. This plane is referred herein as plane 1803. A radiating element positioned at any point of plane 1803 may not excite mode $TM_{21}$, even at frequencies higher than $f_{21}$.

Figure 11B:
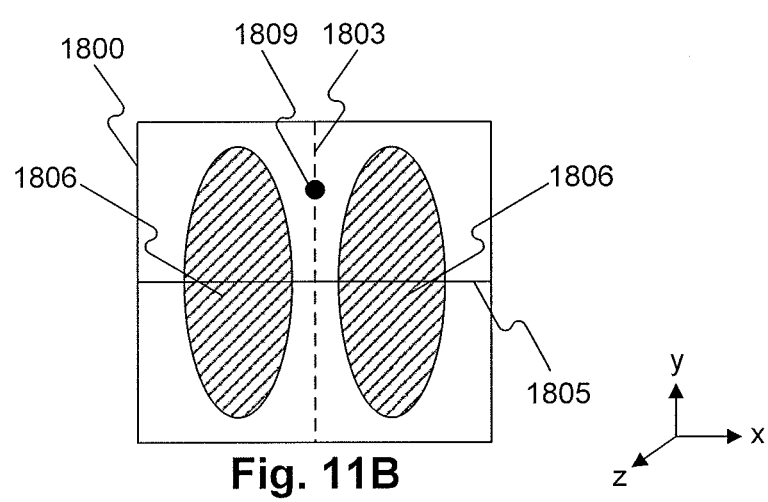
Figure 11C:
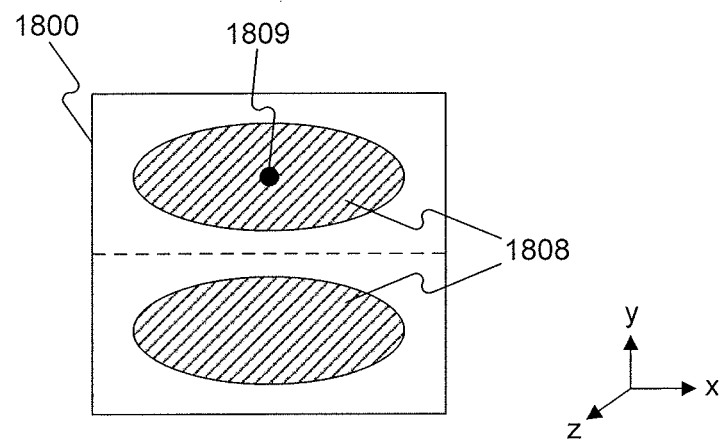

Point 1809 in FIG. 11B is on line 1803, and therefore a null of mode $TM_{21}$. Point 1809 is a cross section of a line, which goes along the z axis. This line is referred herein as line 1809. Since line 1809 within plane 1803 is not at a null of mode $TM_{11}$(1802), mode 1802 may be excited by a radiating element positioned at line 1809. In practice, the radiating element may be positioned anywhere on plane 1803 without exciting mode 1806. Similarly, the radiating element may be positioned anywhere on line 1809 to excite mode 1802 without exciting mode 1806. In some embodiments, however, the radiating elements may be positioned at the upper (and/or lower) base of the cavity, at a position in the XY plane.

Figure 12A:
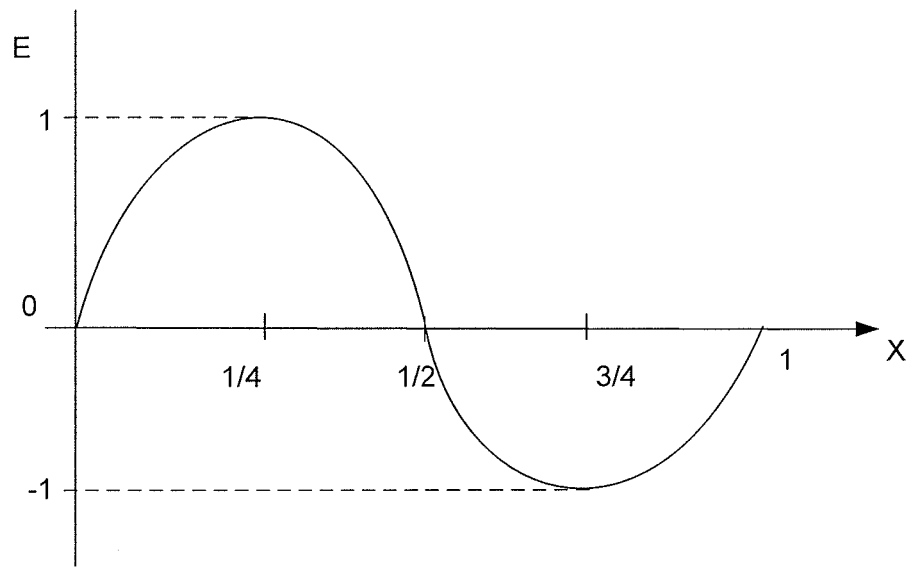
FIGS. 12A and 12B show exemplary normalized magnetic field magnitude curves.

Another way to reject a mode may include using two or more radiating elements, positioned at two or more locations where the magnitude of the electric field of the mode to be rejected is of opposite signs. For example, FIG. 12A depicts the (normalized) magnitude of the electric field of mode 1806 along line 1805. As shown in the figure, at x=0.5 (which is a point within plane 1803), the field is zero, at x=0.25 the field is +1 and at x=0.75 the field is −1. Thus, in some embodiments, two radiating elements, one at x=0.25 and the other at x=0.75 (or at any other two points where the field has opposite signs and equal magnitudes) may be selected to radiate RF waves at the same amplitude and phase, to cancel each other, and thus reject an undesired mode. If the fields at the locations of the two radiating elements have opposite signs and different absolute values, they may still be used for rejecting the undesired mode, if, for instance, their amplitudes are tuned such that sum of the products of field and amplitude at each radiating element location is zero. It is noted that while the above discussion is focused on different points along the X axis, similar considerations may be applied also for points having different y values and/or z values.

In some embodiments, a desired mode may be excited by emitting energy via two antennas that are oriented anti-parallel to each other, or that are oriented parallel to each other but emit waves at a phase shift of 180° between each other, and are located at points where the field pattern has opposite sign. Similarly, in some embodiments, modes may be rejected by emitting energy via two antennas that are oriented anti-parallel to each other, or that are oriented parallel to each other but emit waves at a phase shift of 180° between each other, and located at points where the field pattern has the same sign.

Figure 12B:
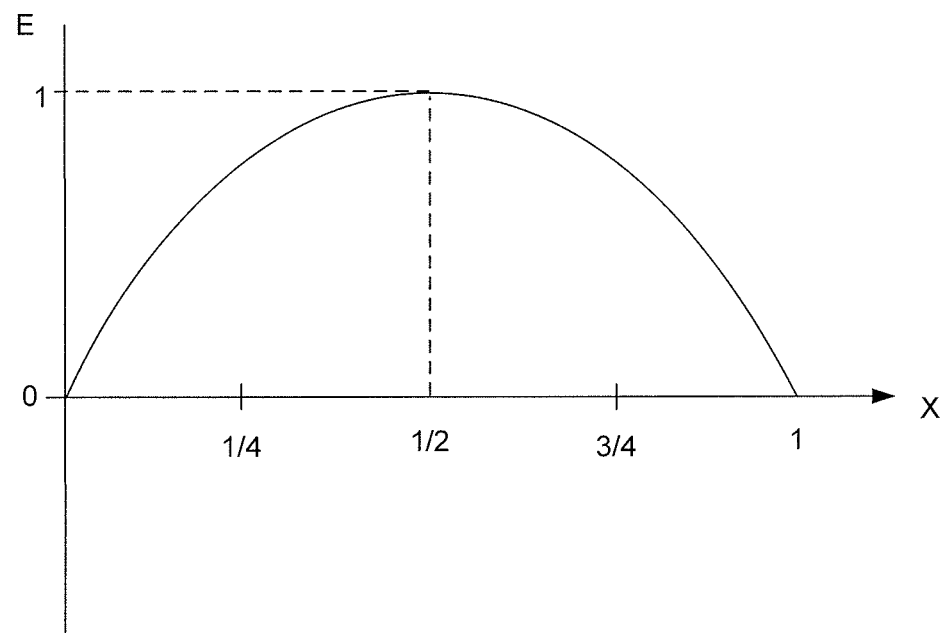

FIG. 12B depicts the (normalized) magnitude of the electric field of mode 1802 along line 1805. As shown in the figure, the field is maximal at x=0.5, and the field at x=0.25 is equal (both in magnitude and in sign) to the field at x=0.75. Thus, two antennas, one at x=0.25 and the other at x=0.75 that emit at the same amplitude and phase may tend to excite mode 1802. However, two antennas that are oriented anti-parallel to each other, or that are oriented parallel to each other but with a phase shift of 180° between each other, may reject mode 1802. Consequently, the latter combination of antennas and phases may excite mode $TM_{21}$ and rejects mode $TM_{11}$.

In some embodiments, a desired and/or an undesired mode is a resonant mode. A resonant mode may be excited when the frequency f of the electromagnetic wave corresponds to the dimensions of the energy application zone in a manner known in the art. For example, in an energy application zone that is a rectangular cavity, a resonant mode may be excited when the dimension, along which the electromagnetic wave propagates, referred to herein as $h_z$, is equal to $N*(\lambda/2)$, where N is a whole number (e.g. 0, 1, 2, 3) and $\lambda$ is the wavelength, given by the equation $\lambda=c/f$, where c is the light velocity in the cavity. A resonant mode is usually marked with three index numbers, where the third index number is N.

When a single resonant mode is excited at a given frequency, a great majority of the power carried with the excitation may be carried by the resonant mode, and other modes, which may be propagating or evanescent, may carry a smaller portion of the power, which may be negligible. Thus, when a single resonant mode is excited, there may be little or no need to reject non-resonating modes.

For example, when $h_z=c/f_{21}$ (i.e. when N=2), the antennas and frequency may be selected to excite mode $TM_{21}$ and there may be little need to reject, for example, mode $TM_{11}$, because, although mode $TM_{11}$ may be excitable at the applied frequency, it may carry only a small amount of the power, in comparison to the amount of power carried by the resonant mode $TE_{212}$.

Thus, in some embodiments, resonant modes may be used for achieving a target field intensity distribution. This may facilitate control over the excited modes, provided sufficient bandwidth and frequency control.

In some embodiments, mode excitation may be further facilitated, (e.g., by easing the requirements from bandwidth and frequency control), by using a degenerate cavity. A degenerate cavity is one in which at least one cut off frequency is a cut off frequency of two or more modes of the same family (e.g., two TE modes). Similarly, each resonant frequency (except for, sometimes, the lowest one) may excite two or more resonant modes of the same family. Some shapes of degenerate cavities may include, for example, cylinder and sphere.

In some embodiments, one desired resonant mode and one or more undesired resonant modes may be excited at a same frequency, and the non-desired modes may be rejected as described above. For example, the same frequency that excites mode $TM_{212}$, a cross section of which is shown as 1806 in FIG. 12B may excite also mode $TM_{212}$, a cross section of which is illustrated as 1808 in FIG. 11C. However, if the excitation is via a radiating element positioned at a null of mode 1808, which is not a null of mode 1806, only mode 1808 may be excited. For example, if the radiating element radiates at frequency $f_{12}=f_{21}$ at point 1809, shown in FIGS. 11B and 11C, only mode 1808 may be excited.

Thus, in accordance with some embodiments, there is provided an apparatus for exciting multiple modes (e.g., 3, 4, 5, 6, 7, or higher number of modes), and may control which of the multiple modes is effectively excited at each given instance. The apparatus may include a processor, configured to determine which of the multiple modes is to be effectively excited at some instance, which may select an excitation scheme that may effectively excite only the determined mode. The excitation scheme may include, for example, an identification of radiating elements to participate in the excitation (and optionally shortcutting non-selected radiating elements), setting the phase difference between two or more selected radiating elements, and setting amplitude differences between them, such that the predetermined mode may be effectively excited, and other modes may be rejected. In some embodiments, the processor may be configured to determine the modes to be excited so as to excite a predetermined field pattern, for example, to apply a first predetermined amount of energy to a first region in the energy application zone and a second predetermined amount of energy to a second region in the energy application zone, wherein the first predetermined amount of energy may be different from the second predetermined amount of energy.

Some embodiments may further include a method for applying electromagnetic energy to an object. Such an energy application method may be implemented, for example, through at least one processor implementing a series of steps of process 900Y such as the one set forth in the flow chart of FIG. 13.

Figure 13:
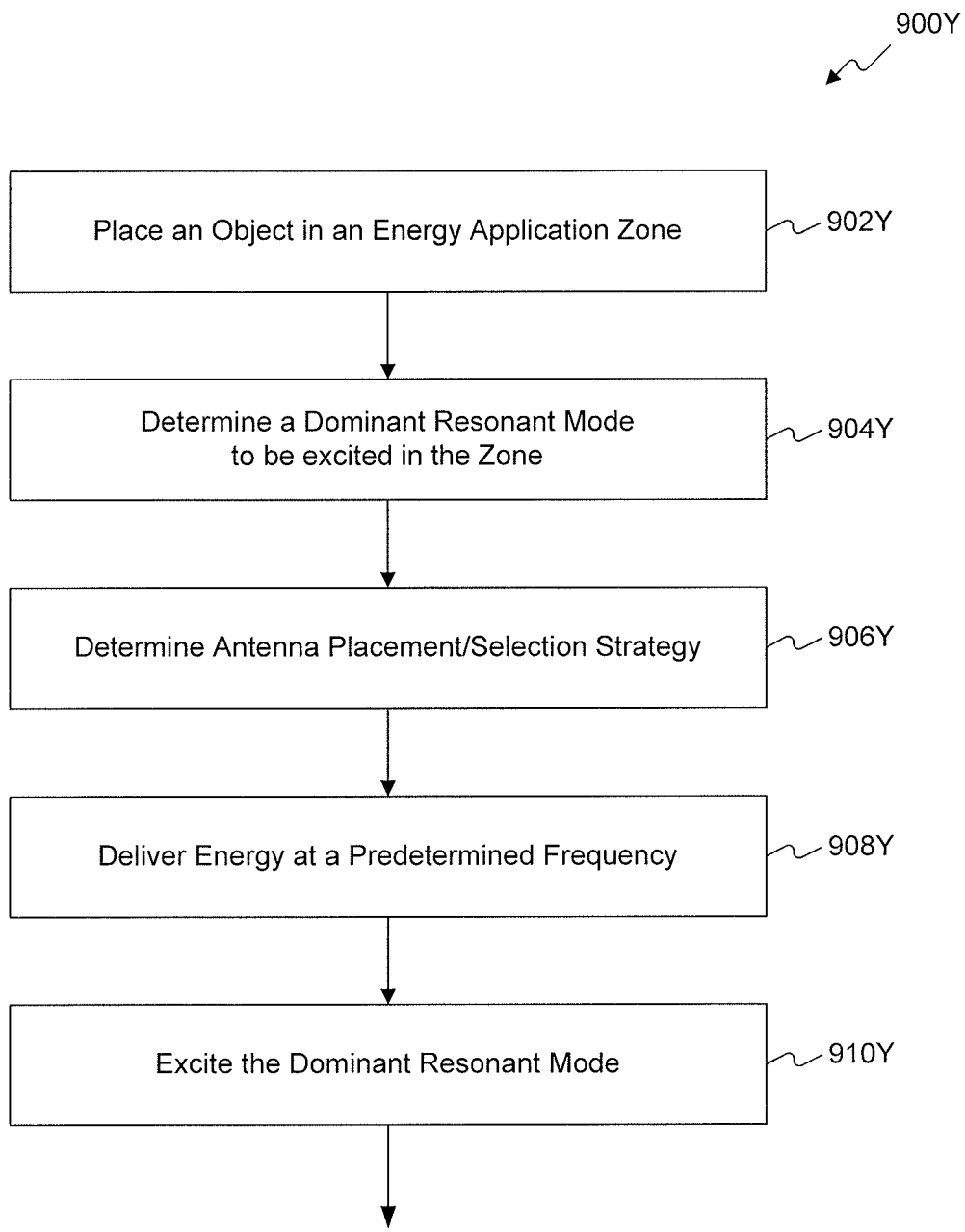
FIG. 13 shows a flow chart of an exemplary method for applying electromagnetic energy to an energy application zone, in accordance with exemplary embodiments.
Figure 14B:
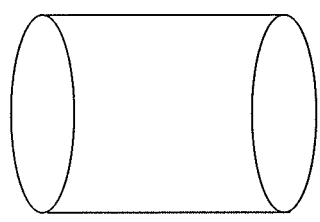
FIGS. 14A-14D illustrate degenerate cavities, in accordance with exemplary embodiments.
Figure 14D:
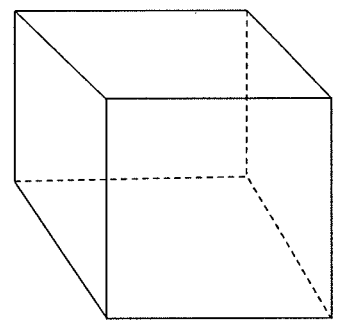
Figure 14A:
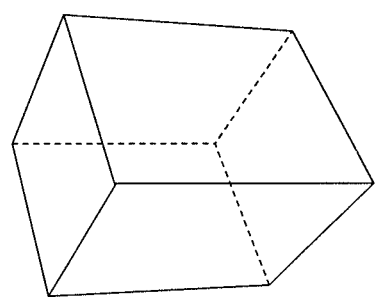
Figure 14C:
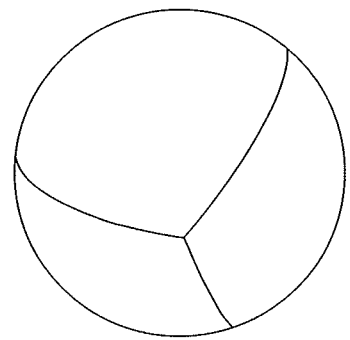

Method 900Y of FIG. 13 may include placing an object in a degenerate energy application zone (step 902Y). For example, object 50 (or a portion thereof) may be placed in cavity 20. In some embodiments, cavity 20 may include a degenerate cavity, such as those illustrated in FIG. 2 and FIGS. 14A-14D. In some embodiments, however, the method may be practiced on objects already placed in the energy application zone. Alternatively, the energy application zone may not include a degenerate cavity.

The method may further involve determining a dominant mode to be excited in the energy application zone. For example, mode 1802 may be the desired dominant mode to be excited, as shown in FIG. 11A. The dominant mode may be determined, for example, by receiving an instruction via an interface, by finding a mode to be determined in a lookup table, or deciding by any other manner on a mode to be excited. In some embodiments, the processor may be configured to determine the modes to be excited so as to excite a predetermined field pattern, for example, to apply a first predetermined amount of energy to a first region in the energy application zone and a second predetermined amount of energy to a second region in the energy application zone, wherein the first predetermined amount of energy is different from the second predetermined amount of energy.

In step 906Y, the antenna placement/selection strategy may be determined. Antenna selection may be carried out, for example, by applying no power to any non-selected antenna. The antenna placement may be predetermined for a specific mode excitation or may be dynamically determined during an energy application process. The desired placement of antennas may also be achieved by selecting one or more antennas in an antenna array. Processor 30 may determine the selection strategy depending on a specific mode to be excited or rejected.

The method may further involve applying electromagnetic energy at a predetermined frequency (step 908Y) that may effectively excite one or more modes in the energy application zone. For example, processor 30 may regulate the source to apply the electromagnetic energy at one or more predetermined frequencies. In some embodiments, the source may be configured to apply energy at resonant frequencies of the energy application zone.

In step 910Y, processor 30 may regulate the source to excite a dominant mode in the energy application zone. For example, by supplying electromagnetic energy through a specific antenna or antenna combination at particular locations, the dominant mode may be excited at a specified purity degree, and one or more other modes may be rejected. The purity degree may be defined, for example, by the portion of the power applied to the energy application zone at the mode.

Figure 15:
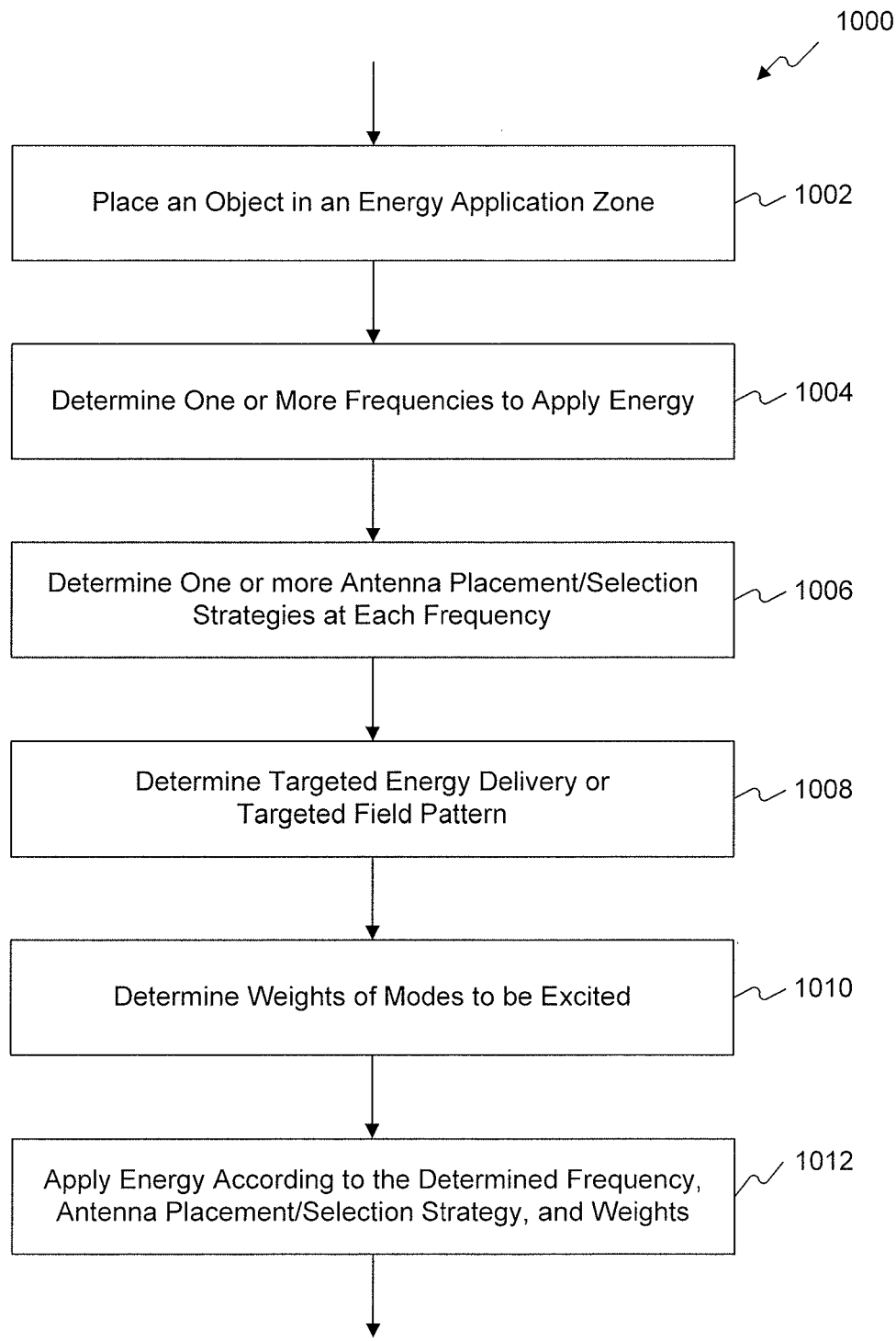
FIG. 15 shows another flow chart of an exemplary method for applying electromagnetic energy to an energy application zone, in accordance with exemplary embodiments.

FIG. 15 illustrates another exemplary process 1000 for applying electromagnetic energy to an object in an energy application zone. In step 1002, an object may be placed in an energy application zone, which may be degenerate or not, similar to step 902Y, as described above. In some embodiments, the method may be practiced on objects already placed in the energy application zone, and placing is not a step in the method.

In step 1004, processor 30 may determine a frequency or a set of frequencies at which electromagnetic energy may be applied to the energy application zone. In some embodiments, processor 30 may determine an MSE or a set of MSEs at which electromagnetic energy may be applied to the energy application zone. In some embodiments, processor 30 may first determine the lowest resonant frequency associated with the energy application zone, based on the geometry of the zone and optionally or alternatively based also on experimental readings of energy reflection and transmission from the zone at various frequencies. Processor 30 may then determine one or more frequencies based on the lowest resonant frequency, for example, one or more frequencies at or above the lowest resonant frequency. In other embodiments, processor 30 may determine the frequencies as resonant frequencies of the energy application zone based, for example, on equations associating resonant frequencies to mode indexes and cavity dimensions. Additionally or alternatively, the resonant frequencies may be determined by analyzing power received from the zone. Processor 30 may also determine frequencies based on input received via an interface, for example, user input, input from the Internet, or input from other sources. In some embodiments, one or more frequencies or MSEs may be predetermined and step 1004 may be omitted.

In step 1006, processor 30 may determine one or more antenna placement/selection strategies at each selected frequency. For example, processor 30 may determine a desired dominant mode corresponding to each of the selected frequencies and determine appropriate antenna locations to excite the desired dominant modes and/or to reject one or more undesired modes. In some embodiments, antenna placement/selection strategies may be predetermined and step 1006 may be omitted.

In step 1008, processor 30 may determine a targeted energy delivery or a targeted field pattern corresponding to a desired energy application or delivery profile in the energy application zone. The targeted energy delivery profile may include a distribution of energy deliverable to the object. In some embodiments, the targeted energy delivery profile may be determined based on the energy absorption characteristics or other properties associated with differing regions of the object and/or of the energy application zone. In some embodiments, the targeted energy delivery profile may include differing amounts of energy at differing regions of the object and/or of the energy application zone. For example, if a dish placed in the energy application zone includes vegetables on one side and meat on another side, the targeted energy delivery profile may be determined such that a larger amount of energy is to be delivered or applied to the meat than to the vegetables.

A desired energy delivery profile can be achieved by manipulating one or more MSEs to generate one or more targeted or desired field patterns through which a desired amount of energy may be applied to specific locations in the cavity one by one. That is, each successive field pattern application may apply a certain amount of energy to certain locations within the energy application zone. After a series of field pattern applications, the overall net time-integrated amount of energy applied to an object or region within the energy application zone may correspond to the desired energy delivery profile.

In some embodiments, regions within the energy application zone and specific amounts of energy to be applied to those regions may be specified by a user, for example, as a function of known characteristics of the object. Alternatively or additionally, processor 30 may be configured to sense the location of the object and/or energy absorption characteristics within the object. Processor 30 may then determine the regions to which energy will be applied and the targeted amount of energy that should be applied to each region. For example, returning to FIG. 1, processor 30 may determine the characteristics of object 50 using feedback signals acquired using radiating elements 18 and detector 40. Processor 30 may then compile an energy delivery profile to provide a certain amount of energy to the volume that corresponds to object 50 (or even to various portions of object 50) and another amount of energy to the volume surrounding object 50. Processor 30 would then determine the combination of field patterns to apply in order to provide the desired energy delivery profile.

In some embodiments, the targeted energy delivery profile may be discretized according to a discretization of cavity 20, using discretization strategies such as those shown in FIG. 8A-8C.

In step 1010, processor 30 may determine weights of the modes to be excited in the zone, in order to achieve the targeted energy delivery profile or targeted field patterns. In some embodiments, processor 30 may determine weights of the MSEs to be applied in the zone, in order to achieve the targeted energy delivery profile or targeted field patterns. Each combination of frequencies or MSEs, as determined in step 1004, and antenna placement/selection, as determined in step 1006, may be referred to as an energy delivery scheme. Each energy delivery scheme, when executed to regulate the source to deliver energy to the object, may excite a mode or a combination of modes in the energy application zone. Processor 30 may predict the field distributions of these modes through testing, simulation, or analytical calculation. For example, an I matrix may be constructed which records the various modes in a discretized manner.

In step 1012, processor 30 may regulate the source to apply energy to the object according to the determined energy delivery schemes (e.g., combinations of frequencies and/or other MSEs and optionally antenna placement and/or selection strategies), and weights. For example, the source may be regulated as described in connection with FIGS. 6A to 6E.

The utilization of antenna location to excite or reject modes may significantly enhance the noise immunity and resolution capability of the spatially controlled energy delivery technique. By using one or more antennas placed in specific positions relative to the desired or undesired modes, an additional degree of freedom may be available to control energy delivery.

Some embodiments may include an apparatus for exciting a target electromagnetic field intensity distribution in an energy application zone. The target electromagnetic field intensity distribution may be almost "arbitrary," as it may be a linear combination of a large number of modes or other linearly independent field patterns. For example, the apparatus may be configured to excite in the energy application zone five modes. Considering that each mode may have a weight between 0 and 1, the various linear combinations may result in thousands of different field intensity distributions. For instance, if the number of available weights that may be associated with each of the five modes is 5, the number of different linear combinations is about 3000. Examples of numbers of modes that may be used include any number larger than 1. However, since larger number of modes allows better fit to more diverse target field intensity distribution, larger number of modes may be advantageous. On the other hand, exciting a large number of modes, each in a relatively pure form, may be more challenging. Thus, in some embodiments, the number of available modes may be between 3 and 10, for example, 3, 4, 5, 6, or 7.

In some embodiments, a target field intensity distribution may be non-uniform, for example, the target field intensity distribution may include a first field intensity at a first region and a second field intensity, at a second region. The difference between the field intensities in the two regions may be larger than a threshold value. For example, the difference may be larger than 10%, 20%, 50%, or any other difference which may be meaningful for the application at hand.

In some embodiments, the apparatus may comprises a processor (e.g., processor 30 or 30C) that, in operation, may select one or more field patterns, from multiple electromagnetic field patterns available to the processor, those that take place in exciting a given target field intensity distribution. The available field patterns may depend on the available MSEs, as usually each MSE is associated with a field pattern. The field patterns or corresponding MSEs may be selected by the processor based on the target electromagnetic field intensity distribution. For example, the processor may assign weights to the various field patterns such that the sum of the weighted field patterns is equal to the target field intensity distribution, at least within some specified tolerance. The selected field patterns may be only those that have a weight larger than some minimal threshold. In some embodiments, the modes are first selected, for example, based on comparison between their symmetry characteristics and the symmetry characteristics of the target distribution, and only the selected modes, for example, those having the adequate symmetry, may be selected and weighted.

In some embodiments, the processor may cause excitation of the selected field patterns, optionally, in accordance with their weights. Exciting field patterns in accordance with their weight may include exciting each of them to a time period proportional to the weight, at power level proportional to the weight, at power level and for time duration that their product (power multiplied by time) is proportional to the weight, or otherwise. The proportionality factor, for instance, between time duration and weight, may be the same for all of the modes.

In some embodiments, the processor may determine the target field intensity distribution. For example, the processor may receive indicators as to the target field intensity distribution via an interface. The indicators may include, for instance, characterizations of an object to be heated in the energy application zone, and the processor may determine the target field intensity using a lookup table arranged in accordance with these characterizations. In another example, the processor may receive a desired field intensity distribution, and convert it into a target field intensity distribution, for instance, by smoothing. In some embodiments, the processor may acquire the target field intensity distribution or an indication thereof via one or more readable tags (e.g., an RFID or a bar-code, etc.) associated with the object.

In some embodiments, several radiating elements may be available for the processor for excitation of the field patterns, and the processor may select one or more of them for exciting each of the selected field patterns. In some embodiments, the number of available radiating elements is at least as large as the number of available modes. For example, three or more radiating elements may be available for exciting 3 modes. Having at least one radiating element per mode may be useful in rejecting un-desired modes that may be excited in the energy application zone by the radiating elements if not rejected.

The selection of modes (or other linearly independent field patterns) may be, for example, based on the position of the available radiating elements. Optionally, the selection may be based on the aforementioned positions and on the field value of the field pattern to be excited in the position of the radiating element, for example, as discussed above. In some embodiments, the field patterns, excited to obtain the target field intensity distribution, are predetermined. For example, the processor may have presets of MSEs, each corresponding to one of the available modes, and all the excited field patterns may be linear combinations of these modes. Upon assigning the weights to the various modes, the processor may cause an electromagnetic source to sweep over the preset MSEs with the assigned weights, thus exciting in the energy application zone the target field intensity distribution.

Figure 16:
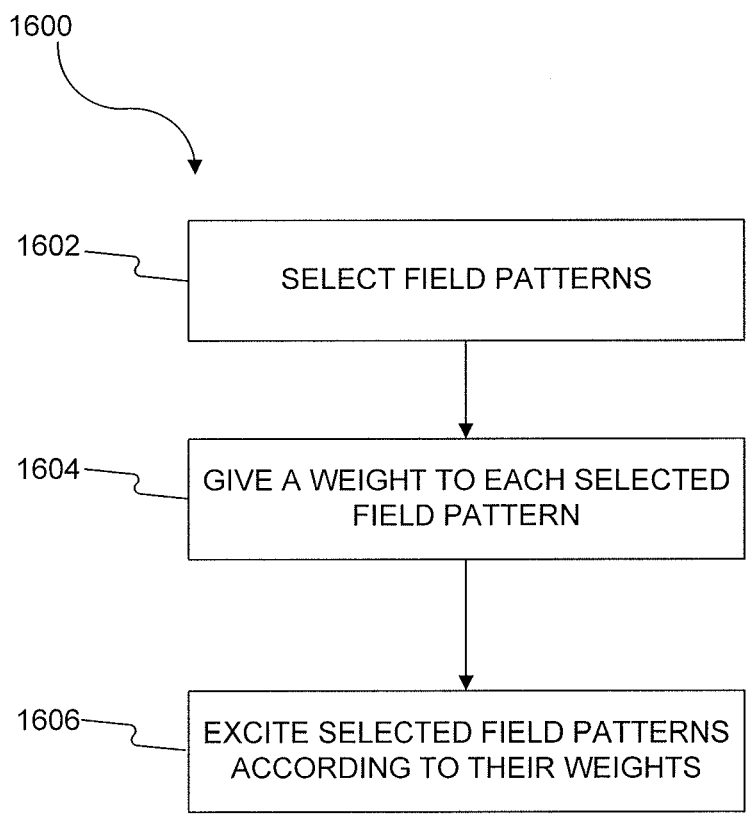
FIG. 16 shows a flowchart of an exemplary method of exciting a target electromagnetic field intensity distribution in an energy application zone according to exemplary embodiments.

FIG. 16 is a flowchart of a method 1600 of exciting a target electromagnetic field intensity distribution in an energy application zone according to some embodiments. As shown in the figure, method 1600 may include selecting one or more field patterns, as indicated in step 1602. The selection may be based on a target electromagnetic field intensity distribution. The selection may be from multiple electromagnetic field patterns. The electromagnetic field patterns may be predetermined. Additionally or alternatively, the electromagnetic field patterns may include at least three modes or other linearly independent field patterns. Optionally, the electromagnetic field patterns include also some linear combinations of the three modes. In some embodiments, step 1602 is carried out by a processor.

Method 1600 may also include a step of weighting the selected field patterns (1604). The weighting may be such that the sum of the field intensity distributions of the weighted field patterns equals to the target field intensity distribution, for example, to apply a first predetermined amount of energy to a first region in the energy application zone and a second predetermined amount of energy to a second region in the energy application zone. In some embodiments, the first predetermined amount of energy may be different from the second predetermined amount of energy.

Method 1600 may also include a step of exciting the one or more selected field patterns (1606). This excitation may be according to their weights. The process may include, optionally, as part of excitation step 1606, selecting one or more radiating elements for exciting each of the selected field intensity distributions. The selection may be based on the position of the selected (or not selected) radiating element, and in some embodiments also on the relationship between this position and the field value of the field pattern at the aforementioned position.

In the foregoing Description of Exemplary Embodiments, various features are grouped together in a single embodiment for purposes of streamlining the disclosure. This method of disclosure is not to be interpreted as reflecting an intention that the claims require more features than are expressly recited in each claim. Rather, as the following claims reflect, inventive aspects lie in less than all features of a single foregoing disclosed embodiment. Thus, the following claims are hereby incorporated into this Description of the Exemplary Embodiments, with each claim standing on its own as a separate embodiment.

Moreover, it will be apparent to those skilled in the art from consideration of the specification and practice of the present disclosure that various modifications and variations can be made to the disclosed systems and methods without departing from the scope of the claims. Thus, it is intended that the specification and examples be considered as exemplary only, with a true scope of the present disclosure being indicated by the following claims and their equivalents.

What is claimed is:

1. An apparatus for applying electromagnetic energy in a radio frequency (RF) range to an object in an energy application zone via at least one radiating element, the apparatus comprising:
  at least one processor programmed to:
    determine locations of a first region and a second region in the energy application zone;
    regulate a source in order to apply a first predetermined amount of RF energy to the first region in the energy application zone and a second predetermined amount of RF energy to the second region in the energy application zone;

cause application of two or more field patterns in the energy application zone, each of the field patterns having at least one high-intensity region and at least one low-intensity region, wherein field intensities associated with high-intensity regions are higher than field intensities associated with low-intensity regions;

select at least one of the field patterns whose at least one high-intensity region coincides with a location of at least a portion of the object; and cause application of the selected at least one of the field patterns to the energy application zone.

2. The apparatus according to claim 1, wherein the first predetermined amount of energy is different from the second predetermined amount of energy.

3. The apparatus according to claim 1, wherein the at least one processor is programmed to apply energy only at frequencies that are smaller than four times of a lowest resonant frequency supported by the energy application zone.

4. The apparatus according to claim 1, wherein the at least one processor is programmed to distinguish between locations of the first region and the second region.

5. The apparatus according to claim 1, wherein the first and second regions have addresses that are stored in different locations in a memory unit connected to the at least one processor.

6. The apparatus according to claim 1, wherein the at least one processor is programmed to control the source in order to selectively generate a plurality of differing electromagnetic field patterns in the energy application zone, and wherein the processor is programmed to select at least one electromagnetic field pattern from the plurality of electromagnetic field patterns.

7. The apparatus according to claim 6, wherein the at least one processor is programmed to regulate the source in order to apply the selected electromagnetic field patterns with different weightings.

8. The apparatus according to claim 7, wherein the weightings of the field patterns are associated with amounts of energy to be applied at the corresponding field patterns.

9. The apparatus according to claim 7, wherein the weightings of the field patterns are associated with time durations over which energy is to be applied at the corresponding field patterns.

10. The apparatus according to claim 7, wherein the weightings of the field patterns are associated with power levels at which energy is to be applied at the corresponding field patterns.

11. The apparatus according to claim 6, wherein the at least one processor is programmed to sequentially select multiple differing electromagnetic field patterns.

12. The apparatus according to claim 1, wherein the at least one processor is programmed to apply energy to the first region and the second region based on an indication of the energy dissipated in each region.

13. The apparatus according claim 1, wherein the source is configured to supply electromagnetic energy through a plurality of radiating elements, and wherein the at least one processor is programmed to regulate the source to supply energy with differing amplitudes simultaneously to at least two radiating elements.

14. The apparatus according to claim 1, wherein the at least one processor is programmed to control the source so that an amount of energy applied to the first region differs from an amount of energy applied to the second region, and energy absorbed in the first region is substantially the same as the energy absorbed in the second region.

15. The apparatus according to claim 1, wherein the at least one processor is programmed to regulate the source to apply energy over a plurality of frequencies, and wherein an amount of energy applied is frequency-dependent.

16. The apparatus according to claim 15, wherein the at least one processor is programmed to change the frequency dependency of the amount of energy a plurality of times during an energy application cycle.

17. The apparatus according to claim 1, wherein the at least one processor is programmed to regulate the source to apply energy over a plurality of phases, and wherein an amount of energy delivered is phase-dependent.

18. The apparatus according to claim 17, wherein the at least one processor is programmed to change the phase dependency of the amount of energy a plurality of times during an energy application cycle.

19. The apparatus according to claim 1, further comprising the energy application zone and at least one radiating element.

20. The apparatus according to claim 19, further comprising the source of electromagnetic energy.

21. The apparatus according to claim 1, further comprising the source of electromagnetic energy.

22. The apparatus of claim 1, wherein the at least one processor is programmed to:
determine the locations of the first region and the second region in the energy application zone based on input information received from a user.

23. The apparatus of claim 1, wherein the at least one processor is programmed to:
determine the locations of the first region and the second region in the energy application zone based on input information received from one or more detectors that are in, around, or in the vicinity of the energy application zone.

24. An apparatus for applying electromagnetic energy in a radio frequency (RF) range to an object in an energy application zone via at least one radiating element, the apparatus comprising:
at least one processor programmed to:
determine locations of a first region and a second region in the energy application zone;
regulate a source in order to apply a first predetermined amount of RF energy to the first region in the energy application zone and a second predetermined amount of RF energy to the second region in the energy application zone;
determine information indicating a spatial location of the object in the energy application zone;
identify a first field pattern having a first high-intensity region corresponding to a first area of the spatial location of the object;
identify a second field pattern having a second high-intensity region corresponding to a second area of the spatial location of the object, wherein the first area is different from the second area; and
control the source to apply the first field pattern and the second field pattern to the energy application zone.

25. The apparatus according to claim 24, wherein the at least one processor is programmed to determine locations of the first and the second regions in the energy application zone in accordance with the first and the second areas.

26. The apparatus according to claim 24, wherein the at least one processor is programmed to:
- control the source in order to selectively generate a plurality of differing electromagnetic field patterns in the energy application zone;
- select at least one electromagnetic field pattern from the plurality of electromagnetic field patterns; and
- regulate the source in order to apply the selected electromagnetic field patterns with different weightings.

27. The apparatus according to claim 26, wherein the weightings of the field patterns are associated with at least one of:
- amounts of energy to be applied at the corresponding field patterns;
- time durations over which energy is to be applied at the corresponding field patterns; or
- power levels at which energy is to be applied at the corresponding field patterns.

28. The apparatus according to claim 26, wherein the at least one processor is programmed to sequentially select multiple differing electromagnetic field patterns.

29. The apparatus according to claim 24, wherein the at least one processor is programmed to apply energy to the first region and the second region based on an indication of the energy dissipated in each region.

30. The apparatus according claim 24, wherein the source is configured to supply electromagnetic energy through a plurality of radiating elements, and wherein the at least one processor is programmed to regulate the source to supply energy with differing amplitudes simultaneously to at least two radiating elements.

31. The apparatus according to claim 24, wherein the at least one processor is programmed to control the source so that an amount of energy applied to the first region differs from an amount of energy applied to the second region, and energy absorbed in the first region is substantially the same as the energy absorbed in the second region.

32. The apparatus according to claim 24, wherein the at least one processor is programmed to:
- regulate the source to apply energy over a plurality of frequencies, wherein an amount of energy applied is frequency-dependent; and
- change the frequency dependency of the amount of energy a plurality of times during an energy application cycle.

33. The apparatus according to claim 24, wherein the at least one processor is programmed to:
- regulate the source to apply energy over a plurality of phases, wherein an amount of energy delivered is phase-dependent; and
- change the phase dependency of the amount of energy a plurality of times during an energy application cycle.

34. The apparatus of claim 24, wherein the at least one processor is programmed to:
- determine the locations of the first region and the second region in the energy application zone based on at least one of:
  - input information received from a user; or
  - input information received from one or more detectors that are in, around, or in the vicinity of the energy application zone.

35. An apparatus for applying electromagnetic energy in a radio frequency (RF) range to an object in an energy application zone via at least one radiating element, the apparatus comprising:
- at least one processor programmed to:
  - cause application of two or more field patterns in the energy application zone, each of the field patterns having at least one high-intensity region and at least one low-intensity region, wherein field intensities associated with high-intensity regions are higher than field intensities associated with low-intensity regions, and
  - select at least one of the field patterns whose at least one high-intensity region coincides with a location of at least a portion of the object, and
  - cause application of the selected at least one of the field patterns to the energy application zone.

36. An apparatus for applying electromagnetic energy in a radio frequency (RF) range to an object in an energy application zone via at least one radiating element, the apparatus comprising:
- at least one processor programmed to:
  - determine information indicating a spatial location of the object in the energy application zone;
  - identify a first field pattern having a first high-intensity region corresponding to a first area of the spatial location of the object;
  - identify a second field pattern having a second high-intensity region corresponding to a second area of the spatial location of the object, wherein the first area is different from the second area; and
  - control the source to apply the first field pattern and the second field pattern to the energy application zone.

* * * * *